(12) United States Patent
Sugiura et al.

(10) Patent No.: US 10,839,182 B2
(45) Date of Patent: Nov. 17, 2020

(54) APPARATUS FOR READING INFORMATION

(71) Applicant: DENSO WAVE INCORPORATED, Aichi-pref. (JP)

(72) Inventors: Akihiro Sugiura, Aichi-pref. (JP); Masaaki Kuriyama, Aichi-pref. (JP); Koji Konosu, Aichi-pref. (JP); Hiroshi Hishida, Aichi-pref. (JP); Hidenori Ishii, Aichi-pref. (JP); Yoshihiro Yamazaki, Aichi-pref. (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 83 days.

(21) Appl. No.: 16/171,783

(22) Filed: Oct. 26, 2018

(65) Prior Publication Data

US 2019/0213363 A1    Jul. 11, 2019

(30) Foreign Application Priority Data

Oct. 26, 2017  (JP) .................................. 2017-206864
Feb. 13, 2018  (JP) .................................. 2018-022764
Apr. 9, 2018   (JP) .................................. 2018-074858
Aug. 10, 2018  (JP) .................................. 2018-151302

(51) Int. Cl.
  *G06K 7/10*  (2006.01)
  *G06K 7/14*  (2006.01)
  *G06K 7/00*  (2006.01)

(52) U.S. Cl.
  CPC .......... *G06K 7/109* (2013.01); *G06K 7/0017* (2013.01); *G06K 7/10881* (2013.01); *G06K 7/10891* (2013.01); *G06K 7/1417* (2013.01)

(58) Field of Classification Search
  None
  See application file for complete search history.

(56) References Cited

U.S. PATENT DOCUMENTS 5,831,261 A  * 11/1998  Plesko ............... G06K 7/10653
                                             250/221
5,933,288 A  *  8/1999  Plesko ................. G02B 26/101
                                             359/896
10,521,634 B2 * 12/2019  Handshaw ........... G06K 7/1413
2007/0057067 A1    3/2007  He
                (Continued)

FOREIGN PATENT DOCUMENTS

JP    H04-160580 A    6/1992
JP    2009-104376 A   5/2009
JP    2012064335 A  *  3/2012

*Primary Examiner* — Christle I Marshall
(74) *Attorney, Agent, or Firm* — Oliff PLC

(57) ABSTRACT

An information reader includes a reader main unit and a case. The case houses therein an inner pad serving as an electrostatic capacity type of switch used by an operator to enable an information reading unit to read information. The inner pad is assembled within the case to be directed toward a touch detection region of the case. A switch unit, which is separated from the reader main unit, is provided with a touch electrode pad to which electrical charge is applied in response to an operator's touch operation, a wiring line one of whose both ends is electrically connected to the touch electrode pad, and a transmission pad to which the other end is electrically connected. The transmission pad is assembled with the case on the outer surface thereof.

36 Claims, 47 Drawing Sheets

(56) References Cited

U.S. PATENT DOCUMENTS

| | | | |
|---|---|---|---|
| 2012/0120019 A1* | 5/2012 | Choi | G06F 3/044 |
| | | | 345/174 |
| 2014/0061312 A1 | 3/2014 | Tien | |
| 2015/0371072 A1* | 12/2015 | Liou | G06K 7/10881 |
| | | | 235/375 |
| 2018/0225489 A1 | 8/2018 | Liou et al. | |

* cited by examiner

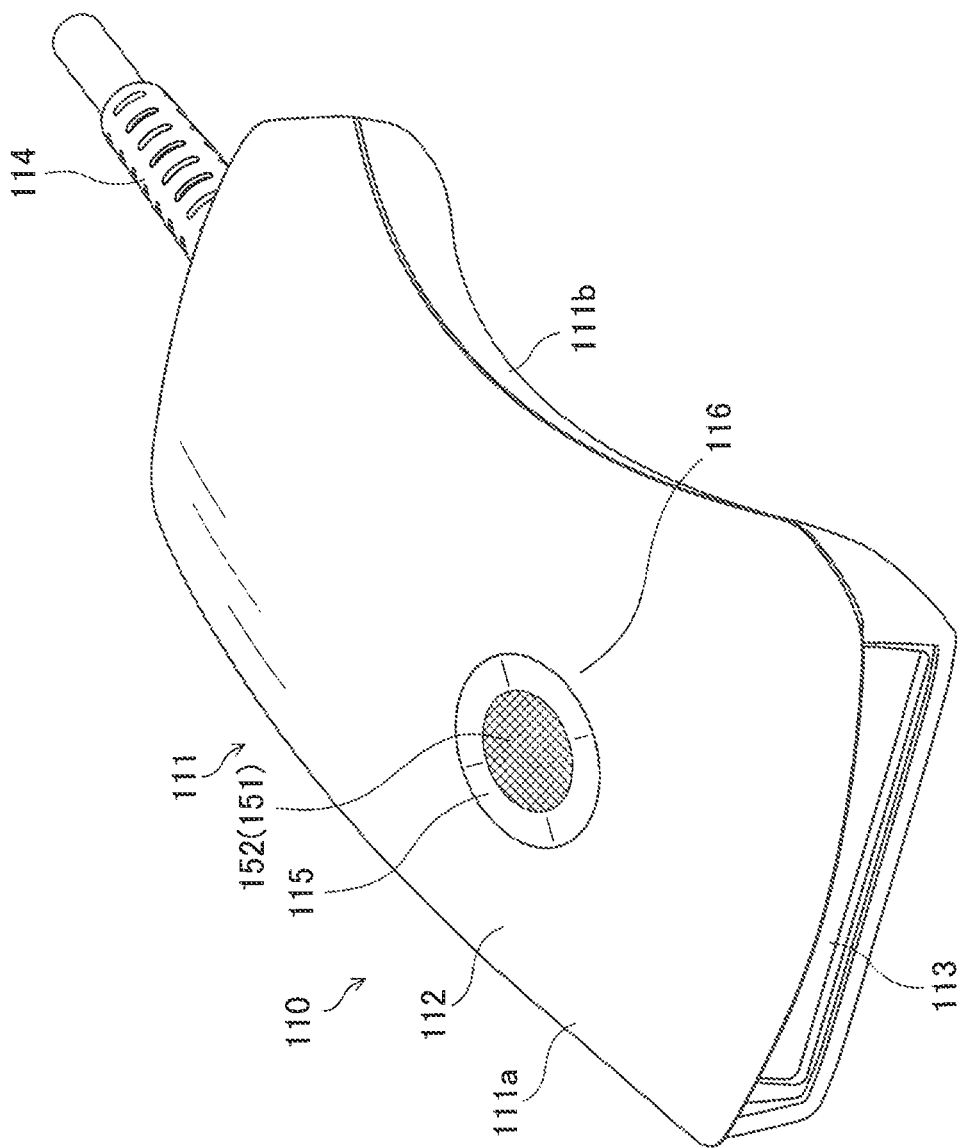

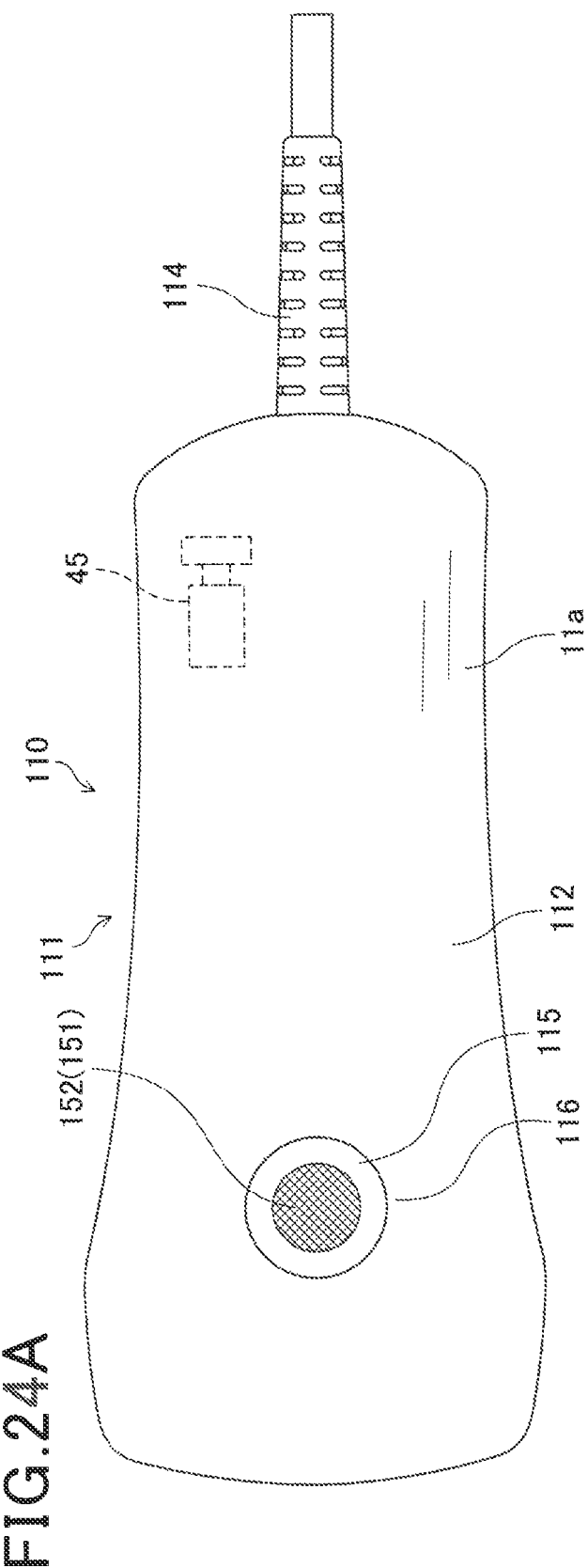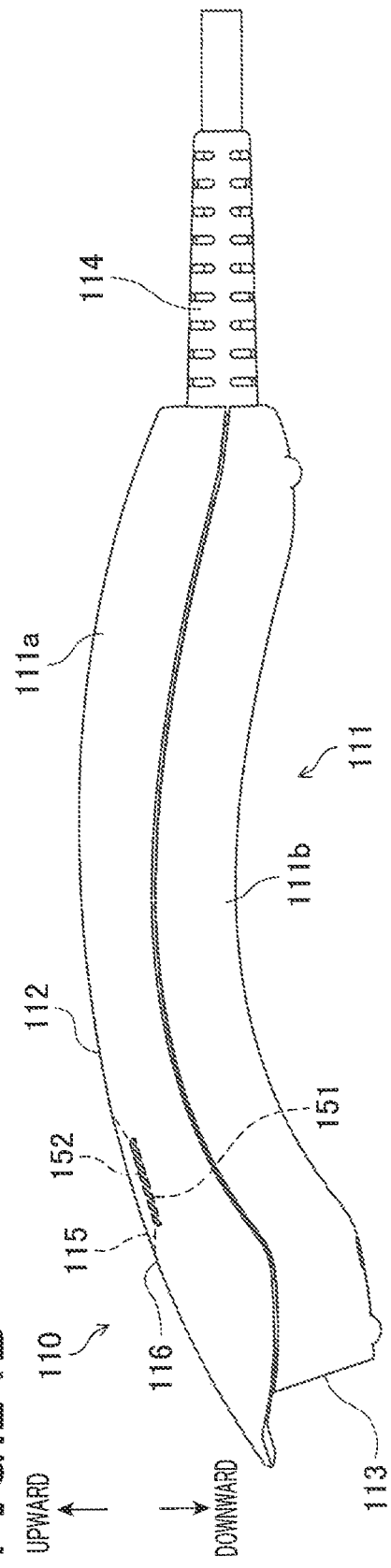

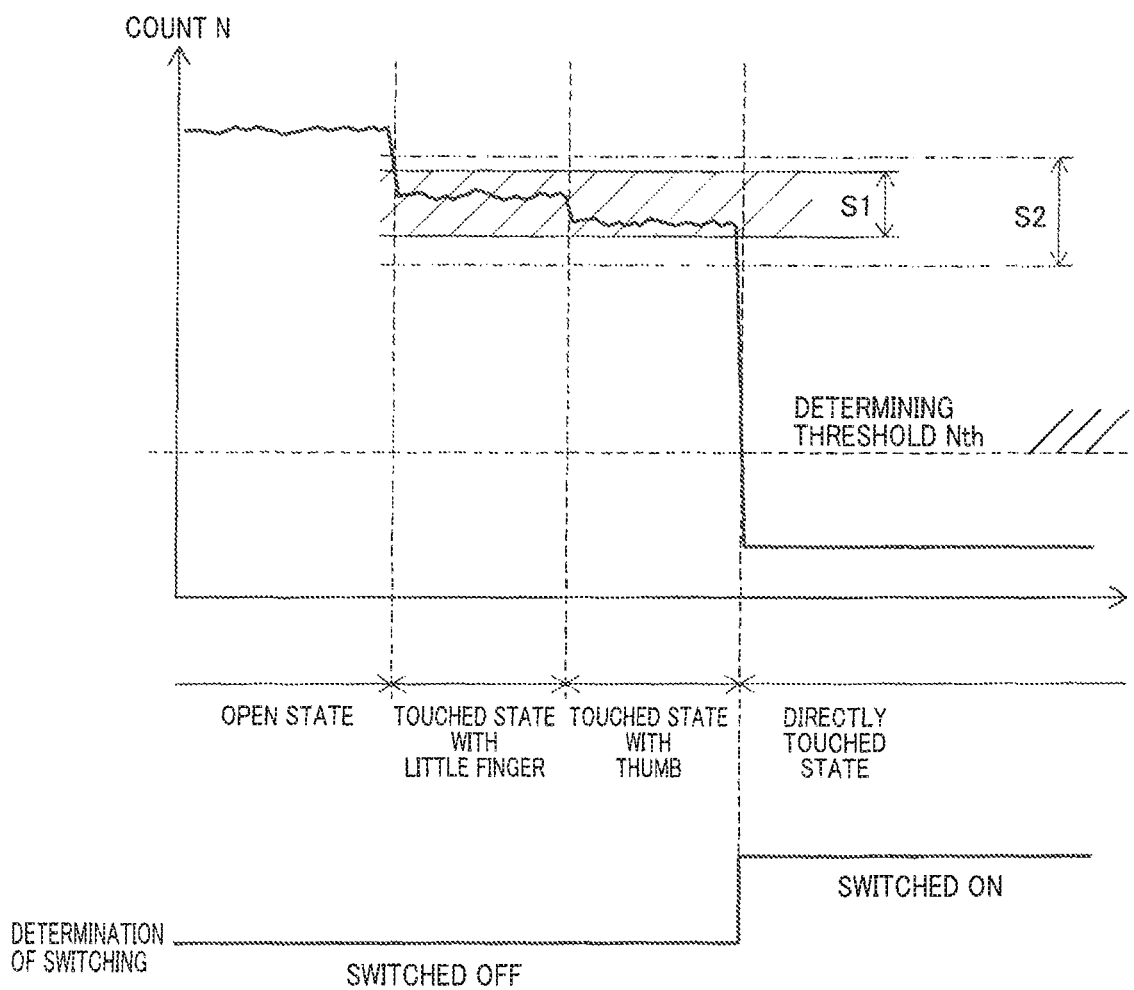

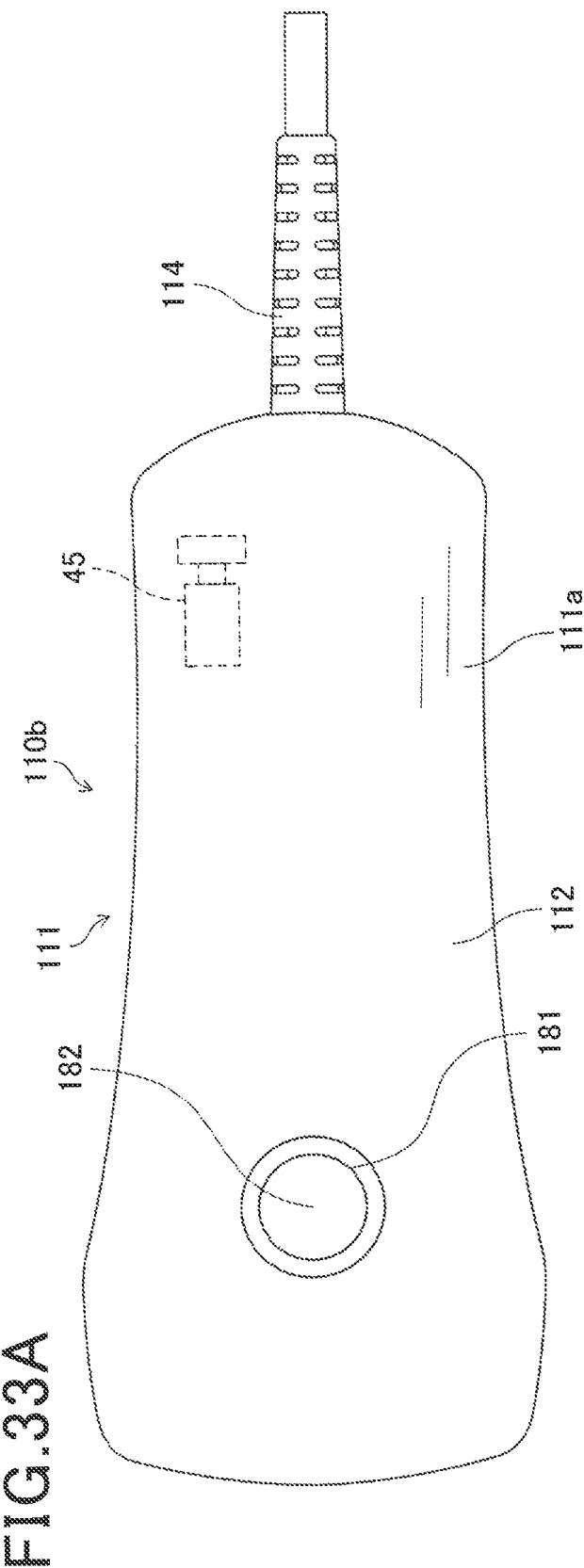
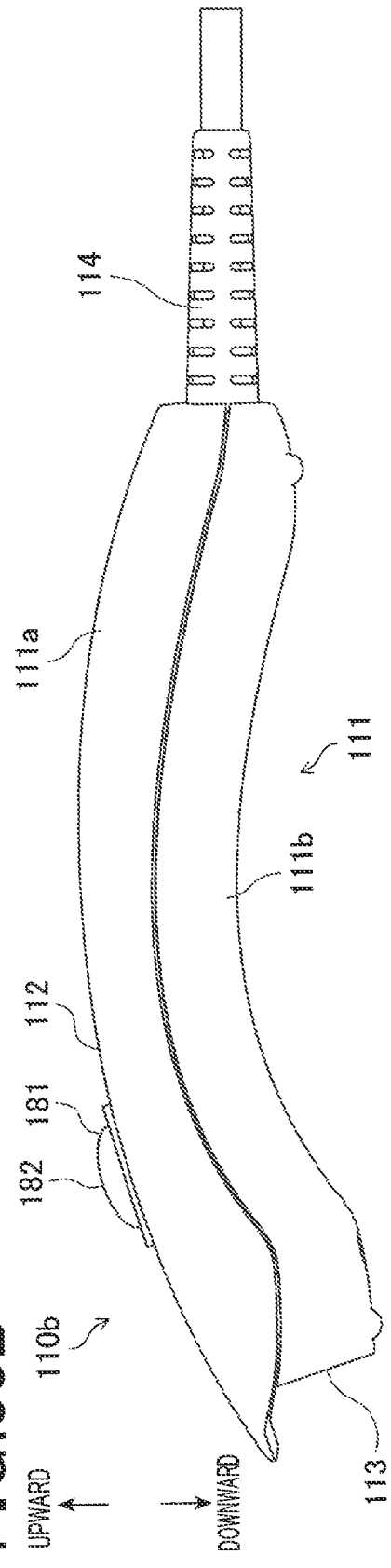
FIG.33A
FIG.33B

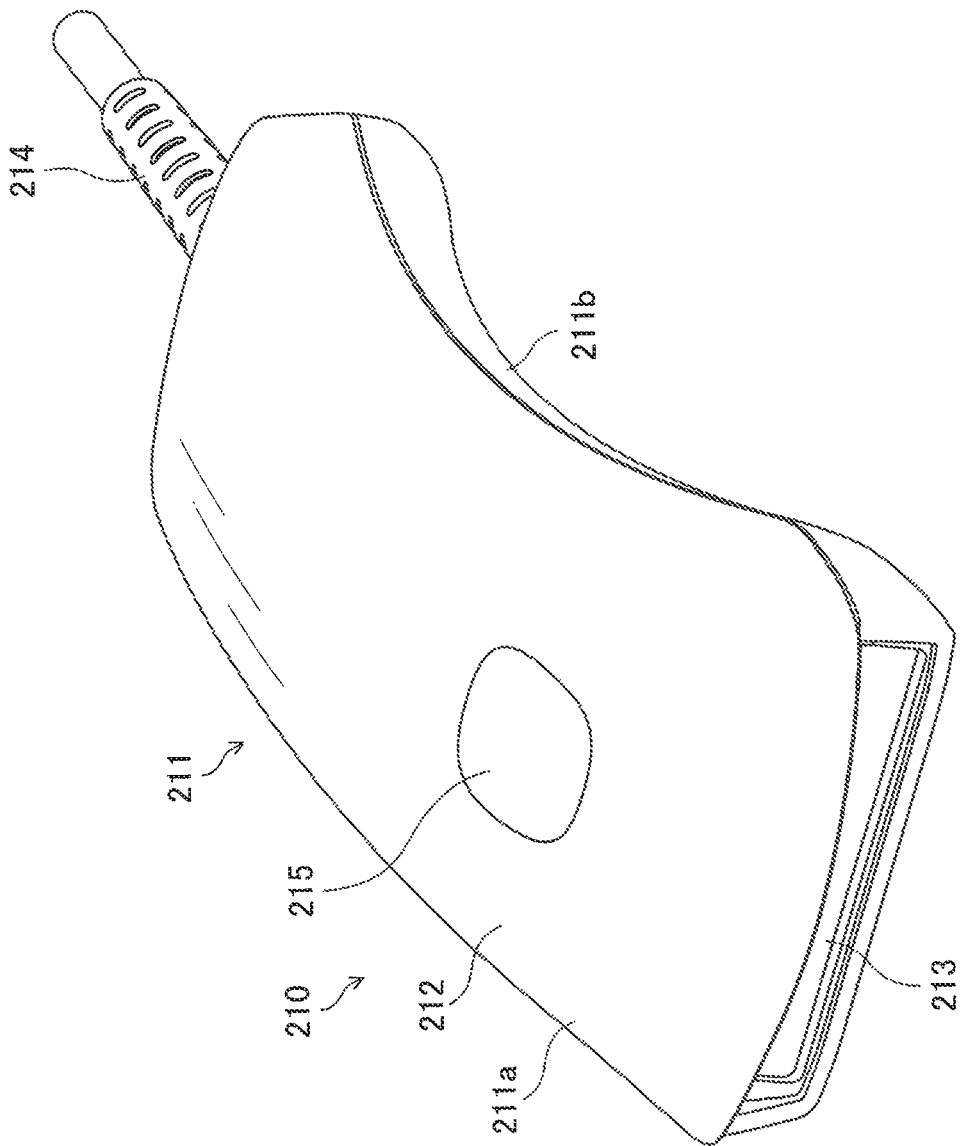

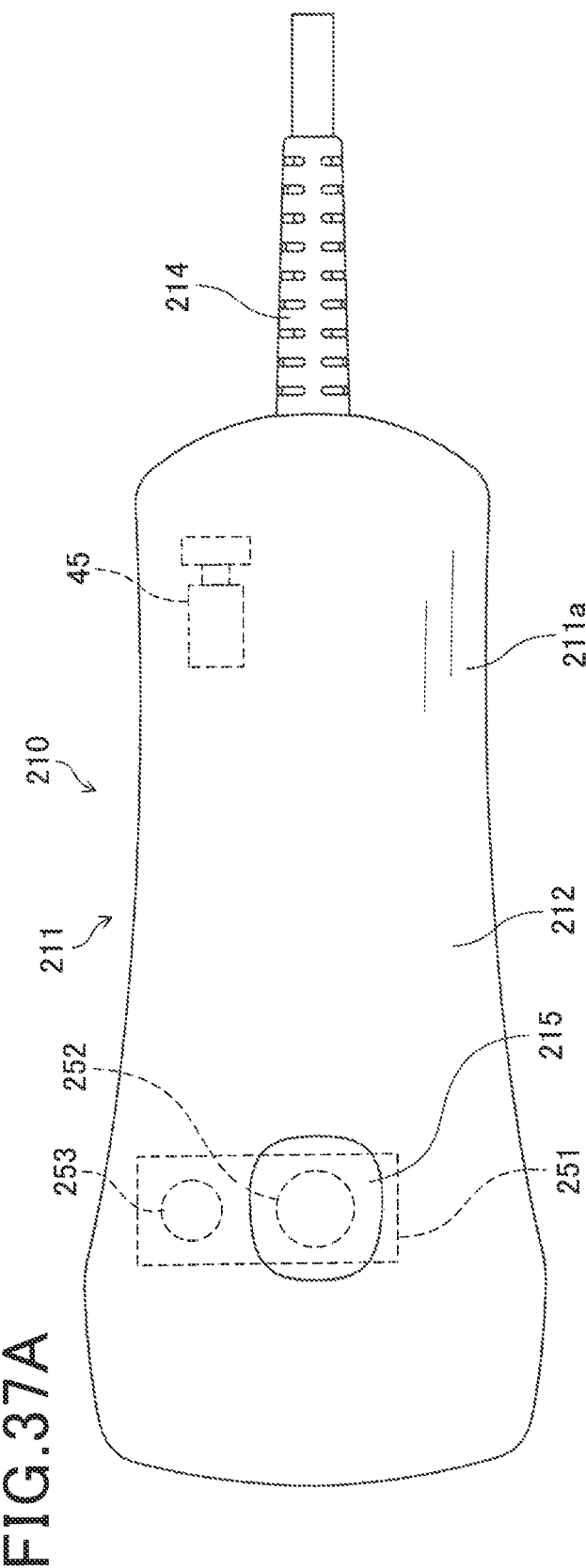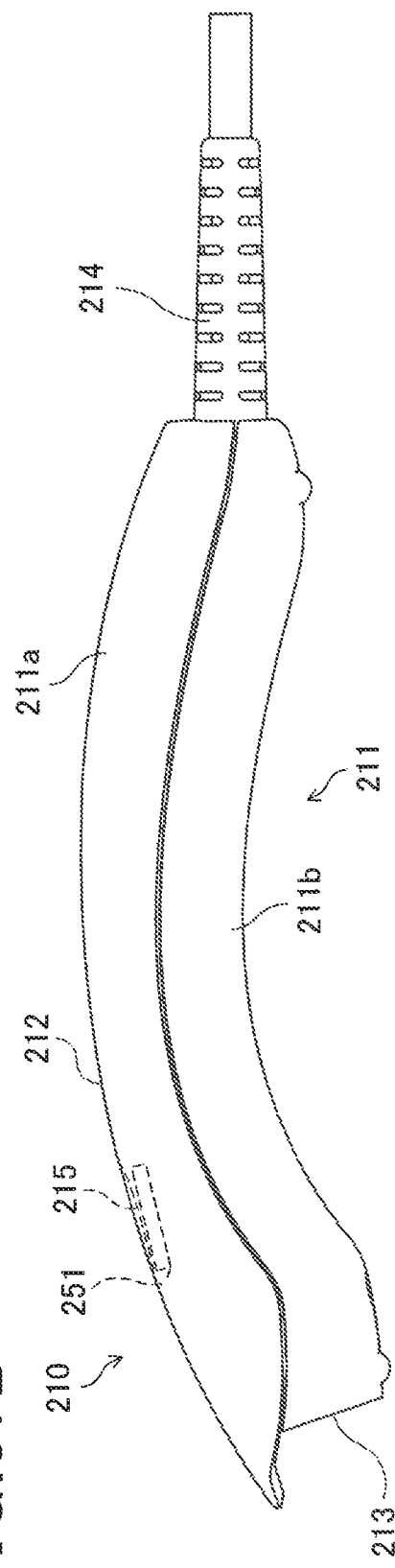

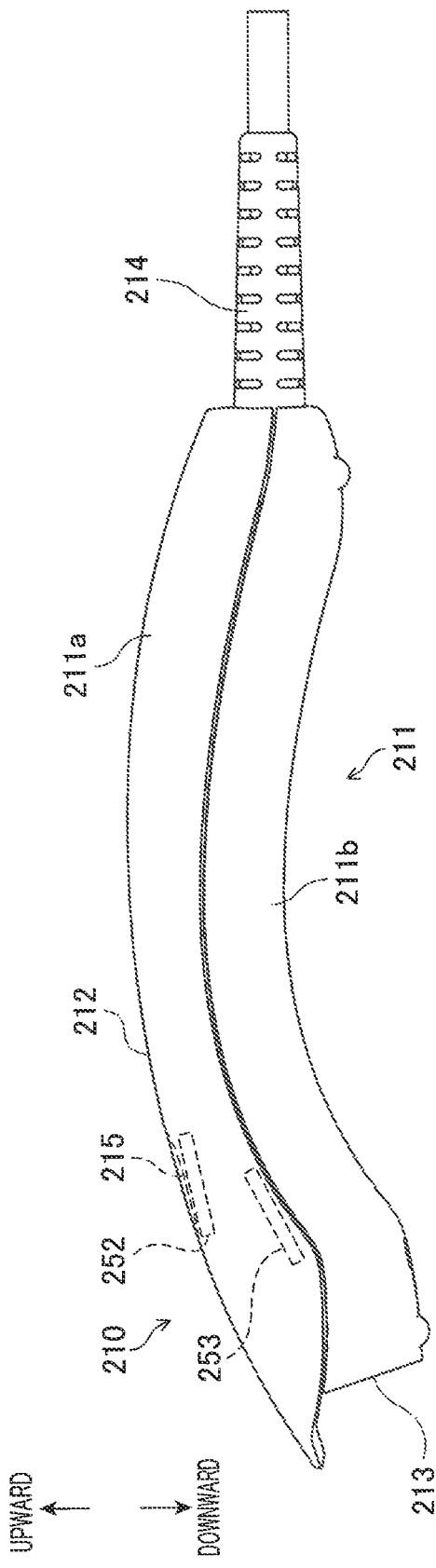

APPARATUS FOR READING INFORMATION

CROSS-REFERENCE TO RELATED APPLICATION

This application is based on and claims the benefit of priorities from earlier Japanese Patent Applications No. 2017-206864 filed Oct. 26, 2017; No. 2018-151302 filed Aug. 10, 2018; No. 2018-74858 filed Apr. 9, 2018; and No. 2018-022764 filed Feb. 13, 2018, the descriptions of which are incorporated herein by reference.

BACKGROUND

Technical Field

The present invention relates to an apparatus for optically reading information, such as information provided by an information code or information composed of characters.

Related Art

In recent years, work which reads information attached to items, such as picking work in factories, is carried out by using an information code reader, so that the work can be performed efficiently. This kind of information code reader is frequently realized as an optical information code reader which optically reads information codes, such as a QR code (registered trade mark) or optical information including character information, or a wireless tag reader which reads information wirelessly from RFID tags or IC cards.

When this kind of information code reader is used to perform reading work, it may be desirable to have a switch separately from the main frame of a reading apparatus depending on conditions of work to be performed by a worker who operates commands the reading apparatus to start its reading process. Meanwhile, it may be desirable not to adopt a configuration with which operation signals from the switch are transmitted to the main frame of the reading apparatus via wireless communication.

In such conditions, there is known an information reading apparatus in which a switch and an apparatus main frame are separated and configured to not to use wireless communication. For instance, PTL 1 (JP-A 2009404376) discloses such an information terminal apparatus which includes an apparatus main frame and a lever switch type of trigger physically separated from the apparatus main frame. The trigger is electrically connected to the main frame.

Moreover, a trigger switch is often used to be operated to start reading processes of information reading apparatuses including an optical information reader and a wireless tag reader. The optical reader optically reads various types of information, such as character information and information codes including a QR code (registered trademark). The wireless tag reader reads information from an RFID and/or an IC card in a wireless manner. In such applications, the trigger switch can be realized by a mechanical operation switch which has a mechanical driving portion. However, when the number of operations of the trigger switch increases, a probably of mechanical failure of the trigger switch also increases due to durability life for operations. This drawback can be improved by adopting an electrostatic switch as the trigger switch. An information reading apparatus provided with such electrostatic switch is disclosed by PTL 2 (JP-A H04-160580). This publication exemplifies a handheld type of information reading apparatus.

PRIOR ART REFERENCE

Parent Literature

[PTL 1] JP-A 2009-104376
[PTL 2] JP-A H04-160580

By the way, the information reading apparatus is used for various kinds of reading work, whose targets to be read are positioned in a variety of places. Hence, in a simple case an electric wire drawn out from the apparatus main frame is connected to the switch, the wire tends to be cut or broken due to a pull force applied to the wire in the reading work. In addition, in this simple wire connection, it is not easier to repair or exchange wires. Although connectors can be adopted to replace the switches or wires in an easier manner, this countermeasure results in an increase of parts for, for example, waterproof, as well as a complex structure.

In the foregoing electric capacity type of electrostatic switch adopted as a trigger switch, a touch operation is required which touches an outer surface of a chassis positioned immediately above an electrode of the electrostatic switch. In response to an amount of parasitic capacitance occurring between the electrode and the human body via the wall of the chassis, the ON and OFF actions of the switch can be detected with use of an ON/OFF detection threshold. In this detection, depending on amounts of the threshold, detection accuracy of touch operations sometimes reduces due to differences of sensitivity differences caused by individual differences among users. The differences of sensitivity can be said as differences of amounts of detected capacitance).

With consideration this issue, the ON/OFF detection threshold can be set to smaller, with no other countermeasures, so that the electrostatic switch responds to everybody's touch operations. This setting gives the electrostatic switch a wider response area, resulting in that an operator's action to release his or her finger or others for reliably turning the electrostatic switch off must be larger. In a case where repeated ON/OFF operations of the switch are required, touch operations which require spatially large movement of operator's fingers are also required to be repeated, whereby accelerating fatigue of the operator finger or other parts. In addition, there is another issue that the capacity of the electrostatic switch itself changes due to changes in surrounding temperature or approach of metals or other substances to the switch. When such changes in the capacity happens, it is frequently difficult to reliably detect ON/OFF states of the switch, thus being erroneous operations of the information reading apparatus.

Furthermore, in using the electrostatic switch as a trigger switch, values detected by an electrostatic sensor mounted in the switch may fluctuate on account of changes of surrounding environment such as surrounding temperature. If such fluctuations in the detected value are caused, it is required to adjust sensitivity of the electrostatic sensor in accordance with the changes of environmental conditions or other factors in order for maintaining the detection accuracy necessary for the trigger switch. When the foregoing adjustment is performed every time surrounding conditions or other factors change, work efficiency becomes lower.

SUMMARY

In consideration of the foregoing various issues, it is required to provide a separate configuration between the switch and the apparatus main frame with no use of wireless communication, in which the switch can still be exchanged easily.

It is further required to provide both improved operability of higher detection accuracy of the touch operations in using the electrostatic switch for detecting the touch operations.

It is further required to provide a switch configuration which can eliminates the necessity for abutment work in response to changes of surrounding conditions or other factors, whilst still obtaining a sufficient detection accuracy for touch operations on the switch.

In order to achieve the above object, a first mode provides an information reader characterized in that the information reader comprises:

a reader main unit provided with an information reading unit by which information of an object being read is readable; and a switch unit configured as a separate member from the reading main unit, wherein the reader main unit has a case and an inner pad configuring an electrostatic capacity type of switch used for reading of the information reading unit is housed in the case, the inner pad is located at a predetermined position in the case and assembled with the case from an inside thereof, the switch unit is provided with a touch electrode pad to which electrical charge is applied in response to a touch operation to the switch unit, a wiring line having both ends one of which is electrically connected to the touch electrode pad, and a transmission pad electrically connected to the other end of the wiring line, the transmission pad being assembled with the case from outside the case so as to positionally face the predetermined position which is set in the case.

A second mode provides an information reader, characterized in that the information reader comprises:

a reader main unit provided with an information reading unit by which information of an object being read is readable; and a switch unit configured as a separate member from the reading main unit, wherein the reader main unit has a case and an inner pad configuring an electrostatic capacity type of switch used for reading of the information reading unit is housed in the case, the inner pad is located at a predetermined position in the case and assembled with the case from an inside thereof, the switch unit is provided with a first pad to which electrical charge is applied, a second pad assembled with the case from outside the case so as to face the predetermined position which is set in the case, and a switching member is configured to perform a switchover between a supply state where the electrical charge applied to the first pad is supplied to the second pad and a non-supply state where the electrical charge applied to the first pad is not supplied to the second pad, in replay to operations of a movable member.

In order to achieve the object, a third mode provides an information reader, characterized in that the information reader comprises:

an information reading unit reading an object being read;

an electrostatic capacity type of switch equipped with a touch electrode, the touch electrode being subjected to a touch operation in starting a reading operation of the information reading unit;

a case housing therein the switch;

a detector detecting an electrostatic capacity provided by the touch electrode; and a controller controlling the information reading unit depending on operations to the switch, based on a result detected the detector, wherein the case is formed with a recess which enables at least a part of the touch electrode to be exposed outside, the at least part of the touch electrode allowing a direct touch operation.

A fourth mode provides an information reader characterized in that the information reader comprises:

an information reading unit reading an object being read;

an electrostatic capacity type of switch equipped with a touch electrode, the touch electrode being subjected to a touch operation in starting a reading operation of the information reading unit;

a case housing having an outer surface on which the touch electrode is formed;

a detector detecting an electrostatic capacity provided by the touch electrode; and a controller controlling the information reading unit depending on operations to the switch, based on a result detected the detector, wherein the touch electrode is elastically deformable, the case is formed with a second electrode to which a part of the elastically deformed touch electrode is touched, the detector is configured to detect a touch between the touch electrode and the part of the second electrode, and the controller is configured to perform a predetermined control when the detector detects the touch.

A fifth mode of the present invention provides an information reader, characterized in that the information reader comprises:

an information reading unit reading an object being read;

a case having an outer surface, a touch range indicating region being formed on the outer surface of the case and being used by a touch operation in main the information reading unit start a reading process;

an electrostatic capacity type of main sensor arranged in the touch range indicating region;

an electrostatic capacity type of auxiliary sensor arranged at a position different from the touch range indicating region; and a detector detecting the touch operation to the touch range indicating region, based on a dereference between detected values of the main and auxiliary sensors and a preset threshold, wherein the information reading unit is configured to start the reading process in reply to detection of the touch operation by the detector.

The foregoing reference numerals in brackets show correspondence to practical elements set forth in the embodiments which are as follows.

In the invention according to the first mode, the case of the reader main unit houses therein the inner pad assembled at a predetermined position in the case. The inner pad is provided as an electrostatic capacity of switch used for enabling the information reader unit to perform a reading process. The switch unit, which is a separate member from the reader main unit, includes the touch electrode pad to which electrical charge is applied based on a user's touch operation, the wiring line one end of which is electrically connected to the touch electrode pad, and the transmission pad to which the other end of the wiring line is electrically connected. The transmission pad is assembled with the touch detection region of the case from the outside of the case.

Accordingly, the transmission pad and the inner pad are capacitively coupled with each other via the case at the predetermined position of the case. It is therefore possible to enable the information reading unit to start a reading process by making a user touch the touch electrode pad of the switch unit physically separated from the reader main unit. Particularly, the transmission pad is assembled with the case at the predetermined position on the case, not directly linked with the inner pad, thereby being able to easily remove the transmission pad from the case. Accordingly, even if not using wireless communication and separating the switch unit from the reader main unit, the switch unit can be replaced by another one in an easier manner.

In the second mode, the case which configures the bailey of the unit, contains the inner pad which acts as an electrostatic capacity type of switch used for information reading. The inner pad is assembled with the case such that the inner pad become opposed to the predetermined position within the case. The switch unit, which is configured as a separate member from the reader main unit, includes the first pad to which a predetermined amount of electrical charge is supplied, and the second pad assembled on the outer side of the case so as face the predetermined position. Moreover, the switch unit further includes the switching member which performs a switchover between a supplied state where the predetermined amount of electrical charge supplied to the first pad responsively to activation of the moveable device is also supplied to the second pad and a non-supplied state where such electrical charge is not supplied to the second pad.

Hence, the second pad and the inner pad can be capacitive-coupled with each other at the predetermined position via the case. By activating the movable device of the switch unit, the information reading of the information reading unit can be started by the hand even if a cotton work glove is loaded on the hand. In particular, the second pad is arranged to the predetermined position of the case from just the outside thereof, which means that there is no wiring correction to the inner pad, thus removing the second pad easily from the case. As a result of this separate configuration provided between the switch unit and the reader main unit with no use of wireless communication results in an easier replacement of the switch unit.

In the third mode, the electrostatic capacity of the electrostatic capacity type switch, which is generated with the touch electrode, is detected the detector. Based on detected results, the information reading unit is controlled by the controller in response to operations at the switch. The case has a recess which makes it possible that at least a part of the touch electrode is exposed to the outside so as to be touched directly.

Thus, the recess can be used to directly touch the touch electrode, the electrostatic capacity detected when touch operations are performed can be made larger, in comparison with the configuration which allows an operator to touch the touch electrode via the wall of the case. For this reason, influence of differences of sensitivity of the individual operators, changed in the ambient temperature, and/or being approached by metal objects or others on accuracy of detecting the torch operations can be reduced or suppressed. Moreover, since the electrostatic capacity detected in response to touch operations can be made larger, the determining threshold for for determining the switch ON/OFF actions can be set lower, accordingly to the increased electrostatic capacity. It is thus possible to improve operability of the switch, without performing a touch operation which needs a larger separation of the finger from the touch electrode. Even when using the electrostatic capacity type switch to detect touch operations, both a higher operationality and a higher detection accuracy can be provided to touch operations.

In the fourth mode, the electrostatic capacity of the electrostatic capacity type switch, which is generated to the touch electrode, is detected by the controller. Based on detected results, the information reading unit is controlled by the controller in response to operations at the switch. The case has a second electrode to which a part of the elastically deformed touch electrode is contacted. When such a contact is detected, the reading process is carried out by the controller.

In this way, since the touch electrode can be touched directly, the electrostatic capacity detected when an operator's touch operation is performed can be larger, compared with a touch operation performed via a case wall. Hence, touch detection accuracy can be suppressed from being influenced by irregulates in sensitivity which are due to the individual differences and/or irregularities resulting from changes in the ambient temperature or being approached by metallic or other substances. Moreover, since the electrostatic capacity detected in response to touch operations can be made larger, the determining threshold for determining the switch ON/OFF operations can be set lower, accordingly to the increased electrostatic capacity. It is thus possible to improve operability of the switch, without performing a touch operation which needs a larger separation of the finger from the touch electrode. Even using the electrostatic capacity type switch to detect touch operations, both a higher operationality and a higher detection accuracy can be provided to touch operations.

Particularly, when there is detected a contact between the part of the touch electrode and the second electrode, the controller starts the predetermined control. The predetermined control can be set to be the same as control performed when a detected value of the electrostatic capacity is equal to or less (or equal to or more) than the threshold which is led to on-determination. Hence, the switch can serve as the electrostatic switch as well as the mechanical contact switch which uses the contact between the part of the touch electrode and the second electrode. Therefore, the touch operations can be detected by the two types of detection mechanisms, so that, even when there occurs a failure in any one of the two types of detection mechanisms, such as occurrence of abnormality in the electrostatic capacity detection circuit or a contact failure in the mechanical switch, it is avoidable that the information reader does not work or such an accident can be reduced. This will also be led to higher and reliable detection of the touch operations.

Moreover, the predetermined control may be control which is different from that performed when when a detected value of the electrostatic capacity is equal to or less (or equal to or more) than the threshold which is led to on-determination. Similarly to the above, this can provide two different functions of the electrostatic switch and a mechanical switch. For instance, the electrostatic switch function can be given to control for reading of the information reading unit, while the mechanical switch function can be given to control of on/off switching options of a power supply of the information reader.

In the fifth mode, the touch range indicating region is formed to receive a touch operation required to start reading of the information reading unit. In the touch range indicating region, the main sensor is arranged, and the auxiliary sensor is arranged positionally differently from the touch range indicating region. In addition, the count change amount, which is a difference between the counts based on the main and auxiliary sensors, and the preset threshold are compared with each other, and a touch operation to the touch range indicating region is detected, so that the reading process is started by the information reading unit.

In this configuration, the main and auxiliary sensors have the same change tendency in their outputs to changes in the surrounding temperature. Thus, a difference between the outputs of the main and auxiliary sensors are not influenced so easily by changes in the surrounding temperature.

In this way, the count change amount which resists changes in the surrounding environmental conditions is generated and used for comparison with the preset threshold. It is therefore possible to maintain an accuracy degree fully satisfying for detecting touch operations.

Meanwhile, when the touch detection region is touched for starring the reading, a detected value from the main sensor changes largely relatively to a detected value form the auxiliary sensor, whereby a touch operation to the touch detection region can be detected based on the difference between the detected values from both sensors. It is therefore possible to maintain an accuracy degree fully satisfying for detecting touch operations, without requiring particular adjustment, even in using the reader in changes of environmental conditions.

BRIEF DESCRIPTION OF THE DRAWINGS

In the accompanying drawings:

FIG. 23 is a perspective view explaining an information reader according to a ninth embodiment;

FIG. 24A shows the information reader shown in FIG. 23, which is a plan view of the information reader;

FIG. 24B shows the information reader shown in FIG. 23, which is a side view of the information reader;

FIG. 29 is a chart comparing counts with a determining threshold in the open state, the little-finger touched state, the thumb touched state, the directly touched state;

FIG. 33A is a plan view of an information reader according to an eleventh embodiment;

FIG. 33B is a side view of the information reader shown in FIG. 33A;

FIG. 36 is a perspective view outlining an information reader according to a twelfth embodiment;

FIG. 37A is a plan view of the information reader shown in FIG. 36;

FIG. 37B is a side view of the information reader shown in FIG. 36;

FIG. 44 is a side view of an information reader according to a second modification of the twelfth embodiment, in which the position of the auxiliary sensor is shown;

DETAILED DESCRIPTION OF THE PREFERRED EMBODIMENTS

With reference to the accompanying drawings, various embodiments to which various modes of an information reader according to the present invention are applied will now be described.

First Embodiment

With use of FIG. 1 to FIG. 6, a first embodiment of an information reader will now be described.

Figure 1:
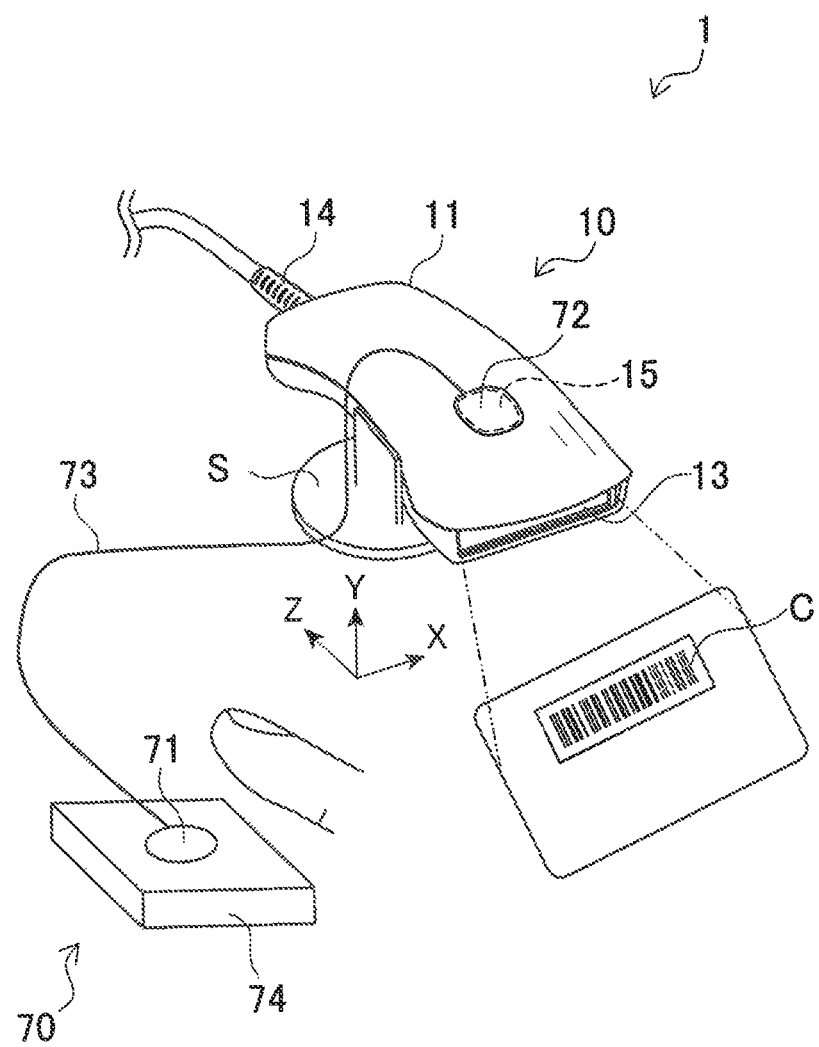
FIG. 1 is a perspective view showing an information reader according to a first embodiment.
Figure 2:
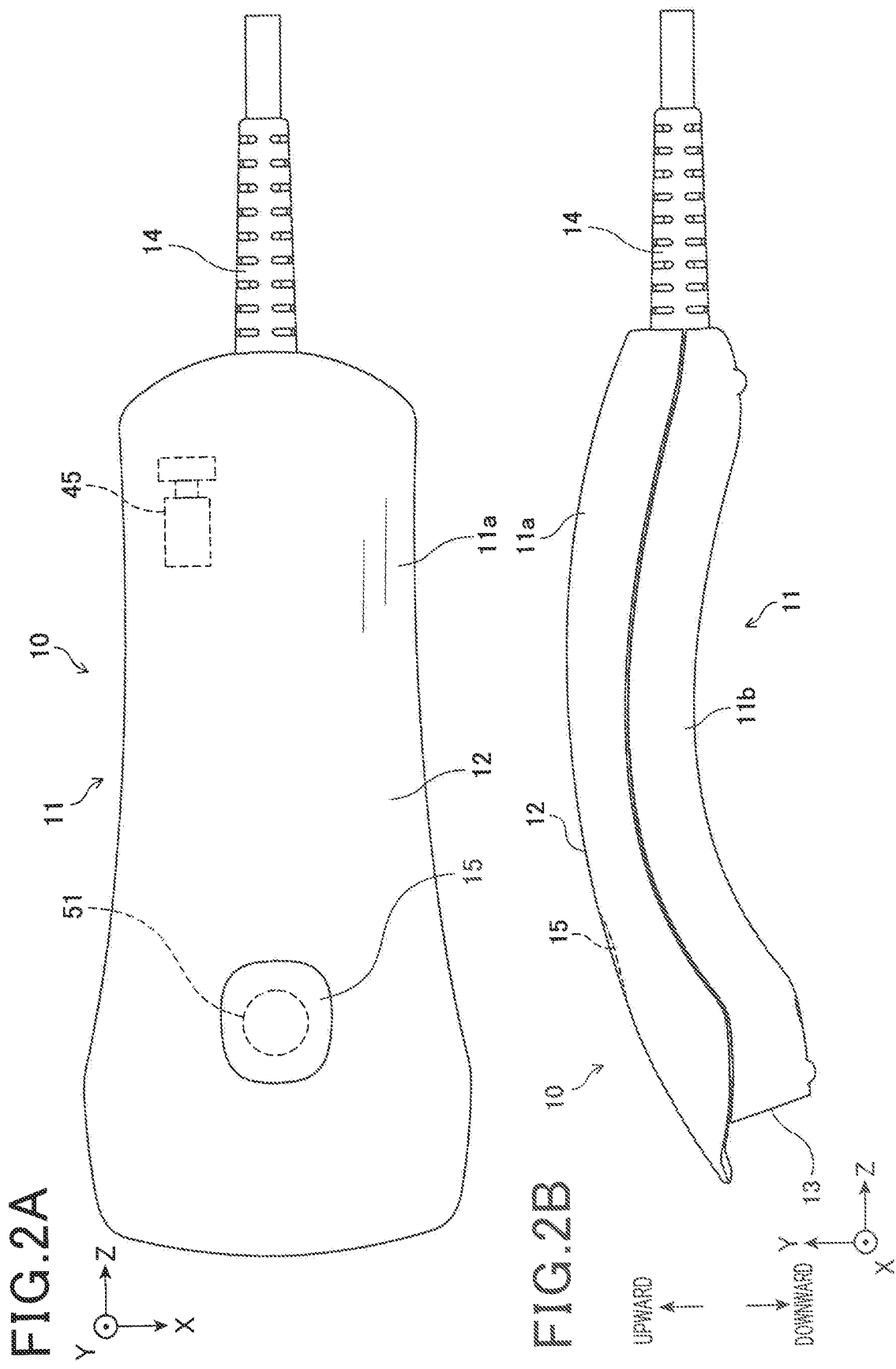
FIG. 2A is a plan view showing a reader main unit of the information reader shown in FIG. 1.
FIG. 2B is a side view of the reader main unit.

An information reader 1 shown in FIG. 1 is provided as a member which captures information which should be read optically, such as information codes (e.g., bar codes and two-dimensional codes), and optically reads (i.e., decodes) contents provided by the information.

The information reader 1 is provided with a reader main unit 10 an information reading unit capable of optically reading an information code C or consents of other information mediums and a switch unit 70 provided as a separate member switchable to the information main unit 10. The information reader 1 is configured such that the information reader 1 can be used as both a stationary type information reader mounted on a mounting rack S (as shown in FIG. 1) or other stationary members, and a mobile type reader. In the mobile type information reader, the switch unit 70 is separated so that the reader main unit 10 is left and held by a user for optically reading information.

First of all, the reader main unit 10 will be detailed which is readable of, as a sole unit, optically reading an information code C.

As shown in FIGS. 2A and 2B, the reader main unit 10 is equipped with a package serving an outer case. The package 11 is composed of an upper case 11a and a lower case 11b which are assembled with each other. A circuit unit 20, which includes various electrical components, is housed in the package 11. The upper and lower cases 11a and 11b are made of a synthetic resin such as ABS resin. The cases 11a and 11b can be engaged with each other by being engaged at a plurality of engaging points arranged inside the package, without using any engaging member. The package 11 has a longitudinal direction (corresponding to the Z-axis direction) and, at one of two longitudinal ends of the package 11, a reading window 13 is formed to taking in light reflected from, for example, an information code, and at the other end, a cable attaching portion 14 is formed. Incidentally, in the present embodiment, based on the foregoing Z-axis direction, an X-axis direction (the width direction) and a Y-axis direction (the height direction having upward and downward directions, as shown in FIG. 2B) can be set to form an XYZ orthogonal coordinate system (refer to FIGS. 1, 2A and 2B) for a simplified explanation. This XYZ orthogonal coordinate can be applied to other cases which will be described later, although not shown.

In order to make a user hold the case 11 from the upper case site and direct the reading window 13 thereof toward an object to be read in an easier manner, the case 11 is entirely curved so that a longitudinally central part of the case is projected upward so as to represent an arch when being viewed from a side thereof, as shown in FIG. 2B. Additionally, on and in an upper surface 12 of the upper case 11a, there is provided a touch detection region 15 which is depressed locally and slightly downward from the upper surface 12. This touch detection region 15 is located close to the reading window 13, and intended to make it easier to clearly show where a user should touch here in using this reader in a portable mode. Still additionally, the case 11 has a gripping portion positioned in a range ranging from the touch detection region 15 to the cable attaching portion 14 in the longitudinal direction. This gripping portion is intended to make a user touch the touch detection region 15 more easily in a state where the user grips the gripping portion. The gripping portion is formed to be narrower in width than a reading portion positionally including the reading window 13 and the touch detection region 15.

Figure 3:
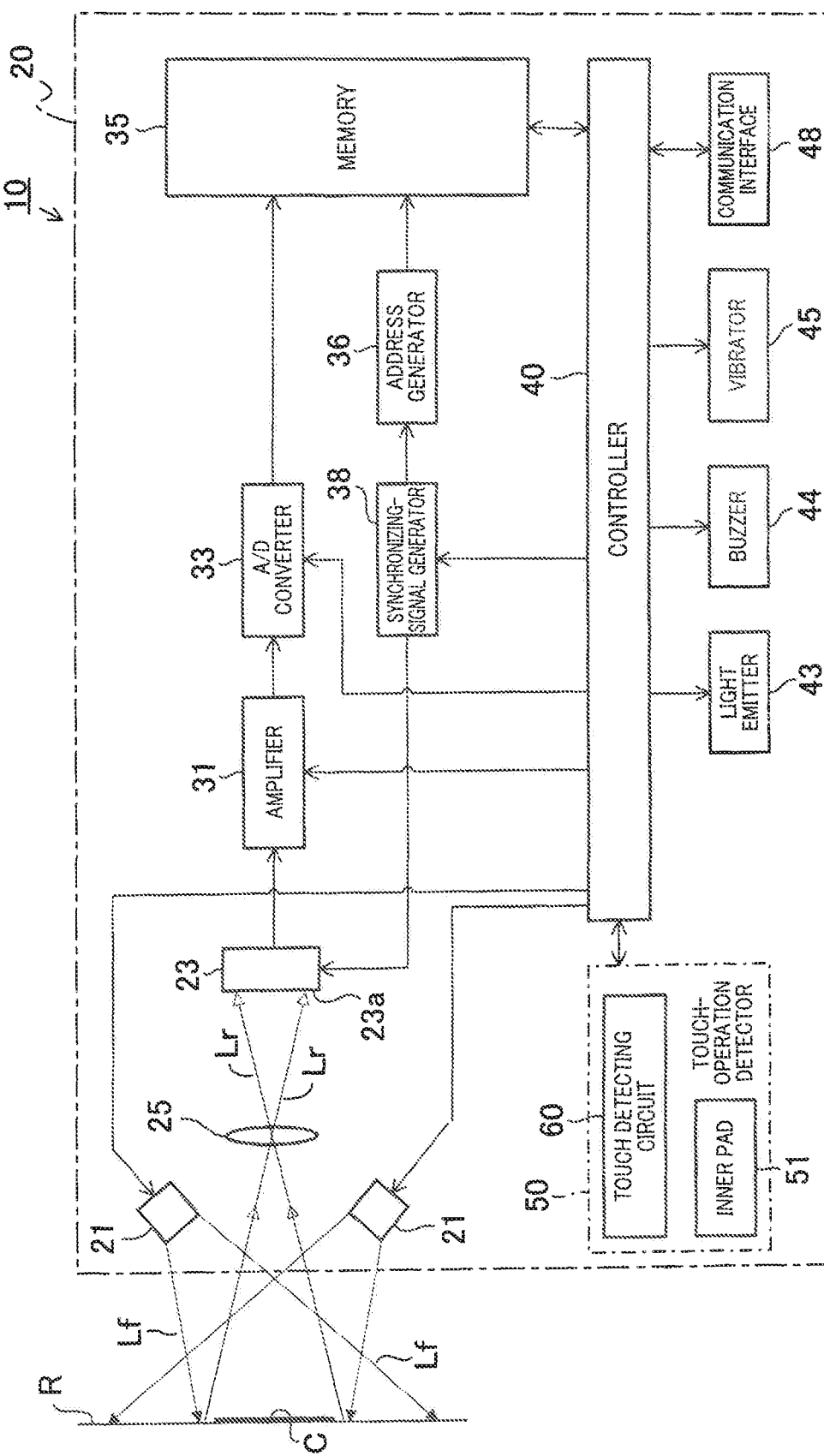
FIG. 3 is a block diagram exemplifying the electrical configuration of the reader main unit shown in FIG. 1.

The reader main unit 10 has an electrical configuration shown in FIG. 3.

As shown in FIG. 3, the circuit unit 20, which is mounted in the case 11, is provided with main components including illumination light sources 21, a light receiving sensor 23, and an imaging lens 25, which are categorized as an optical system; and a memory 35 and a controller 40, which are categorized as a microcomputer system.

The optical system is divided into a light emitting system and a light receiving system. The light emitting system includes the lighting sources 21, which function as illuminating means which illuminate illumination light Lf. The lighting sources 21 are provided with, for example, red LEDs and lenses arranged respectively in front of emission sides of the LEDs.

The light receiving system includes the light receiving sensor 23 and the imaging lens 25. Of these, the light receiving sensor 23 is, for example, an area sensor in which light receiving elements are arranged two-dimensionally. The light receiving elements are composed of, for example, solid-state image sensing devices, such as C-MOSs or CCDs. The light receiving sensor 23 has an approximately-rectangular light receiving surface 23a functioning as a light receiving area of the sensor, and is mounted on a printed-wiring board (not shown) such that the light receiving surface 23a is able to receive incident light received via the imaging lens 25.

The imaging lens 25, which is configured to collect incident light incoming from the outside via the reading window 13, collects an optical image onto the light receiving surface 23a of the sensor 23. In the present embodiment, the information reader 1 is used in such a manner that the illumination light Lf emitted from the lighting sources 21 is reflected by an information code C itself or an medium R (such as goods) on which an information code C is attached, reflected light Lr is collected by the imaging lens 25 so as to make the collected light Lr produce an optical code image on the light receiving surface 23a of the light receiving sensor 23.

The microcomputer system is provided with an amplifier 31, an A/D converter 33, a memory 35, an address generator 36, a synchronizing-signal generator 38, the controller 40, a touch-operation detector 50, a light emitter 43, a buzzer 44, a vibrator 45, and an communication interface 48.

An image signal (in an analogue form) outputted from the light receiving sensor 23 is then amplified by the amplifier 31 at a preset gain prepared in the amplifier 31, and then converted from the amplified anagoge signal to a corresponding digital signal by the A/D converter 33. The digitized image signals, that is, image data (or image information) are then stored in a predetermined storing area of the memory 35 which is composed of known memory devices such as a ROM or a RAM. The synchronizing-signal generator 38 is capable of generating a synchronizing signal given to the light receiving sensor 23 and the address generator 36. In response to the synchronizing signal, the address generator 36 is able to generate storing addresses for the image data to be stored in the memory 35.

The controller 40 is configured to have, as its essential element, a microcomputer including a CPU, a system bus, and an input/output interface. The microcomputer is provided to be responsible to controlling overall operations of the reader main unit 10. In the present embodiment, in combination with the memory 35, the controller 40 configures an information processing apparatus which presents an image processing function. Practically, the controller 40 (i.e., the CPU) is configured to have functions of analyzing image data of an information code C, which are stored in the memory, and, using the analyzed image data, decoding data recorded in the information code C using a known decoding technique. A reading process is realized by the foregoing analyzation and decoding processes. In the present embodiment, a combination of the controller 40 and the light receiving sensor 23 exemplifies an information reading unit to read information about an object to be read.

Through not shown, in the controller 40, the CPU is communicably connected to various input and output apparatus via the internal input/output interface. In the present embodiment, such apparatuses include the light emitter 43, buzzer 44, vibrator 45, and the communication interface 48. Under control of the CPU, light emission from the light emitter 43, sound generation from the buzzer 44, such as beep sound or alarming sound, drive of the vibrator 45, and control of the communication interface 48 are activated in a controlled manner.

Moreover, the controller 40 is connected to the touch-operation detector 50 which provides, to the controller 40, signals depending on whether or not there is a user's touch operation at the touch detection region 15. Hence, responsively to information from the touch-operation detector 50, the controller 40 is able to detect a user's touch operation performed at the touch detection region 15. When such a user's touch operation is detected at the touch detection region 15, the foregoing reading process is started.

The touch-operation detector 50 is provided so as to function an electrostatic capacity type of switch and is equipped with an inner pad 51 and a touch detecting circuit 60. As shown in FIG. 2A, the inner pad 51 has a specifies areal size and arranged within the case 11 such that the inner pad 51 is assembled with the upper case 11a from its inner surface side at the touch detection region 15. Hence, when a user touches the touch detection region 15 with a user's finger, an electrostatic capacity Cf (i.e., stray capacitance) caused due to the touch operation is forcibly added to the inner pad 51 (refer to FIG. 4).

The touch detecting circuit 60 is an electrical circuit configured to receive a switching signal CLK from the controller 40 and, responsively to this signal CLK, convert the electrostatic capacity of the inner pad 51 to a corresponding count N (counted value). This touch detecting circuit 60 will now be detailed its functions with reference to FIG. 4.

Figure 4:
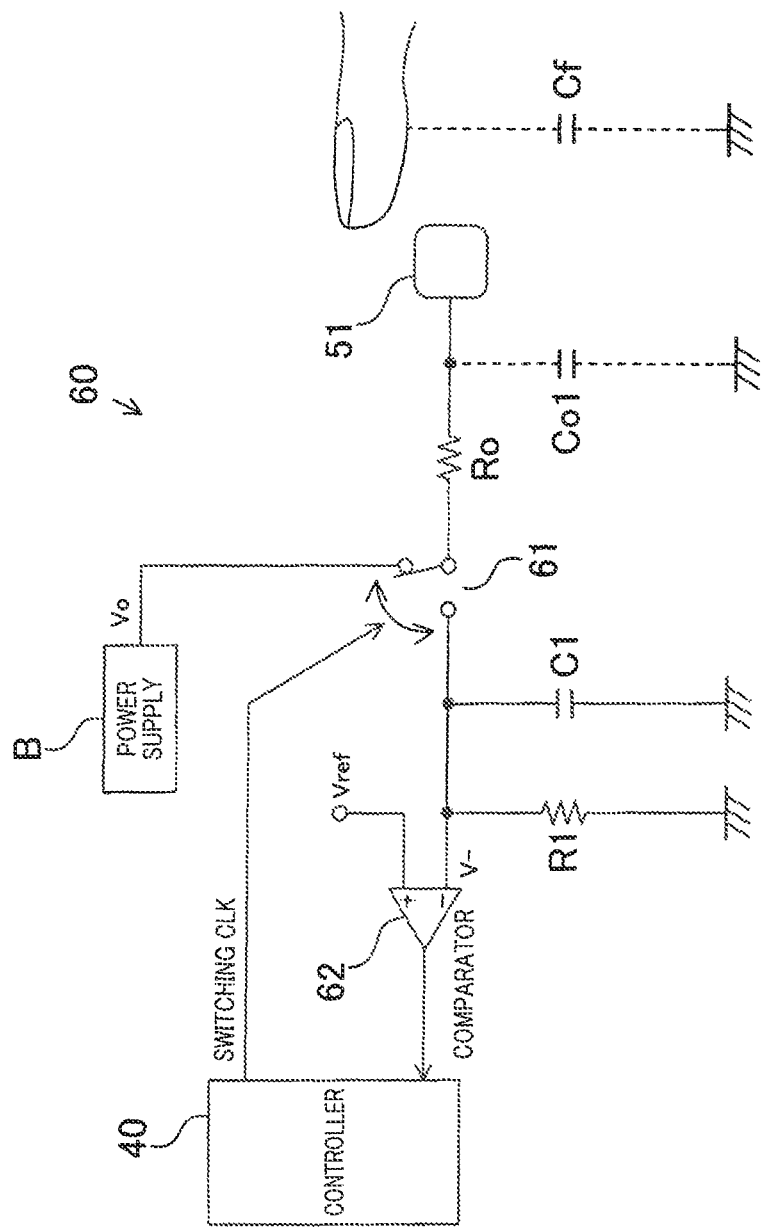
FIG. 4 is a block diagram exemplifying a touch detecting circuit incorporated in the reader main unit.

As shown in FIG. 4, the touch detecting circuit 60 has an electrical switching element 61, a circuit protecting resistor Ro, a capacitor C1, a discharging resistor R1, and a comparator 62. A power supply B powers this circuit, whereby a stray capacitance Co1 on the sensor wiring is charged.

When measuring the electrostatic capacity of the inner pad 51, electrical connections of the sensor line are switched between the power supply B side and the comparator 62 side, in response to the switching operations of the switching element 61 driven by the switching signal CLK. When the sensor line is electrically connected to the line of comparator 62, electrical charge accumulated at the stray capacitance Co1 migrate to the capacitance C1, resulting in that the negative input voltage V− of the comparator 62 increases. In contrast, the sensor line is electrically connected to the line of the power supply B, the negative input voltage V− decreases gradually due to discharge by the discharging resistor R1 and, in parallel with this voltage decease, the stray capacitance Co1 is again charged.

By making the switching element 61 repeat the foregoing switching operations, the negative input voltage V− which has been increased gradually reaches a positive input voltage (i.e., a fixed reference voltage) Vref of the comparator 62. And when the negative input voltage V− exceeds positive input voltage Vref, the output of the comparator 62 is switched from Hi (high level) to Lo (low level), according to which the controller 40 stops the output of the switching signal CLK. The controller 40 is configured to count the number of switching times measured in a period of time ranging from the Hi output of the comparator 62 to a time when the output switched to the Lo output, which makes it possible to convert the electrostatic capacity of the inner pad 51 to a corresponding count N.

As described, when the touch detection region 15 is touched with a user's finger or others, the electrostatic capacity Cf (stray capacitance) caused due to the touch is electrically added to the inner pad 51, thus increasing the sensor-side electrostatic capacity to "C01+Cf", thus increasing an accumulated amount of electrical changes thereat. For this reason, when the foregoing switching operations are repeated, the negative input voltage V− will exceed the positive input voltage Vref earlier than a state where the touch detection region 15 is not touched, which makes the number of switching times smaller. This results in a decreased count N. In other words, the count N measured using the inner pad 51 changes depending on whether or not there is a touch operation at the touch detection region 15.

Figure 5:
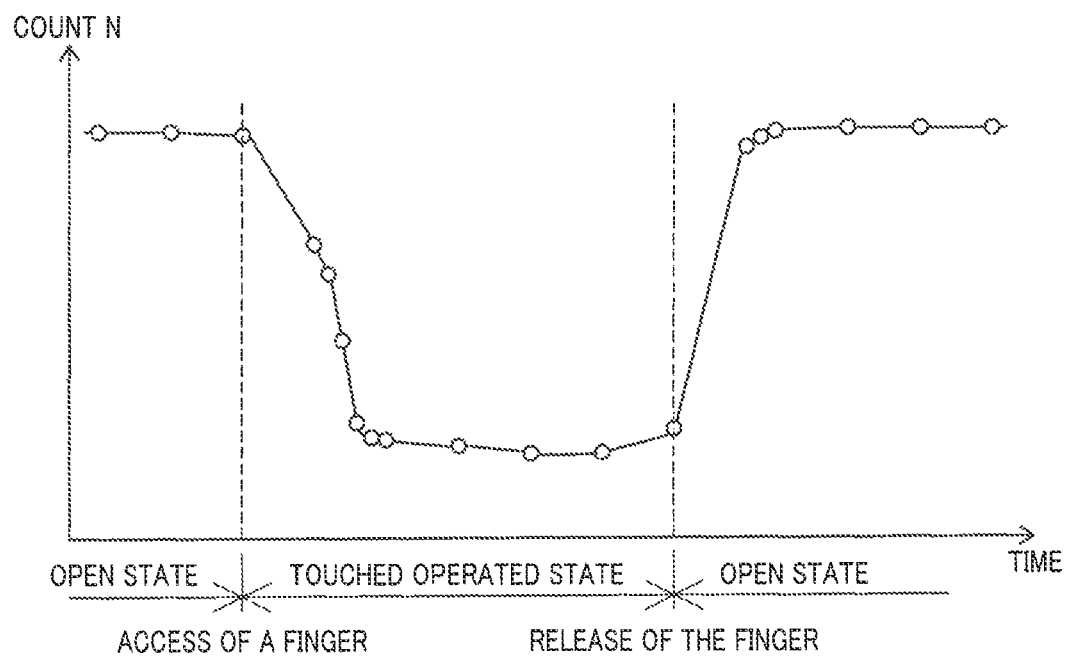
FIG. 5 is a graph explaining changes in counts measured depending on a touch operation of an operator.

For instance, as exemplified in FIG. 5, the count N is measured as a comparatively larger value when an open state is established where there no substance around the touch detection region 15, whist the count N becomes a smaller value in a touched operated state where a user's finger touches or approaches the touch detection region 15. Therefore, when the measured count N equal to or less than a preset threshold, it is determined that there has been a user's touch operation, whereby the foregoing reading process carried out by the controller 40 is started. This touch operation is the released if the user's finger is released from the touch detection region 15, thereby rerunning to the open state. Hence, the measured count N becomes larger again, so that the touch operation detecting state is again prepared.

The switch unit 70, which is configured as a separate member from the reader min unit 10, will now be detailed.

As shown in FIG. 1, the switch unit 70 is provided with a touch electrode pad 71 and a transmission pad 72 and both pads 71 and 72 are electrically connected to each other by a wiring line 73. In a case the information reader 1 is used as a stationary type information reader, the touch electrode pad 71 is supported by a pad supporter 74 and is applied with electrical charge generated in accordance with a user's touch operation. This touch electrode pad 71 is covered by a film made of resin such polyimide resin to resist water or oxidization. Similarly to this pad 71, the transmission pad 72 is also covered by a resin-made film, such as a polyimide-made film. To facilitate the wiring of the touch electrode pad 71 to the transmission pad 72, the wiring line 73 is composed of, by way of example, a bendable cable and/or a flexible printed wiring board (FPC).

In cases where the information reader 1 is used as a stationary type information reader provided with the thus-configured switch unit 70, the transmission pad 72 is assembled with the touch detection region 15 from the outside of the case 11. This assembling can be cone with use of a double-stick tape or other similar adhesive means, so that the transmission pad 72 can be assembled with the touch detection region 15 in a detachable manner.

Figure 6:
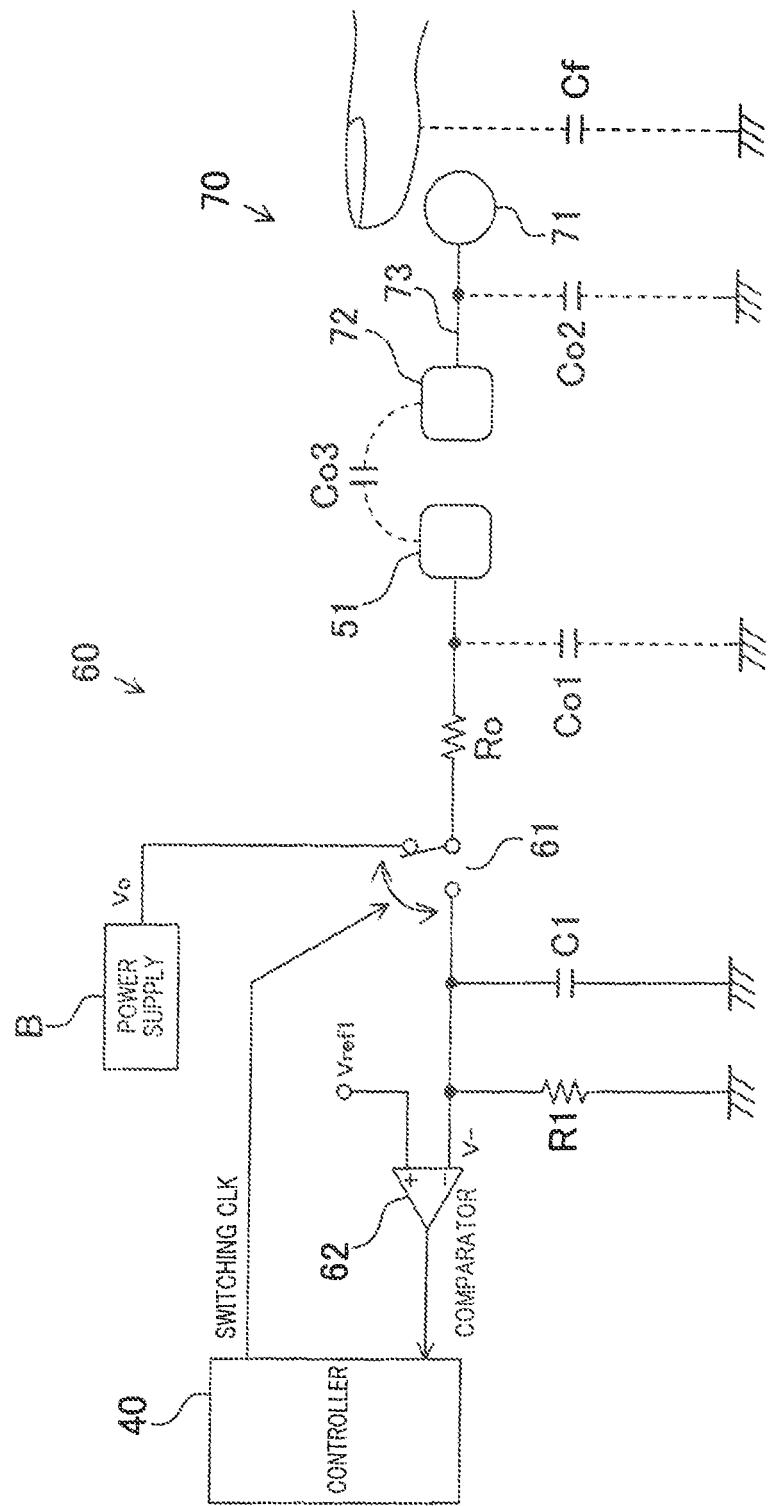
FIG. 6 is a block diagram explaining an electrical relationship established between the touch detecting circuit and a switch unit.

This assembly makes it possible to capacitively couple, as shown in FIG. 6, both the transmission pad 72 located outside the case 11 and the inner pad 51 located inside the case 11 so that such pads 72 and 51 are faced with each other via a thickness interval) of the case 11 therebetween (refer to an electrostatic capacitance Co3 shown in FIG. 6).

In this coupling configuration, measurement of the electrostatic capacity of the touch electrode pad 71 is also performed by switching the switching element 61 synchronously with the switching signal CLK in which the sensor line is selectively connected to the line to the power supply B and the line to the comparator 62. In these selective connections, when being connected to the line to the comparator 62, electrical change accumulated in both the stray capacitance Co1 and the stray capacitance Co2 at the switch unit 70 is forced to migrate to the capacitor C1, thus increasing the negative input voltage V− at the comparator 62. In contrast, when being switched to the line to the power supply B, the negative input voltage V− is forced to decrease gradually due to the discharging resistor R1, during which time both the stray capacitances Co1 and Co2 are changed with electrical charge again.

Making the switching element 61 repeat the switching operations allows the negative input voltage V− to increase gradually and finally reach and exceed the positive input voltage Vref1 (i.e., a reference voltage). In response to such an event, the output of the comparator 62 is switched from Hi to Lo and the controller 40 stops the switching signal CLK from being outputted. The controller 40 counts the number of times of switching actions performed during a period of time ranging from the comparator output Hi state to a time when the output is switched to the comparator output Lo. With this counting, the electrostatic capacity of the touch electrode 71 is converted to a corresponding count N.

For this reason, when the touch electrode pad 71 is touched by for example, a user's finger, an electrostatic capacity Cf generated due to the touched finger is added to the inner pad 51 via the transmission pad 72, whereby an accumulated amount of electrical charge increases so that the count N decreases. That is, a touch operation at the touch electrode pad 71 can be transmitted to the reader main unit 10, so that the switch unit 70 is able to control start of the foregoing reading process carried out by the controller 40. In the present embodiment, the touch detection region 15 provides a predetermined position or positional region at which the transmission pad 72 is assembled with the case 11 from outside of the case 11.

As described above, the information reader 1 according to the present embodiment is provided with the reader main unit of which outer shell is provided by the case 11. The case 11 houses inside thereof the inner pad 51 which composes the electrostatic capacity type of switch needed by the information reading unit for reading information. This inner pad 51 is assembled with the touch detection region 15 of the case 11 from the inside of the case 11. The switch unit 70, which is a separate member from the reader main unit 10, includes the touch electrode pad 71 to which electrical charge is applied based on a user's touch operation, the wiring line 73 one end of which is electrically connected to the touch electrode pad 71, and the transmission pad 72 to which the other end of the wiring line 73 is electrically connected. The transmission pad 72 is assembled with the touch detection region 15 of the case 11 from the outside of the case 11.

Accordingly, the transmission pad 72 and the inner pad 51 are capacitively coupled with each other via the case 11 at the touch detection region 15 of the case 11. It is therefore possible to enable the information reading unit to start a reading process by making a user touch the touch electrode pad 71 of the switch unit 70 physically separated from the reader main unit 10. In other words, without directly touching the touch detection region 15 of the case 11, the reading process can be commanded remotely.

The transmission pad 72 can simply be assembled with the touch detection region 15 of the case 11 from outside thereof, with no direction connection with the inner pad 51. The transmission pad 72 can therefore be detached easily from the case 11. Hence, even if the switch unit 70 is physically separated from the reader main unit 10 and is not connected to the reader main unit 10 via wireless communication, the switch unit 70 can be replaced easily with a new one.

In particular, the transmission pad 72 is detachably assembled with the touch detection region 15 of the case from outside the case 11 by using a double-stick tape or other sticking means. The switch unit 70 can thus be replaced by another one in an easier manner.

In the present embodiment, the transmission pad 72 is covered by a resin film made of polyimide, thus raising resistance to poor environment where water or water drops may intrude into a narrow gap between the transmission pad 72 and the touch detection region 15. Practically it is possible to avoid the transmission pad 72 from rusting or from causing erroneous contact thereat.

Second Embodiment

Figure 7:
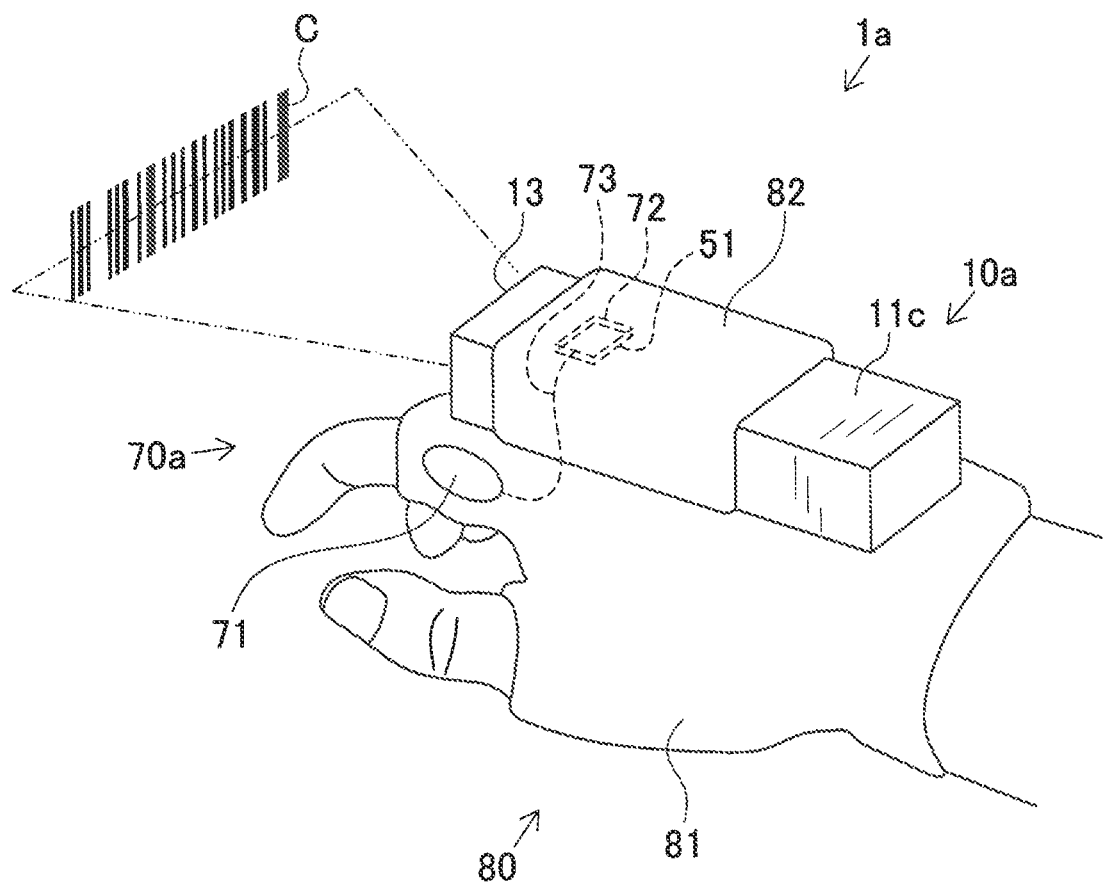
FIG. 7 is a perspective view showing an information reader and how to use the information reader according to a second embodiment.

With reference to FIG. 7, an information reader according to a second embodiment will now be described.

The information reader according to the second embodiment differs from the information reader explained in the first embodiment in that a holder is loaded to a hand of a user who is in charge of reading code information and the reader main unit is held by the holder. In the second embodiment, components functionally similar or equivalent to those in the first embodiment are given the same reference numerals for avoiding redundant explanations or simplifying the explanations.

As shown in FIG. 7, an information reader 1a of the present embodiment is equipped with a reader main unit 10a, a switch unit 70a, and a holder 80 which holds the reader main unit 10a and the switch unit 70a. Of these component's, the reader main unit 10a and the switch unit 70a have the reading function equivalent to the reader main unit 10 and the switch unit 70 which have been described in the first embodiment, respectively.

The reader main unit 10a is provided with a case lie formed into an approximate box shape, in which a circuit unit functionally corresponding to the foregoing circuit unit 20 is housed. On the upper surface of the case 11c, a touch detection region 15 is formed and a rectangular reading window 13 is formed on a body side close to the touch detection region 15. The touch-operation detector 50, which has been explained, includes the inner pad 51, and this inner pad 51 is assembled with the touch detection region 15 from the inside of the case 11c and arranged inside the case 11c. The reader main unit 10a is driven by batteries housed in the case 11c, with no cables drawn outside, and is able to communicate with external devices to transmit read data thereto.

As shown in FIG. 7, the holder 80 includes a glove 81 loaded to a hand of an operator in charge of reading work and a holding member 82 holding the reader main unit 10a on the back of the operator hand. Practically, the holding member 82 rolls up the reader main unit 10a. The glove 81 is formed to allow the five fingers to partially appear outside and to locate a touch electrode pad 71 at an outer surface of a root portion of the first finger. This outer surface of the rood portion is opposed to the thumb, as shown in FIG. 7, so that the touch electrode pat 71 can be touch-operated by the thumb.

The holding member 82 is provided such that the reading window 13 of the held reader main unit 10a is directed along a direction of the fingers of the operator's hand which wears the glove 81. In the holding member 82, a transmission pad 72 is arranged so as to come into contact with the touch detection region 15 of the reader main unit 10a. Hence, in a state where the reader main unit 10a is rolled up by the holding member 82 (so that the unit 10a is held by the holding member 82), the transmission pad 72 and the inner pad 51 are made to be capacitively-coupled with each other via the case 11c.

Further, there is provided a switch unit 70a, which includes the touch electrode pad 71 arranged on the glove 81, the transmission pad 72 attached to the holding member 82, and a wiring line 73 electrically connects the touch electrode pad 71 and the transmission pad 72.

During a reading work which uses this information reader 1a whose reader main unit 10a is supported by the holder 80 as shown in FIG. 7, an operator touch-operates the touch electrode pad 71 on the holder 80 by the thumb. In response to this touch operation, the controller 40 which is checking a measured count N determines whether or not the count N becomes equal to or less than the preset threshold. If such a condition is met, i.e., the touch operation is detected, the foregoing reading process is started.

As described, in the information reader 1a of the present embodiment, the holder 80 is employed which can be loaded to a hand of the operator and can hold the reader main unit 10a so as to roll up the unit 10a. The touch electrode pad 71 is arranged on the outside the holder 80. Due to this Waring structure, the operator can free his or her both hands, with no need to grip the reader main unit 10a and the switch unit 70a by the hand and, in addition, with no restriction to operator's movement, i.e., with no interference from the cable to the movements. It is thus possible to improve workability including the reading process.

Particularly, the holder 80 is loaded to an operator's hand and the touch electrode pad 71 is located so that the thumb of the hand on which the holder 80 is worn can touch the pad 71. This makes it possible that the touch electrode pad 71 is touched by only one hand wearing the hold 80, thus further improving the workability.

As a modification, the touch electrode pad 71 can be arranged at another position on the holder 80. The holder 80 is not limited to the structure in which the thumb is used to for the touch operation, but may be formed to allow another finger such as the first finger to be in charge of touching the touch electrode pad 71. As another modification, the touch electrode pad 71 can be arranged at a position on the holder 80 worn on one hand of an operator such that the operator's other hand can touch the touch electrode pad 71 on the operator's one hand.

Figure 8:
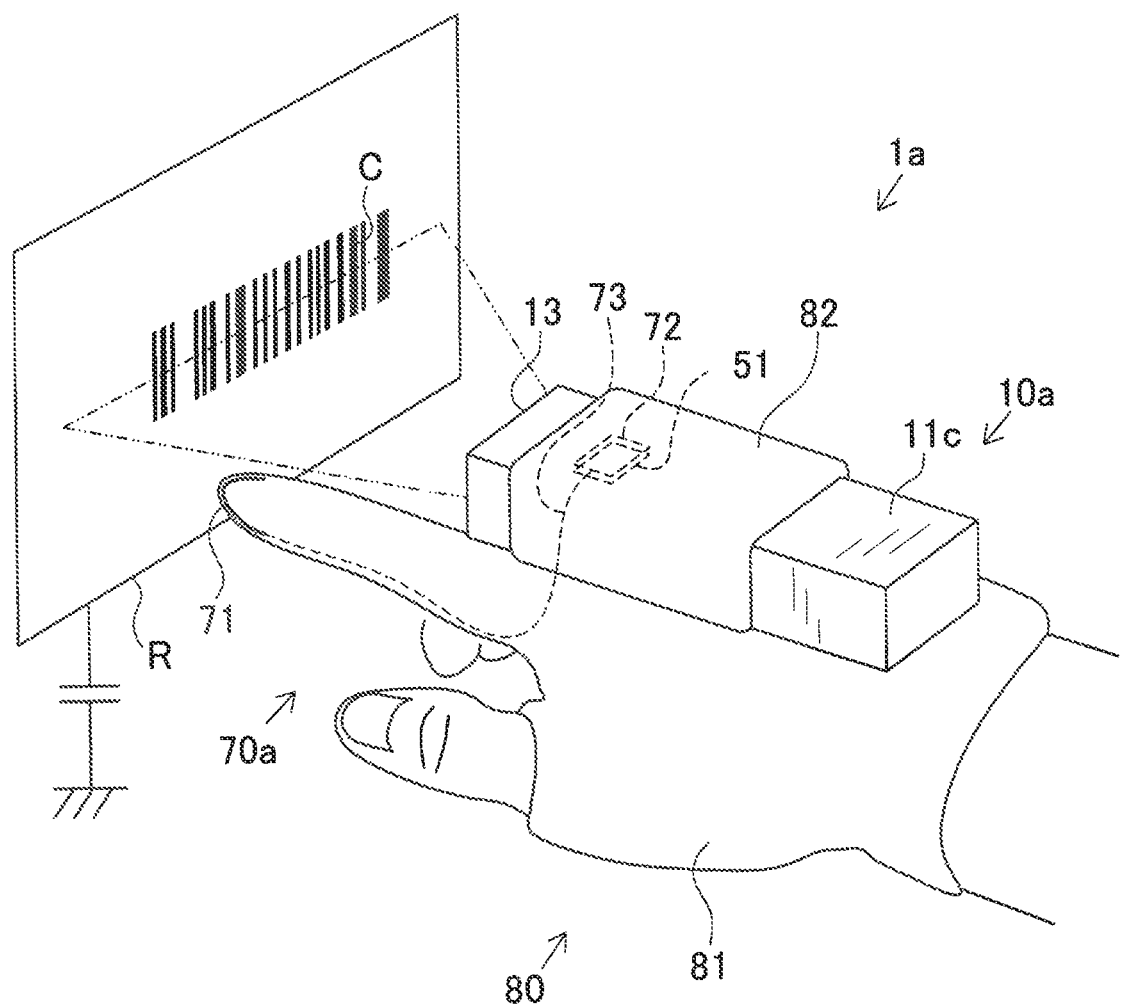
FIG. 8 is a perspective view showing an information reader according to a first modification of the first embodiment.

Another modification is shown in FIG. 8, in which the touch electrode pad 71 may be arranged an outside portion of the globe 81 which is formed to cover the tip of a finger such as the first finger of an operator. Hence, it makes it possible that, by making the finger tip covered by the touch electrode pat 71 touch an item provided with an information code C, an information code C itself, or another structure, a touch operation can be achieved easily. In other words, a sensory touch operation which can be achieved by making the finger tip touch an information code C or another thing enables a reading operation to be started.

In particular, in this configuration shown in FIG. 8, the holder 80 has the holding member 82 which holds the reader main unit 10a so as to direct the reading window 13 in a direction along which the finger tip covered by the touch electrode pat 71 is extended. In a touch operation, only making the touch electrode pat 71 on the finger tip touch an information code C or an item with an information code C easily allows the reading window 13 to be directed toward the information code C, as illustrated in FIG. 8. Reading work for the information code C can thus be performed easily, smoothly and reliably.

Figure 9A:
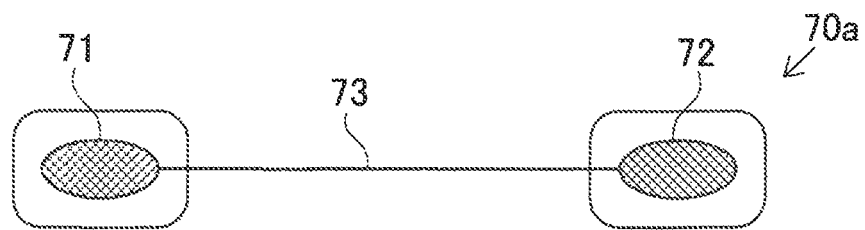
FIG. 9A is a plan view explaining an essential part of a switch unit incorporated in an information reader according to a second modification of the second embodiment.
Figure 9B:
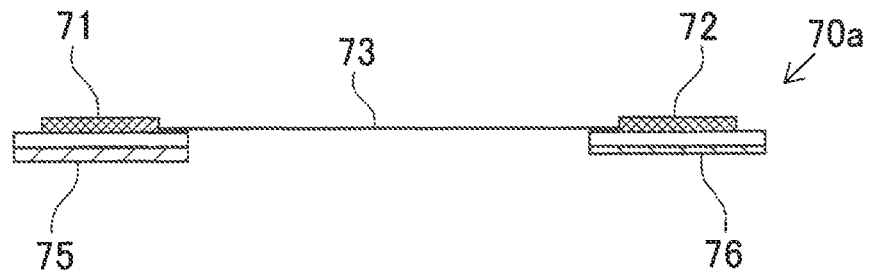
FIG. 9B is a side view explaining the switch unit shown in FIG. 9A.

Another modification is shown in FIGS. 9A and 9B, in which the switch unit 70a is detachable from and to the holder 80, thus being interchangeable in an easier manner, not being limited to be incorporated in the holder 80. For instance, as exemplified in FIGS. 9A and 9B, the switch unit 70a includes a detachable member 75 configured as a sheet fastener (such as a hook and loop fastener) and a detachable member 76 configured as a member which can be reduced in its thickness when being used, such as a double-faced adhesive tape. These tapes are used to allow both the touch electrode pad 71 and the transmission pad 72 to be detachable to and from the holder 80 in a state where the detachable member 76 comes in contact with the touch detection region 15. Hence, even when the switch unit 70a is damaged, it is not necessary to exchange the holder 80 as a whole. It is enough to exchange only the switch unit 70 for a new one. Alternatively to this exchangeable structure, the detachable member 76 and the touch detection region 15 can be configured such that both members can be fixed to each other, thus not being disconnected, In the foregoing embodiments, the transmission pad 72 can fixed directly to the touch detection region 15 so as not to be detachable from therefrom.

Third Embodiment

Figure 10A:
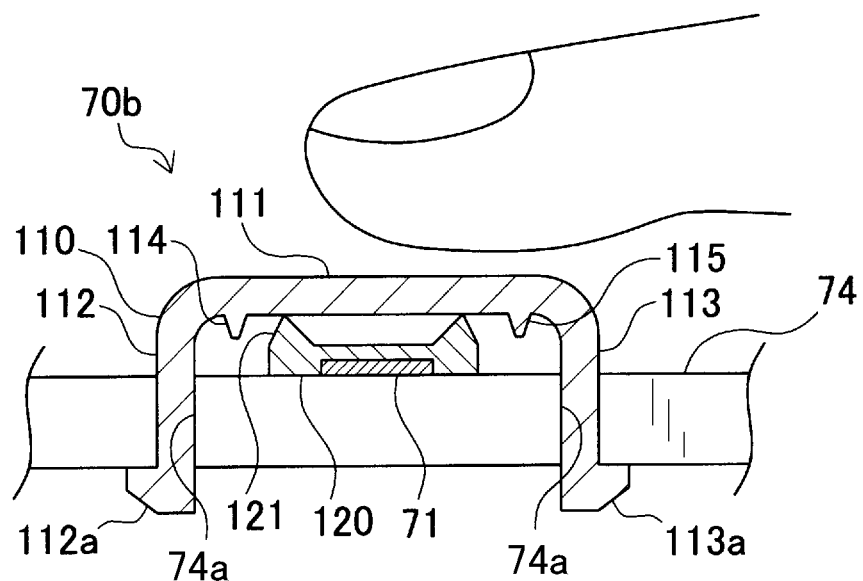
FIG. 10A is an illustration explaining a before-depressing state of a switch unit of an information reader according to the third embodiment.
Figure 10B:
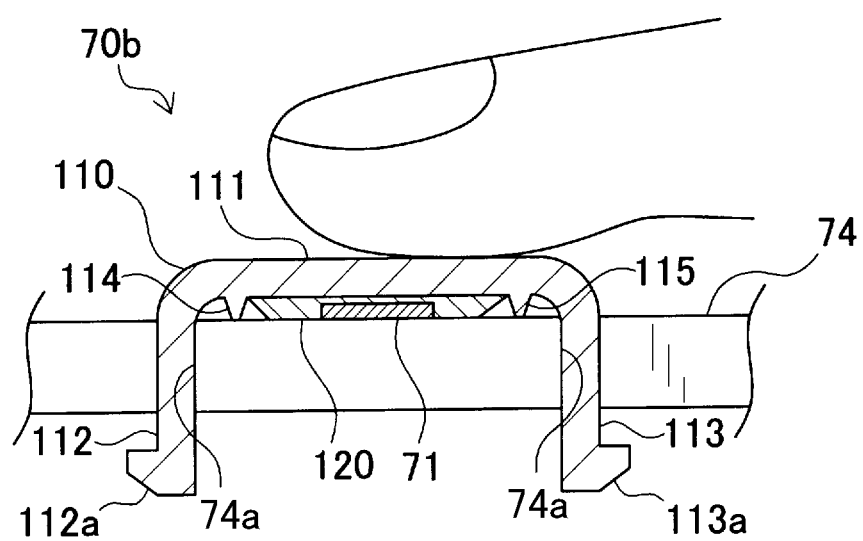
FIG. 10B is an illustration explaining a depressing-completed state of the switch unit of the information reader according to the third embodiment.
Figure 11:
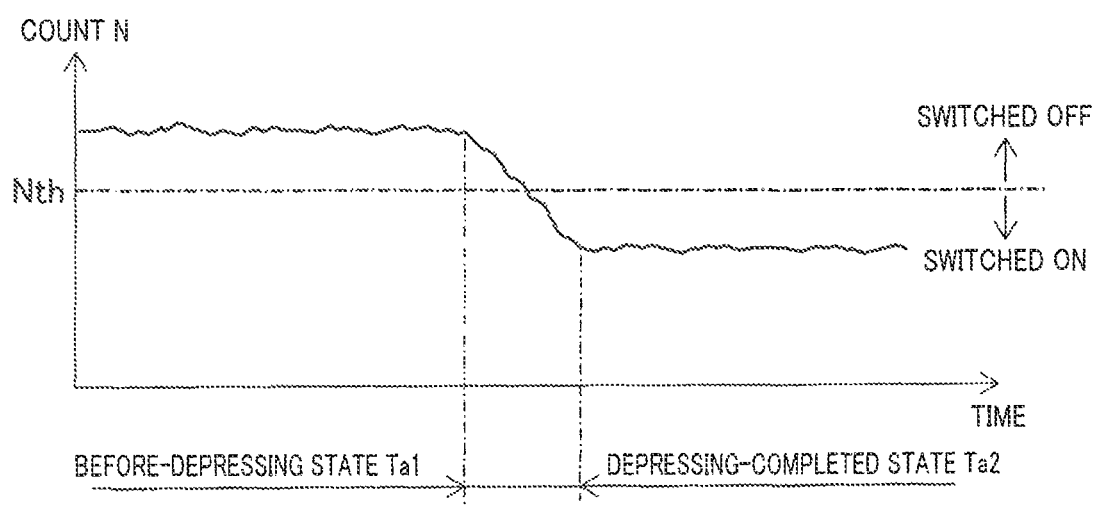
FIG. 11 is a graph explaining how the measured count changes depending on the depressing operations.

With reference to FIGS. 10 and 11, an information reader according to a third embodiment will now be described.

The third embodiment mainly differs from the first embodiment in that the third embodiment employs a switch unit which provides an operation feeling. Substantially equivalent components to those in the first embodiment will thus be given the same reference numerals for a simplified explanation.

Instead of the switch unit 70 installed in the first embodiment, an information reader according to the present embodiment is configured to adopt a switch unit 70b. As shown in FIGS. 10A and 10B, this switch unit 70b is equipped with a cover 110 which encloses the touch electrode pad 71 and a supporter 120 which supports elastically the cover 110 on the pad supporter 74.

The cover 110 is made of resin such as synthetic resin and is structured to have an approximately panel-shaped top board 111 and side boards 112 and 113 suspended from both edges of the top board 111. Both members 111 and 112, 113 are integrally formed with each other. At the lower ends of both side boards, claw portions 112a and 113a are formed, respectively, to prevent the cover 110 from being pulled out. The top board 111 has a lower surface on which stoppers 114 and 115 are integrally formed to protrude downward and positioned adjacently to the side boards 112 and 113, respectively, The supporter 120 is made of elastic material such as synthetic rubber, placed to cover the touch electrode pad 71 and formed to have an annular protrusion 121 which becomes thinner as advancing upward. The annular protrusion 121 functions as an outer edge of the protrusion 121.

A pair of slits 74a are formed through the part supporter 74 in the thickness direction thereof. The cover 110 is assembled with the pad supporter 74 such that parts of the side boards 112 and 113 are inserted through the slits 74a.

Hence, in this switch unit 70b, when there is no external force applied to the top board 111, the cover 110 is formed to be pushed up from the lower side by the annular protrusion 121. As a result, the cover 110 is elastically supported by the supporter 120, with the claw portions 112a and 113a hooked on the lower edges of the slits 74a (refer to FIG. 10A).

On the hand, when the top board 111 is pushed down toward the touch electrode pad 71 as shown in FIG. 10B, the annular protrusion 121 is elastically changed until the stoppers 114 and 115 touch the upper surface of the pad supporter 74.

In the present embodiment, the thickness of the top board 111, the lengths of the side boards 112 and 113, the height of the annular protrusion 121, and dimensions of other components of this switch are set as follows. That is, when there is a user finger's light touch with no pushing the top board 111, an electrostatic capacity owned by the touched finger is not added to the touch electrode pad 71. In contrast, when the user's finger pushes the top board 111 down, an electrostatic capacity owned by the touched finger is added to the touch electrode pad 71.

In this way, a simple light tough of the user's finger on the top board 111 does not allow the finger's electrostatic capacity to be added to the touch electrode pad 71. Hence, as shown by a before-depressing state Ta1 in FIG. 11, a measured count N is larger than a preset threshold Nth, thereby no detecting a touch operation of the user. Meanwhile, when the user starts a pushing operation which pushes the top board 111, an electrostatic capacity Cf of the user's pushing finger is gradually added to the inner pad 51, so that the count N is made to start to be decreased. Then, as shown in FIG. 10B, the top board 111 is pushed down until the stoppers 114 and 115 reach the upper surface of the pad supporter 74, thereby providing a depressing-completion state Ta2 shown in FIG. 11. In this state Ta2, the count N is measured at quantities which are smaller than the preset threshold Nth, with the result that a touch operation is detected.

As described, the information reader according to the present embodiment includes the switch unit 70b provided with the cover 110 which covers the touch electrode pad 71 and the supporter 120 which elastically supports the cover 110. By this supporter 120, a user's finger pushing the cover 110 towards the touch electrode pad 71 is allowed to approach the touch electrode pad 71. This structure can provide an electrostatic capacity type of switch, while can provide a reading worker with an operation feeling provided when pushing the cover 110 toward the touch electrode pad 71. Hence, the reading worker can sensuously feel whether or not the switch operation was like an operation of a mechanical switch.

The characteristic configuration of the present embodiment, which uses the cover 110 and the supporter 120, can also be applied to other embodiments.

Fourth Embodiment

Figure 12A:
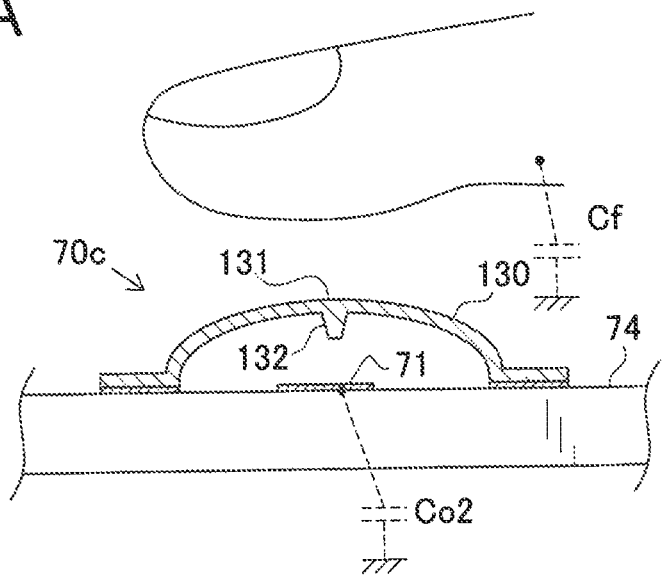
FIG. 12A is an illustration explaining a before-depressing state of a switch unit of an information reader according to the fourth embodiment.
Figure 12B:
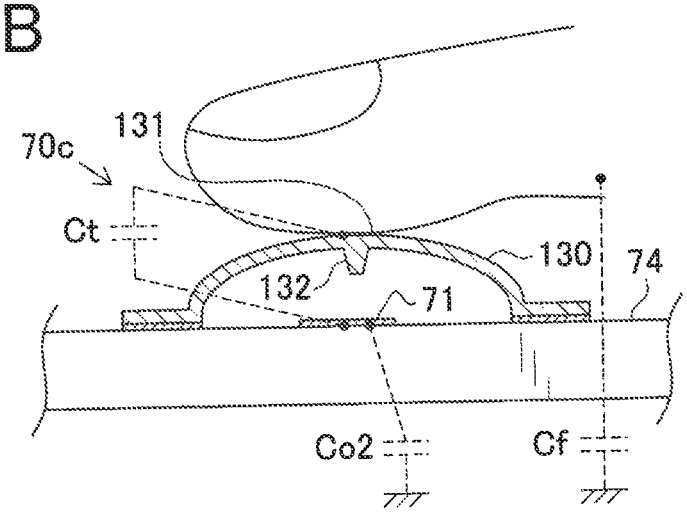
FIG. 12B is an illustration explaining a touched state of the switch unit of the information reader according to the fourth embodiment.
Figure 12C:
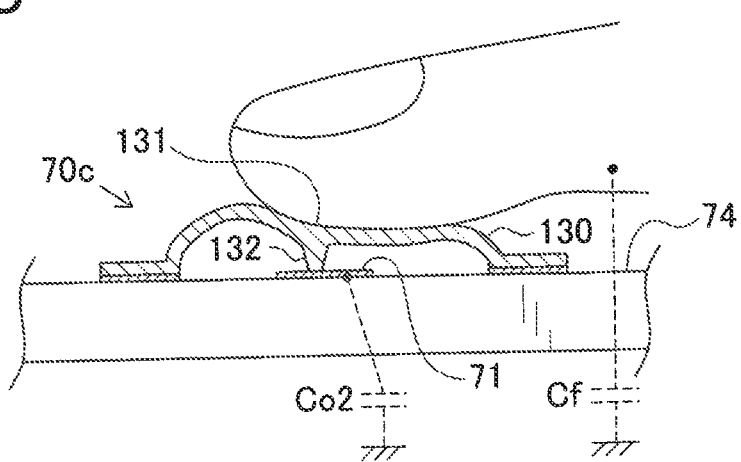
FIG. 12C is an illustration explaining a depressing-completed state of the switch unit of the information reader according to the fourth embodiment.
Figure 13:
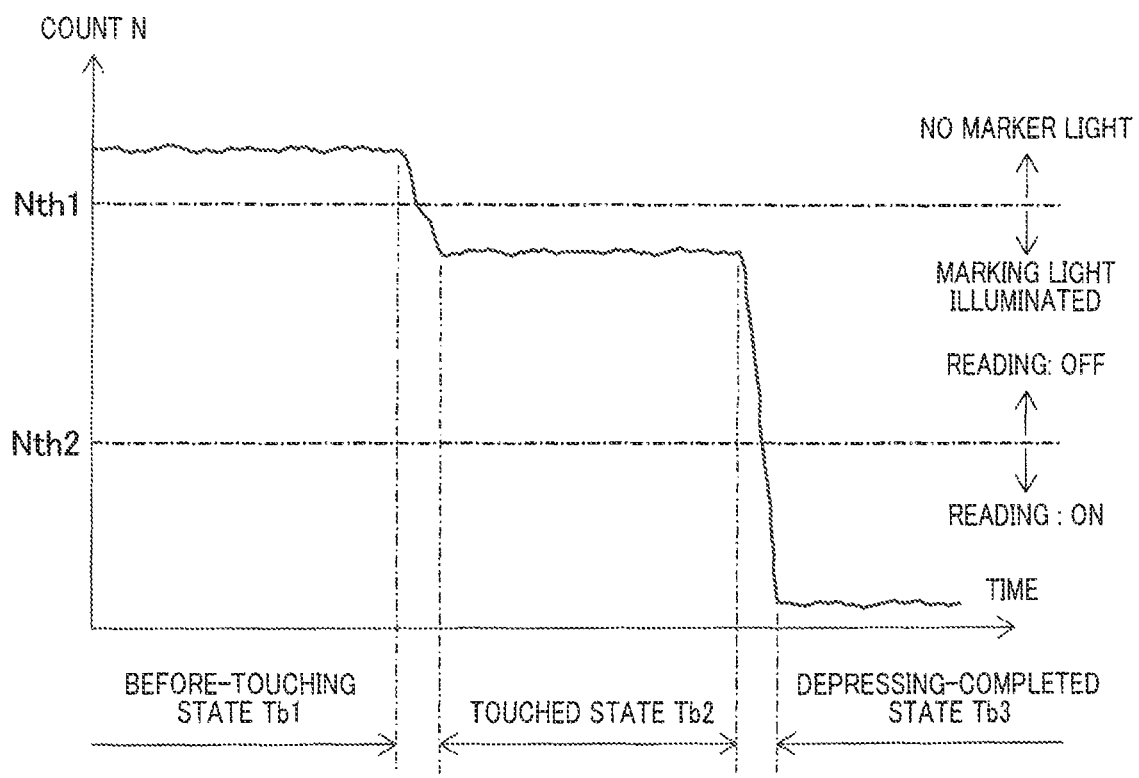
FIG. 13 is a graph explaining how the measured count changes depending on the touch and depressing operations.

With reference to FIGS. 12 and 13, an information reader according to a fourth embodiment will now be described.

The fourth embodiment mainly differs from the first embodiment in that the fourth embodiment adopts a switch unit which is able to perform a two-step switching operation. For the sake of a simplified explanation, in the fourth embodiment, components substantially identical to those in the first embodiment will be referred by the same reference numbers.

When being compared to the first embodiment, the information reader of this embodiment employs a switch unit 70c instead of the switch unit 70 described before. This switch unit 70c, which replaces the switch unit 70 described in the foregoing embodiment, is configured to have a conductive member 130, as shown in FIGS. 12A, 12B and 12C.

The conductive member 130 is made from an electrically conductive thin-plate member and shaped into an approximately semicircular sphere shape (or a domal shape). The conductive member 130 has a sectionally-round bulgy portion 131 structured to be elastically deformably recessed inwardly and an electrically conductive protrusion 132 protruded downward from the inner surface of the bulgy portion 131. The conductive member 130 is mounted on the pad supporter 74 such that the conductive member 130 covers the touch electrode pad 71 and allows the protrusion 132 to be opposed to the touch electrode pad 71 with a predetermined length gap left therebetween.

In this switch unit 70c, there is an electrostatic capacitance Cpad at the touch electrode pad 71, and this capacitance Cpad is equal to the foregoing stray capacitance Cot when a finger is not on the bulgy portion 131 of the conductive member 130, as shown in FIG. 12A. However, as shown in FIG. 12B, when a finger touches the bulgy portion 131 with causing no deformation on the conductive member 130, the capacitance Cpad of the touch electrode pad 71 becomes equal to an amount expressed by the following formula (1):

$$C\text{pad} = Co2 + (Ct \times Cf)/(Ct + Cf) \qquad (1),$$

wherein Ct is an electrostatic capacitance produced by an electrostatic coupling realized by the conductive member 130 and the touch electrode pad 71.

Moreover, when a finger touch-operates the bulgy portion 131 such that, as shown in FIG. 12C, the bulgy portion 131 is depressed (elastically deformed) to cause the conductive member 130 comes in contact with the touch electrode pad 71 via the protrusion 132, the electrostatic capacitance Cpad at the touch electrode pad 71 becomes an amount including both an electrostatic capacity Cf due to the finger and the foregoing stray capacitance Co2.

In this way, the touch and depressing operations on and to the conductive member 130 provide mutually-different amounts of electrical charges added to the touch electrode pat 71. That is, the capacitance Cpad at the touch electrode pad 71 changes depending on how the conductive member 130 is operated, thus providing two steps to the count N. For this reason, depending on discrimination between the count N (refer to a before-touching state Tb1 illustrated in FIG. 13) detected in a no-touch operation to the conductive member 130 and the count N (refer to a touched state Tb2 in FIG. 13) detected when being touched to the conductive member 130, a first threshold Nth1 can be set. In addition, depending on the count N (refer to a depressing-completed state Tb3 in FIG. 13) detected when the conductive member is depressed, a second threshold Nth2 can be set.

In the present embodiment, by using both the first and second thresholds Nth1 and Nth2 which are set as above, two types of processes in accordance with the operations on and to the conductive member 130 can be performed. Practically, one of the two types of processes is performed for radiating maker light, described later, when the measured count N is equals to or less than the first threshold Nth1. The process is performed for reading an information code imaged by a light receiving sensor 23 when the measured count N is equal to or less than the second threshold Nth2.

As described, the information reader according to the present embodiment is provided with the switch unit 70c which includes the conductive member 130. This conductive member 130 covers the touch electrode pad 71 with a predetermined space left therebetween and still deforms elastically. It is thus possible to mutually differentiate amounts of electrical charges added to the touch electrode pad 71 between a finger's touch operation to the conductive member 130 with still no elastic deformation thereof and a finger's touch but depressing operation causing the conductive member 130 to be deformed elastically and come into contact with the touch electrode pad 71.

Hence, a signal process performed when the conductive member 130 is subjected to just the touch operation with no deformation thereof and a signal process performed when the conductive member 130 is subjected to a depressing operation involving an elastic deformation causing a touch to the touch electrode pad 71 can be different based on a difference of the capacitance Cpad at the touch electrode pad 71 (which is due to the electrical charges added to the touch electrode pad 71). In this way, based on a difference between the capacitances Cpad of the touch electrode pad 71 obtained for a simple (no deformation) touch to the conductive member 130 and for a depressing operation to the conductive member 130 to allow a touch to the touch electrode pad 71, various processes in the reading process and other necessary processes related thereto can be differentiated from each other. This is advantageous in raising efficiency of operations of the switch unit 70c, because of providing different types of operational information from a single switch unit.

Incidentally, the processes performed in response to the foregoing two-step operations will not be limited to a process for commanding start of the maker light emission and a process for commanding start of the reading information, but may be applied to other processes. For example, the illumination light Lf may be emitted when the measured count N becomes equal to or less than the first threshold Nth1, while a reading process may be started when the measured count N becomes equal to or less than the second threshold Nth2. In addition, the characteristic configuration for performing the two-step operations described above can also be applied to the other embodiments.

Fifth Embodiment

Figure 14:
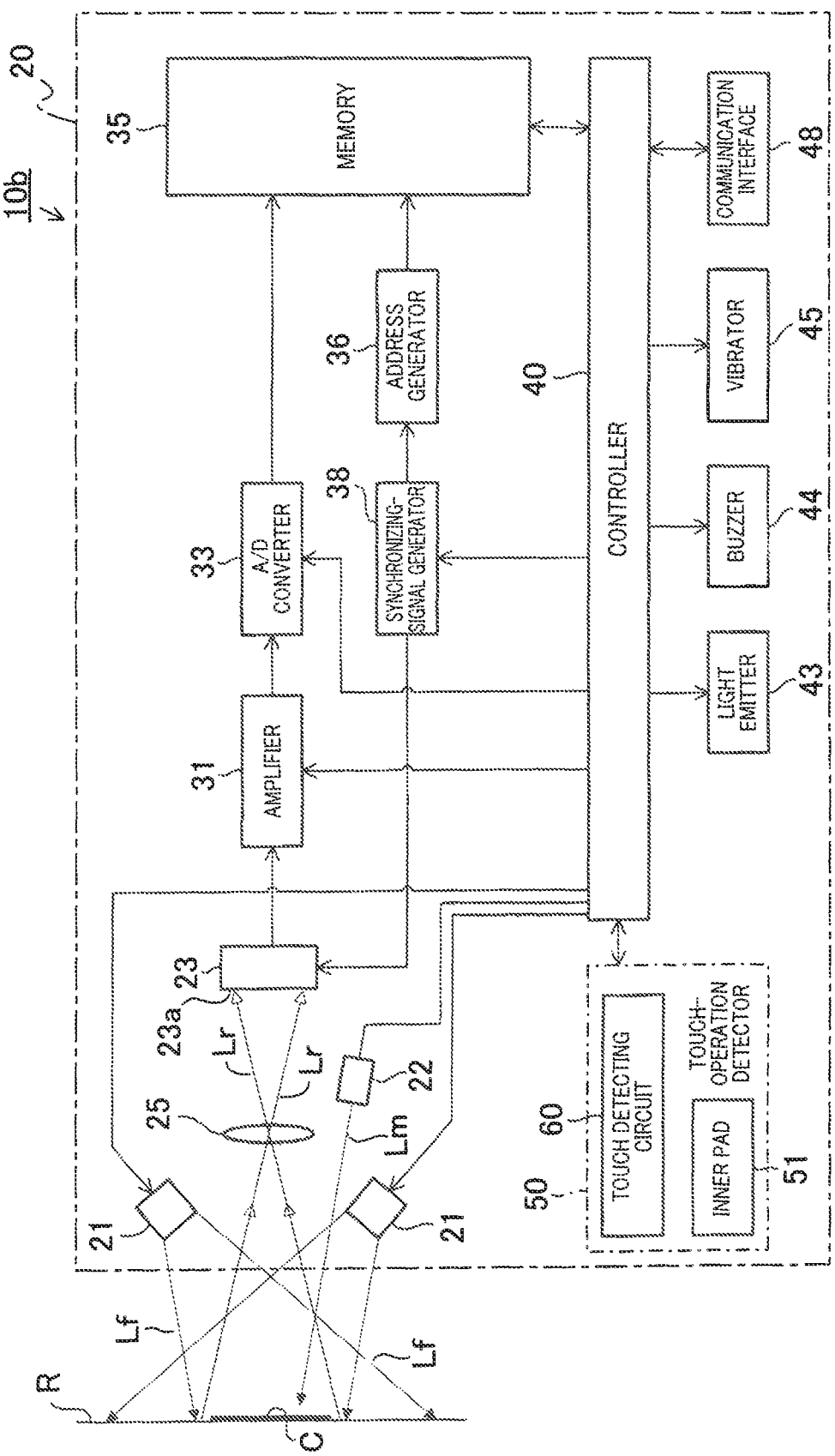
FIG. 14 is a block diagram exemplifying an electric configuration of a reader main unit adopted by an information reader according to a fifth embodiment.
Figure 15A:
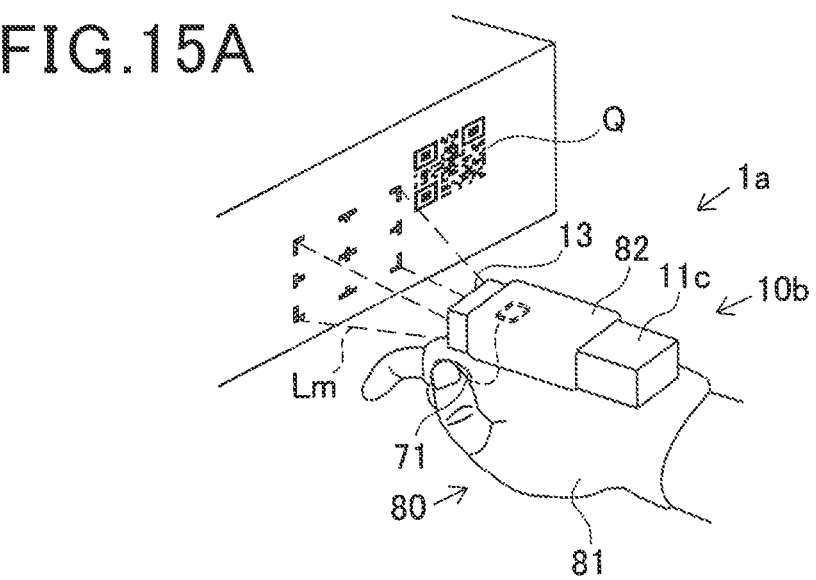
FIG. 15A illustrates a radiated state of maker light and a radiated state of illumination light in the fifth embodiment, which shows a state where the maker light is radiated in response to a touch operation.
Figure 15B:
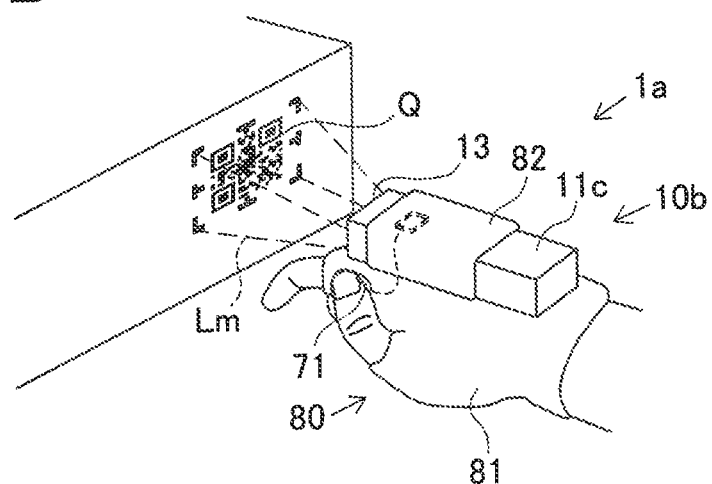
FIG. 15B illustrates a radiated state of maker light and a radiated state of illumination light in the fifth embodiment, which shows a state where the maker light is directed towards a QR code (registered trademark).
Figure 15C:
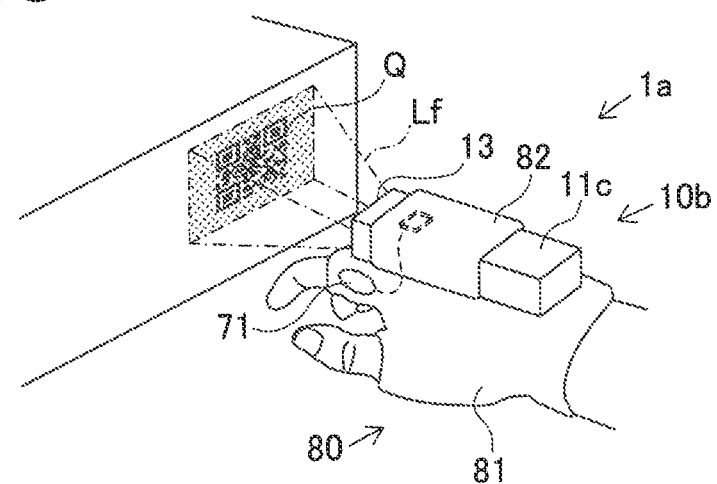
FIG. 15C illustrates a radiated state of maker light and a radiated state of illumination light in the fifth embodiment, which shows a state where the marker light is turned on and the illumination light is radiated, by stopping the touch operation.
Figure 16:
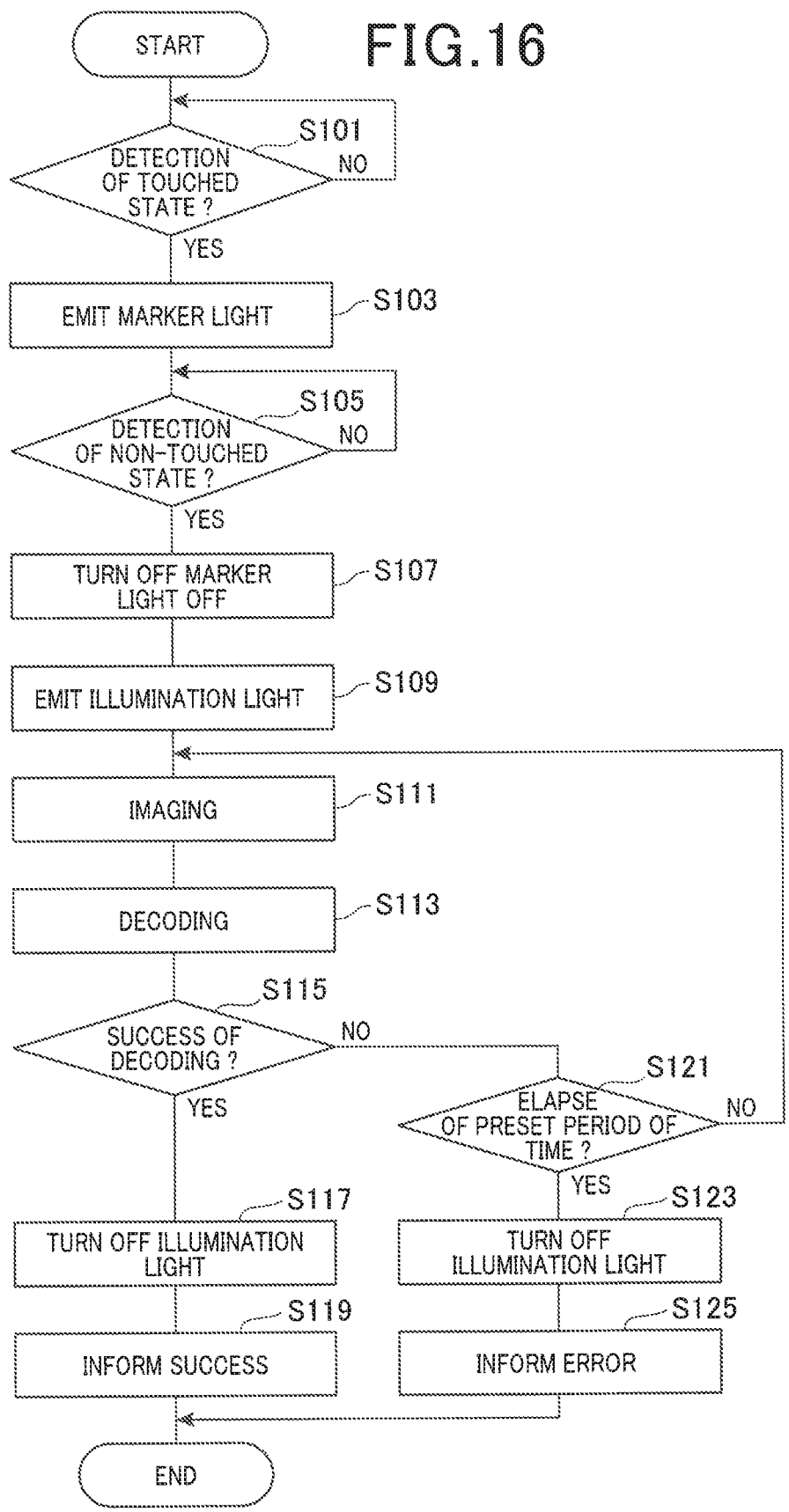
FIG. 16 is a flowchart exemplifying a flow of a reading process performed by a controller in the fifth embodiment.

With reference to FIGS. 14 to 16, an information reader according to a fifth embodiment of the present invention will now be described.

The fifth embodiment mainly differs from the second embodiment in timing at which the marker light is emitted. The substantially similar components to those of the second embodiment in the fifth embodiment will be referred by the same reference numeral for a simplified explanation.

The information reader according to the fifth embodiment is equipped, as shown in FIG. 14, a marker-light emission unit 22 which is able to emit a marker light Lm. This marker-light emission unit 22 is added to the components shown by the reader main unit 10a of the foregoing second embodiment. Practically, this emission unit 22 is configured to emit the marker light Lm, as shown in FIG. 15A and other drawings, such that the emitted marker light Lm indicates an imaging direction (i.e., a rectangular imaging area) which is relied by the light receiving sensor 23 working as an imaging unit. More specifically, the marker light Lm is emitted to indicate the four corners of an imaging area, a middle point in each of the four sides, and a center of the imaging area, as shown in FIG. 15A and other drawings, which area corresponds to a direction along which the reading window 13 is oriented.

In particular, the present invention is intended to improve workability for reading information codes. For the purpose of this improvement, the controller 40 performs a reading process, in which, when a touch operation on the touch electrode pad 71 detected, the marker-light emission unit 22 is driven to emit a marker light Lm. Moreover, in this reading process, when such detection disappears from the detected state, imaging is started by the light receiving sensor 23.

Hereinafter, a reading process performed by the controller 40 in the present embodiment will now be detained based on the flowchart illustrated by FIG. 16.

When the controller 40 starts its reading process, the controller 40 first determines at step S101 whether or not there is detected a touched state where a user's touch operation at the touch electrode pad 71 of the switch unit 70a is carried out. In a case where the user puts, for example, a user's finger at the touch electrode pad 71 and, as described, the measured count N becomes equal to or less than the preset threshold, it is determined that the touch operation at the touch electrode pad 71 has been detected, thus being decided YES at step S101.

The processing then proceeds to step S103, where the marker-light emission process is performed, resulting in the that, as illustrated in FIG. 15A, marker light Lm is emitted by the marker-light emission unit 22. This step is then followed by step S105, where it is determined by the controller 40 that there is a non-touched state in which a touch operation has not been performed at the touch electrode pad 71. This determination step is repeated at intervals (NO at step S105) until detecting the non-touched state, thus maintaining the marker light Lm from being emitted.

During this repetition, when the user's finger or other portions is released from the touch electrode pad 71 in a state where the imaging direction is adjusted such that the maker light Lm is directed, as illustrated in FIG. 15B, toward a QR code (registered trade mark) serving as an information code being read, the count N measured as described exceeds the preset threshold, whereby a non-touched state is detected. By this detection, it is determined YES at step S105. In this case, the processing then proceeds to step S107, where the maker-light turning off process is performed to drive the marker-light emission unit 22 so as to stop the emission of the marker light Lm. Then, at step S109, an illumination-light emission process is performed, so that, as illustrated in FIG. 15C, the lighting source 21 is driven to emit illumination light Lf.

During the emission of the illumination light Lf, an imaging process is performed at step S111. Practically, based on signals outputted from the light receiving sensor 23 which has received reflection light Lr from the QR code Q via the reading window 13, image data of an image including the QR code Q. Then a known decoding process for detecting the imaged QR code Q is performed (step S113). When the decoding process succeeds (Yes at step S115), the illumination light source 21 is driven to turn off the illumination light Lf (step S117). And at step S119, a process for informing the success of the decoding process is performed, in which the light emitter 43 and/or buzzer 44 are driven to emit light and/or output sound for the success. By way of example, the controller 40 to perform the decoding process functionally realizes a decoding unit.

In contrast, if the decoding process fails (No at step S115), it is then determined at step S121 whether or not a preset period of time has elapsed from the start of emission of the illumination light Lf. If it is determined No at step S121, the processing is returned to step S111 for repeating the described steps. Hence, in cases where the preset period of time has elapsed during which there have been no success in the decoding process (Yes at step S121), the illumination light source 21 operates to turn off the illumination light Lf (step S123). The processing then proceeds to step S125, in which an error informing process is performed by using the light emitter 43 and/or buzzer 44 so that light emission and/or sound generation informing the failure in the decoding process is notified.

As described, the information reader of the present embodiment enables the controller 40 to operate cooperatively with various components in the reader. That is, when a touch operation at the touch electrode pad 71 is detected during performance of the reading process (Yes at step S101), the marker-light emission unit 22 is driven to emit the marker light Lm, and then, when the touch operation at the touch electrode pad 71 ends (Yes at step S105), the light receiving sensor 23 becomes ready for imaging an object which may include an information code.

It is therefore possible to use the marker light Lm, which is emitted responsively to a touch operation, to adjust the imaging direction which should be oriented to the information code. With the maker light Lm kept to be emitted, in response to release of the user's finger or other parts from the touch electrode pad 71, the reading process is started which includes the first step for imaging an object which includes the information code. In this way, the touch operation and a release operation from the touched state, which can be operated serially, can control both the start of emission of the maker light Lm and the start of the reading process in a serial manner, thus leading to improvement in reading workability for ceding the information code The foregoing serially performed touch operation and release operation thereof are not always limited to both turning on and off the marker light Lm and starting the imaging process (decoding process), but may be applied to other control actions. For example, the touch operation detection can be assigned to turning on the illumination light Lf, while the release operation detection (i.e., detection of the non-touch state) can be assigned to starting the imaging process (i.e., the decoding process). By the way, the characteristic configuration of the present embodiment, in which the serially-performed touch and release operations are assigned to different types of processes can also be applied to the other embodiments in the present disclosure.

Sixth Embodiment

With reference to FIG. 17, an information reader according to a sixth embodiment of the present invention will now be described.

The sixth embodiment mainly differs from the second embodiment in that, in the sixth embodiment, the touch electrode pad 71 is enclosed by a non-conductive elastic member for avoiding an operator's erroneous operation. For a simplified explanation, the similar or identical competes to those in the second embodiment are given the same reference numerals as those in the second embodiment.

Figure 17A:
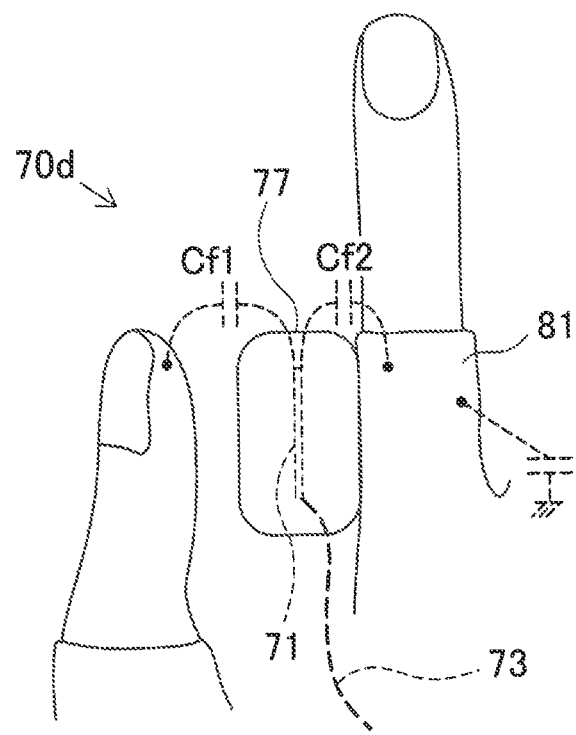
FIG. 17A illustrates a switch unit employed by an information reader according to a seventh embodiment, which shows that an elastic member is not been depressed.

The information reader according to the present embodiment is provided with a switch unit 70d in place of the switch unit 70a which has been adopted by the second embodiment. As shown in FIG. 17A, this switch unit 70d is configured to enclose the touch electrode pad 70a with an elastic member 77.

The elastic member 77 is made of non-conductive elastic material, such as rubber, and is formed to cover and enclose the touch electrode pad 71 from both sides thereof. The electrode pad 71 is electrically connected with a wiring line 73 and fixed at a root portion of the index finger of a glove 81 worn by a user's hand.

Figure 17B:
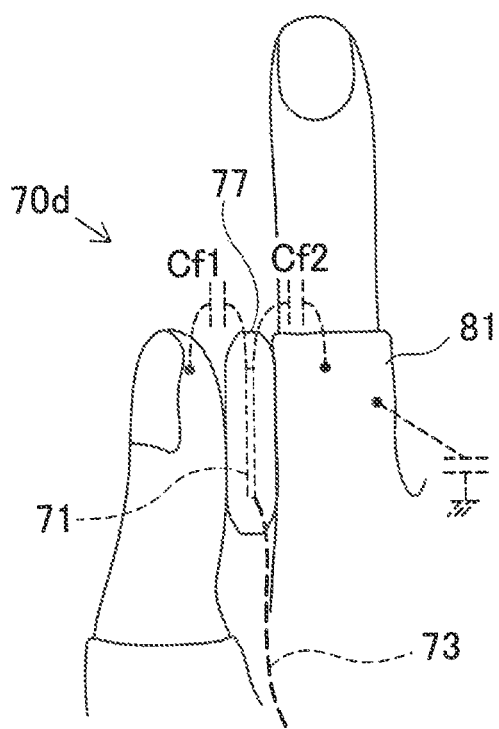
FIG. 17B illustrates a switch unit employed by an information reader according to the seventh embodiment, which shows that the the elastic member is depressed.

As shown in FIG. 17A, if the elastic member 77 is not subject to deformation, the foregoing switch unit 70d is able to secure a designated distance between the thumb and the touch electrode pad 71 and/or a designated distance between the index finger and the touch electrode pad 71. For this reason, if the elastic member 77 does not deform elastically, a coupling capacitance Cf1 is caused between the thumb, which is positionally closer to the elastic member 77, and the touch electrode pad 71 and a coupling capacitance Cf2 is caused between the index finger and the touch electrode pad 71, depending on a thickness of the elastic member 77. Design is made such that these coupling capacitances Cf1 and Cf2 cannot allow the measured count N not to be equal to or less than the foregoing preset threshold In contrast, as shown in FIG. 17B, the thumb can be pushed to the index finger so as to press the elastic member 77. By this pressing action, a distance between the thumb and the touch electrode pad 71 and/or a distance between the index finger and the touch electrode pad 71 become closer to each other. Hence, the thumb and index finger add electrical charge to the touch electrode pad 71, thereby increasing the coupling capacitances Cf1 and Cf2. By this increase, the measured count N becomes equal to or less than the foregoing preset threshold, which makes it possible to detect an operator's depressing action a touch operation) to the touch electrode pad 71.

As described, the information reader of the present embodiment has the touch electrode pad 71 enclosed by the non-conducive elastic member 77. Hence, when the finger (or a depressing member) is made to touch softly the elastic member 77, a coupling capacitance does not occur, or even if occurring, remain at smaller amounts, between the thumb and the touch electrode pad 71. Meanwhile, when the finger is pressed actively to the the elastic member 77, a coupling capacitance generated between the pressed finger and the touch electrode pad 71 is allowed to become sufficiently larger. It is thus possible to set a threshold or other values necessary for detecting a touch operation depending on the increased coupling capacitance, thus preventing or reducing touch operations from being detected unintentionally.

The foregoing characteristic structure which employs the non-conductive elastic member enclosing the touch electrode pad 71 can also be adopted in the other embodiments.

Seventh Embodiment

Figure 18:
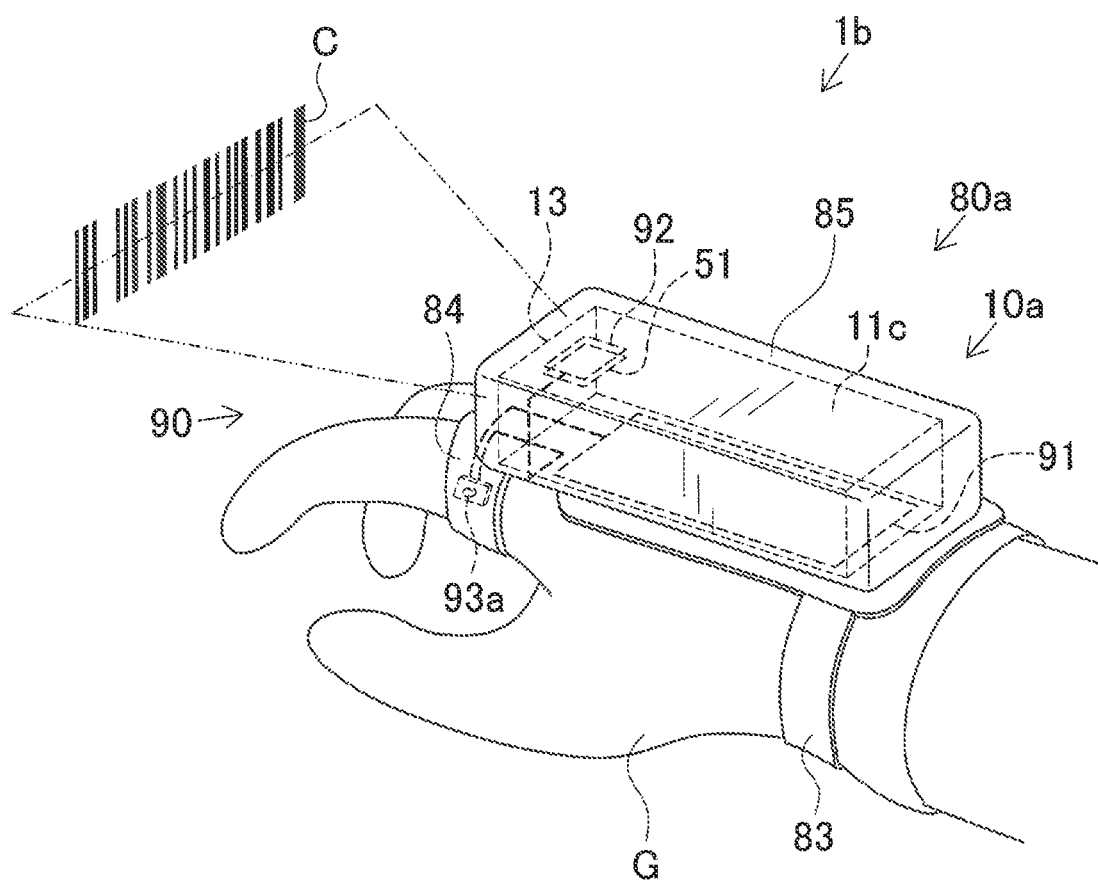
FIG. 18 is an illustration explaining an information reader according to a seventh embodiment.
Figure 19:
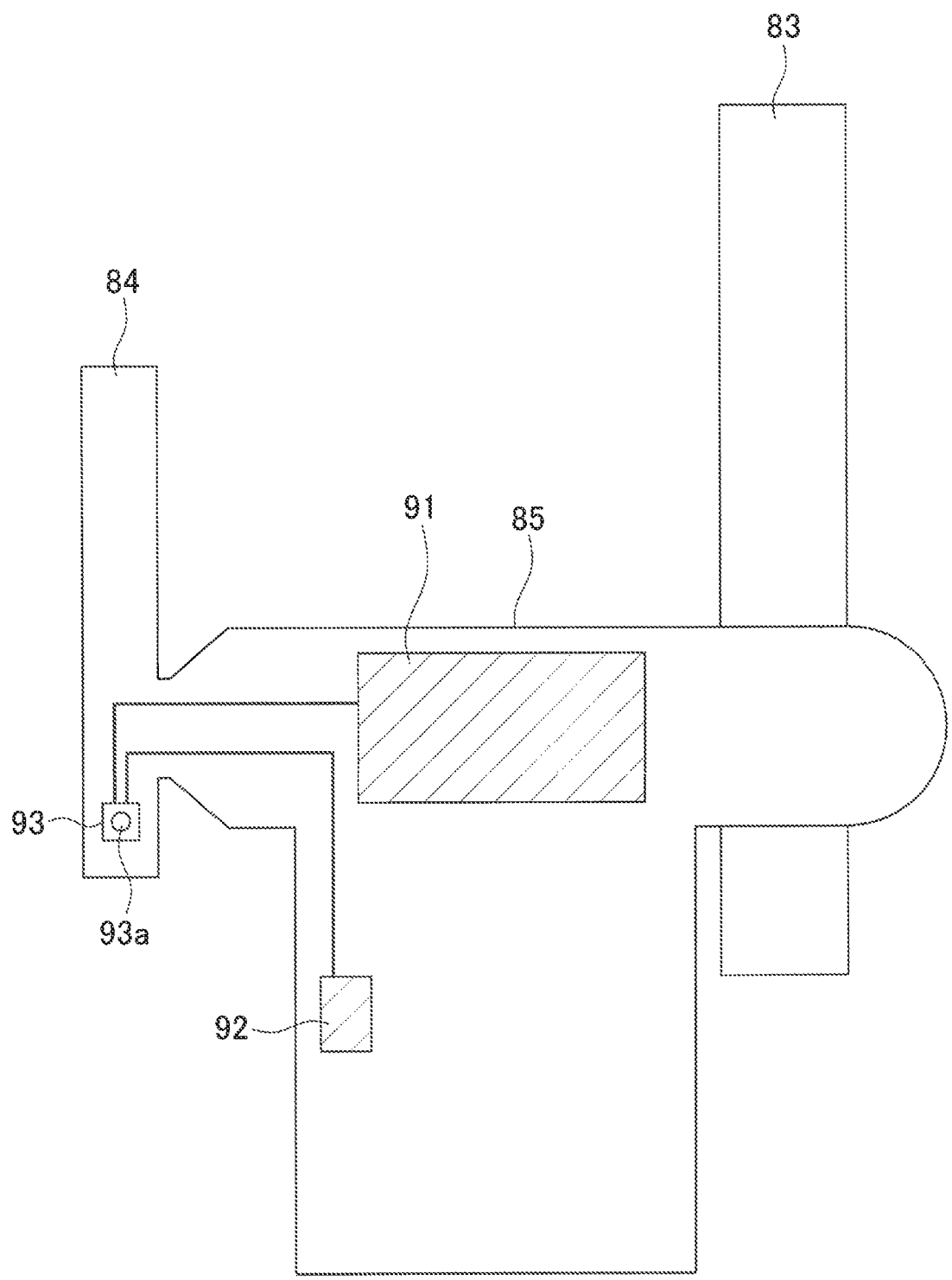
FIG. 19 is an illustration outlining the electrical configuration of a switch unit shown in a state where a holder shown in FIG. 18 is developed.

With reference to FIGS. 18 and 19, an information reader according to a seventh embodiment of the present invention will now be detailed.

The information reader of this embodiment mainly differs from that of the second embodiment in employing a switch unit equipped with a movable member for operations, instead of employing the touch electrode pad. In the present embodiment, the similar or equivalent components in the second embodiment will therefore given the same reference numbers for a simplified explanation.

As shown in FIG. 18, an information reader 1b according to the present embodiment is provided, in which there are provided a switch unit 90 and a holder 80a additionally to the foregoing reader main unit 10a. The holder 80a includes a band 83 loaded on the wrist of a reading worker, a further band 84 loaded on the index finger of the reading worker, and a holding member 85 coupled with the bands 83 and 84 and configured hold the reader main unit 10a on the back of a reading worker's hand. The holding member 85 is formed such that the reading window 13 of the supported reader main unit 10a is directed in a direction in which the index finger with wearing the band 83 is extended.

As illustrated in FIGS. 18 and 19, the switch unit 90 is provided with first and second pads 91 and 92 and a switching member 93. There are provided a state where a predetermined amount of electrical charge applied to the first pad 91 is supplied to the second pad 92 and a further state where such predetermined amount of electrical charge is not suppled to the second pad 92. The switching member 93 is configured to perform a selective switchover between both states.

The switching member 93 is provided with a movable device 93a which can be depressed by hand to perform a selective switchover between mutual electrical connection or disconnection of the first and second pads 91 and 92. By this depressing operation, the switchover function about whether or not the electrical charge is supplied is realized. For this purpose, the movable device 93a is arranged on the inner surface side of the band 84 loaded on a root portion of the worker's index finger so that the worker's thumb can depress the movable device 93a toward the index finger. Of course, the movable device 93a may be arranged to be exposed, at least, partly outside from the band 84.

The first pad 91 is arranged on the inner surface of the holding member 85 in such a manner that the first pad 91 touches the rear surface of the reader main unit 10a held by the holding member 85 (i.e., the surface which is opposite to the surface on which the touch detection region 15 is formed). The reader main unit has a case 11c in which a battery unit is arranged on the rear surface thereof, so that, in a state where the reader main unit 10a is supported by the holding member, the first pad 91 and the battery unit are capacitive-coupled with each other via the rear wall of the case 11c, whereby the predetermined amount of electrical charge is applied to the first pad 91.

The second pad 92 is arranged on the inner surface of the holding member 85 so as to make the second pad 92 touch the touch detection region 15 of the reader main unit 10a held by the holding member 85. In a case where the reader main unit 10a is held by the holding member 85, the second pad 92 is allowed to be capacitive-coupled with the inner pad 51 via the case 11c.

Hence, in the information reader 1b, the movable device 93a of the holder 80a, which holds the reader main unit 10a, is to be depressed by the thumb of an operator's hand or other tools when doing the reading work, thereby electrically connecting the first and second pads 91 and 92. Accordingly, the foregoing amount of electrical charge, which is applied to the first pad as described, is added to the inner pad 51 via the second pad 92, whereby the count N measured in the controller 40 becomes equal to or less than the preset threshold, whereby the reading process starts.

As described, in the information reader 1b according to the present embodiment, the reader main unit 10a has the case 11c which configures the outer shell of the unit 10a. The case 11c contains the inner pad 51 which acts as an electrostatic capacity type of switch used for information reading. The inner pad 51 is assembled with the case 11c such that the inner pad 51 become opposed to the touch detection region 15 within the case 11c. The switch unit 90, which is configured as a separate member from the reader main unit 10a, includes the first pad 91 to which a predetermined amount of electrical charge is supplied, and the second pad 92 assembled on the outer side of the case 11c so as face the touch detection region 15. Moreover, the switch unit 90 further includes the switching member 93 which performs a switchover between a supplied state where the predetermined amount of electrical charge supplied to the first pad 91 responsively to activation of the moveable device 93a is also supplied to the second pad 92 and a non-supplied state where such electrical charge is not supplied to the second pad 92.

Hence, the second pad 92 and the inner pad 51 can be capacitive-coupled with each other at the touch detection region 15 via the case 11c. By activating the movable device 93a of the switch unit 90, the information reading of the information reading unit can be started by the hand even if a cotton work glove G is loaded on the hand. In other words, without directly touching the touch detection region 15 by the worker's hand, it is possible to remote-handle the touch detection region 15.

In particular, the second pad 92 is arranged to the touch detection region 15 of the case 11 from just the outside thereof, which means that there is no wiring correction to the inner pad 51, thus removing the second pad 92 easily from the case 11c. As a result of this separate configuration provided between the switch unit 90 and the reader main unit 10a with no use of wireless communication results in an easier replacement of the switch unit 90.

In addition, the second pad 92 can be arranged detachably at the touch detection region 15 from outside of the case 11c. This is also advantageous in that the switch unit 90 can be replaced easily. Moreover, the holder 80a can be loaded to a hand of the reading worker and the movable device 93a is located to make it possible that any finger (such as the thumb) of the hand on which the holder 80a is loaded approaches and operates the movable device 93a. By this configuration, the worker can operate the reader in one hand on which the holder 80a is loaded, thus improving more workability of the reading job.

A further modification is that the holder holding the reader main unit 10a may be configured to be loaded to a worker's body part which is not the hands and the movable device 93a is arranged on the holder so that operations can be done outside the holder. In this modification, the worker is not required to grip the reader main unit 10a and the switch unit 90 with worker's both hands, thus both hands being free and still used for other work, thus further improving performance of work, including the reading work.

In particular, the first pad 91 is arranged in the holder 80a such that the forgoing preset electrical charge is applied to the first pad 91 by being capacitive-coupled with the battery unit of the reader main unit 10a supported by the holder 80a. Thus, an amount of electrical charge added to the inner pad 61 via the second pad 92 can be increased easily. As another modification, the first pad 91 may be subjected to application of the foregoing preset electrical charge using the capacitive coupling with other electrical parts, the back of an operator's hand, or others, not being limited to the capacitive coupling with the battery unit of the reader main unit 10a.

The foregoing characteristic configuration of the present embodiment, in which the switch unit 90 provided with the movable device 93a, can also be applied to the other embodiment. For instance the switch unit 70 explained in the first embodiment can be modified such that, instead of the touch electrode pad 71, the switching member 93 is arranged and the first pad 91 is located, for example, in the pad supporter 74 so as to receive application of the preset electrical charge, and the first pad 91 and the transmission pad 72 are electrically connected with each other via the wiring line 73 in response to an operator's depressing action at the movable device 93a. By this modified configuration, the preset amount of electrical charge applied to the first pad 81 is added to the inner pad 51 via the transmission pad 72 and others, resulting in that the count N measured by the controller 40 becomes equal to or lower than the preset threshold, thus enabling the reading process to be started.

Eighth Embodiment

Figure 20:
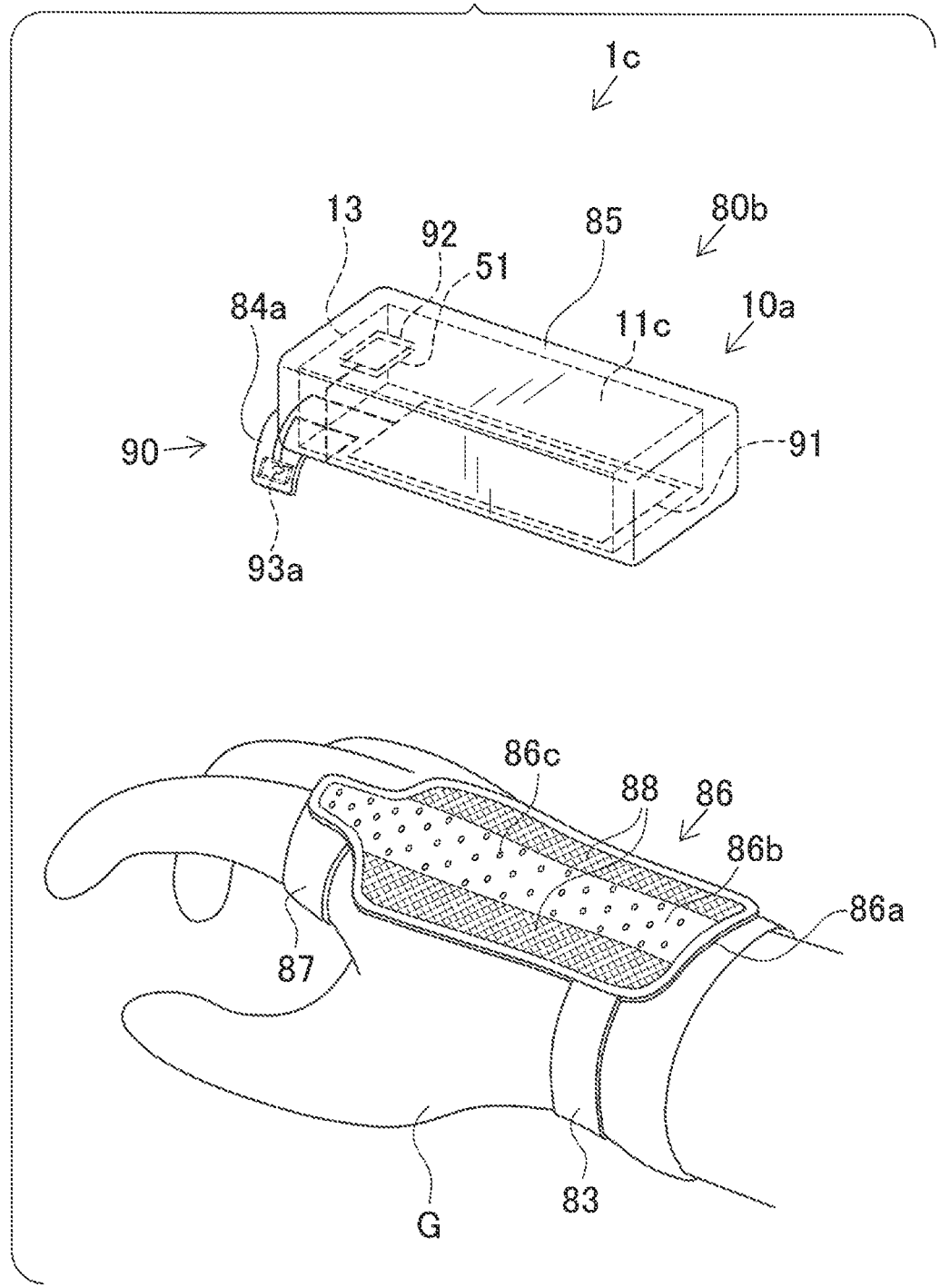
FIG. 20 is an illustration explaining an information reader according to an eighth embodiment.
Figure 21:
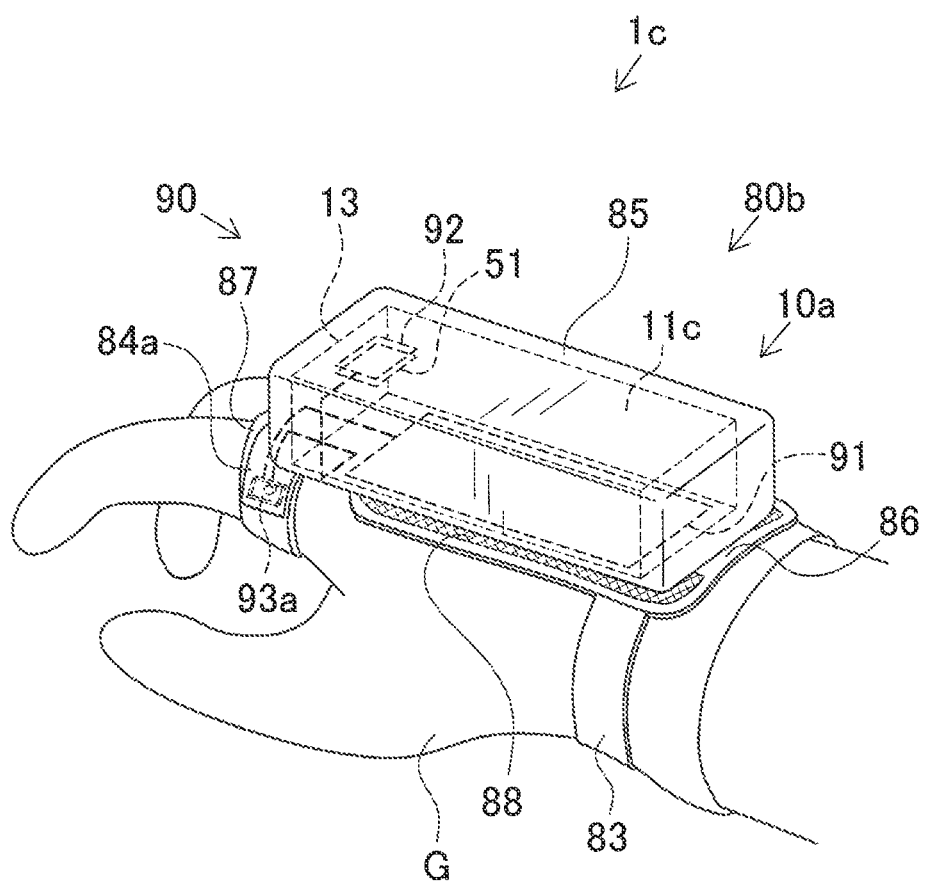
FIG. 21 is an illustration explaining a state where the holding member of a holder shown in FIG. 20 is loaded to a hand-back cover.
Figure 22:
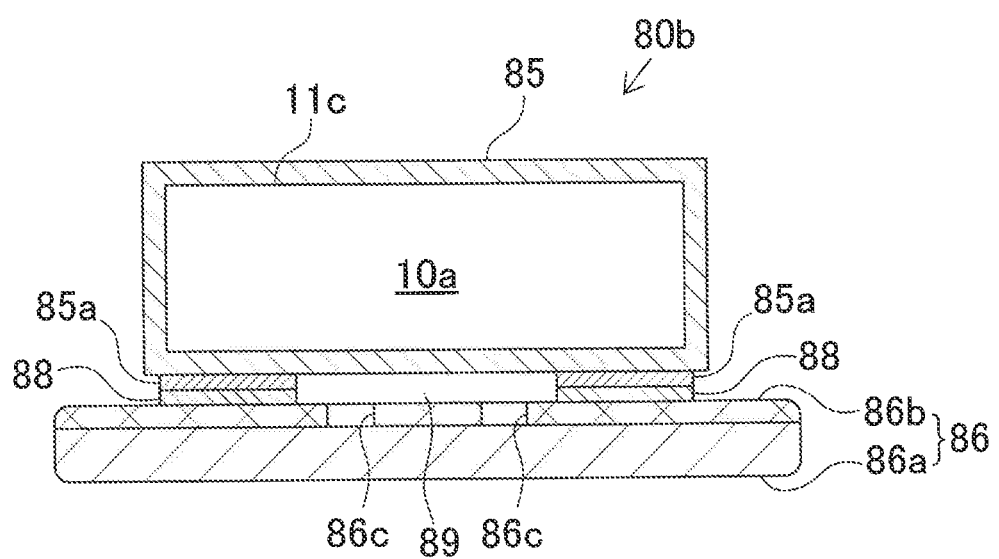
FIG. 22 is a sectional view outlining a section of the information reader shown in FIG. 21, in which the section is obtained cut along a plane which is along a reading window.

With reference to FIGS. 20 to 22, an information reader according to an eighth embodiment of the present invention will now be detailed.

The information reader of this embodiment mainly differs from that of the seventh embodiment in that the holder has a holding portion and the holding portion and a wrist-side band is detectable. The components substantially identical or similar to those of the seventh embodiment are thus given the same reference numerals for a simplified explanation.

As illustrated in FIGS. 20 and 21, the present embodiment provides an information reader 1c in which, in addition to the foregoing reader main unit 10a and the switch unit 90, there is additionally provided a holder 80b. The holder 80b includes an integrated reader-containing-side including both a band 84a provided with the movable device 93a and the holding member 85 and an integrated glove-side member including both a hand-back cover 86 to and from which the holding member 85 is detachable and the band 83. That is, the holder 80b is structured such that the integrated reader-containing-side provided with the switch unit 90 and the integrated glove-side member not provided with the switch unit 90 can be separable from each other. The band 84a is bent in an approximately U-shape so that the movable device 93a of the switching member 93 is located on the inner surface side.

The hand-back cover 86 is formed to be able to cover the back of an operator's hand on which the reader is loaded, and includes a band 87 worn by the index finger (i.e., a finger-side position). The bands 87 and 83 are loaded on the index finger and wrist, whereby the hand-back cover 86 is fixed on the operator's hand back (refer to FIG. 20).

As shown in FIG. 22, the hand-back cover 86 is formed to include a higher air-ventilation base layer 86a and a shape-retaining surface layer 86b layered on the base layer 86a. The surface layer 86b has ventilation holes 86c. On the surface layer 86b, a pair of detachable members 88 composed of for example a fastener is fixed, whereby the detachable members 88 are detachable with detachable members 85a such as a hook-and-loop fastener fixed on the lower surface of the holding member 85, whereby the hand-back cover 86 and the holding member 85 are detachable.

In this way, the holder 80b is structured such that the integrated reader-containing-side provided with the switch unit 90 and the integrated glove-side member with no switch unit 90 can be separable from each other. Hence, the one type of integrated reader-containing-side can be combined with a plurality of integrated glove-side members with different sizes or types, thus making it possible to easily prepare a holder 80b which fits to the size of a reading worker's hand. When such a glove-side member is prepared for each reading worker, the reader-containing-side can be shared by other reading workers.

In addition, since the glove-side member of the holder 80b has no switch unit, this glove-side member can be cleaned by the laundry as long as the glove-side member is made of a washable material.

Furthermore, since the plurality of ventilation holes 86c are formed through the shape-retaining surface layer 86b, an empty space 89 provided between this surface layer 86b and the holding member 85 via the pair of detachable members can be used as a space for the ventilation (refer to FIG. 22). Therefore, even in a state where the holding member 85 is loaded on the hand-back cover 86, the ventilation of the hand-back cover 86 is reduced from being lowered, whereby getting sweaty on the hand due to the hand-back cover 86 is reduced.

It is also sufficient that the integrated reader-containing-side member is provided to hold the reader main unit 10a and have the switch unit 90, not being limited as above to have the band 84a and the holding member 85. Meanwhile, the integrated glove-side member is not limited to the foregoing configuration having the hand-back cover 86 and the band 83, but may be configured to be loaded on the hand back detachably. In addition, the foraging characteristic configurations of both the reader-containing-side member and the glove-side member can also be applied to the configuration set forth in the seventh embodiment.

The one mode of the present invention will not be limited to the foregoing embodiments and their modifications, but further be developed into other modes, which includes the following examples.

(1) One example is concerned with the holder 80. This holder 80 will not be restricted to the foregoing configuration provided with the glove 81 in order to use the information reader 1a on a reading worker's hand in a wearable manner, i.e., the holder 80 are able to be worn detachably on the reading worker's hand. Instead of this wearable loading, the holder may be configured to be loaded on an arm, the head, or other portions of a reading worker. Similarly to this configuration, the holder 80a will not confined to have both the bands 83 and 84 dedicated to the wearable use of the information reader 1a on the reading worker's hand. Provided that the movable device 93a is arranged so as to be depressed for the reading, the holder 80a may be structured so as to be loaded on further portions of a reading worker, such as an arm or the head.

(2) One mode of the present invention will not be limited to applications of the optical information reader which optically reads information such as information codes or character information, but may be applied to other information readers. Such readers include an information reader which has another function, in which the touch detection region, which is touched when starting the reading, is arranged on the outer surface of the case. For instance, such a configuration can be applied to an information reader in which reading radio tags on wireless communication is started when detecting a touch operation at the touch detection region.

Ninth Embodiment

Hereinafter, an information reader according to a ninth embodiment will now be described.

An information reader 110 shown in FIGS. 23 and 24 is provided as a mobile optical information reader which optically image and reads an information code (such as a bar code or a two-dimensional code) and character information).

The information reader 110 has a bailey formed by a case 111 composed of an upper case 111a and a lower case 111b. The case 111 contains a circuit unit 20 provided with various electronic parts or other necessary parts. The upper and lower cases 111a and 111b are made of synthetic resin such as ABS resin and has a plurality of engaging portions, which are arranged inside the case 111 and which are not exposed to the outside when being assembled. Hence, the case 111 is assembled by the engaging portions, without using other members such as screws. The case 111 has a longitudinal direction at one end of which there is formed a reading window 12 and at the other end of which a cable connecting member 114 is attached.

Figure 25:
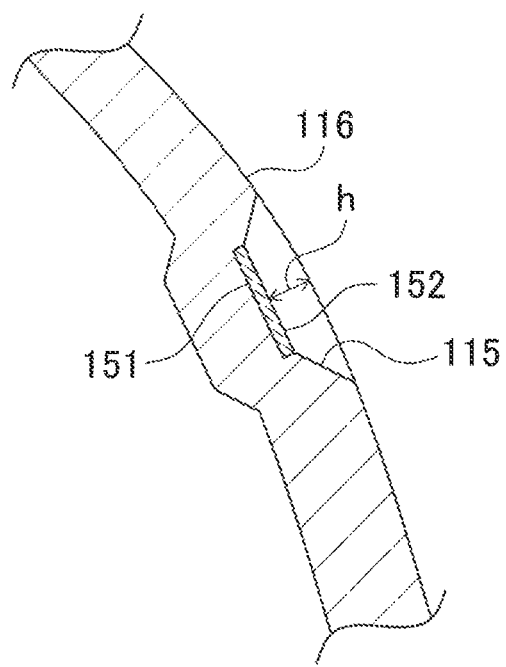
FIG. 25 is a sectional view outlining positions of a circular edge portion configuration a recess of the case and the touch electrode.

The case 111 is arched upward gradually and entirely in the longitudinal direction as shown in FIG. 14B, which is for making an operator who grips the upper case 111a direct easily the reading window 113 to an object being read. The upper case 111a has an outer upper case 112, which is close to the reading window 113. In the upper case 112, there is formed an approximately circular recess 115 in which a touch face 152 owned by a touch electrode 151 is formed. The touch electrode 151 is a part of an electrostatic capacity type of switch (hereinafter referred to as a switch 150). As shown in FIG. 25, the recess 115 has a concave which becomes smaller in its inner diameter as going down in the recess 115, in which there is secured a depth h (for example, approx. 2 to 3 mm) from a circular edge portion 116 to the touch face 52 of the touch electrode 151, which is exposed outside in the bottom.

Moreover, the case 111 is shaped so that an operator who grips the case 111 can easily touch-operate the touch electrode 151 located in the recess 115 in such a gripped state. Practically, for this purpose, the case 111 has a gripping portion, which is closer to the cable connecting member 114 than the recess 115 is. The gripping portion is smaller in the width than a remaining portion. The remaining portion can be provided as a reading portion closer to the reading widow 113 than the gripping portion is.

The information reader 110 has an electrical configuration, which will be detailed with reference to the drawing.

Figure 26:
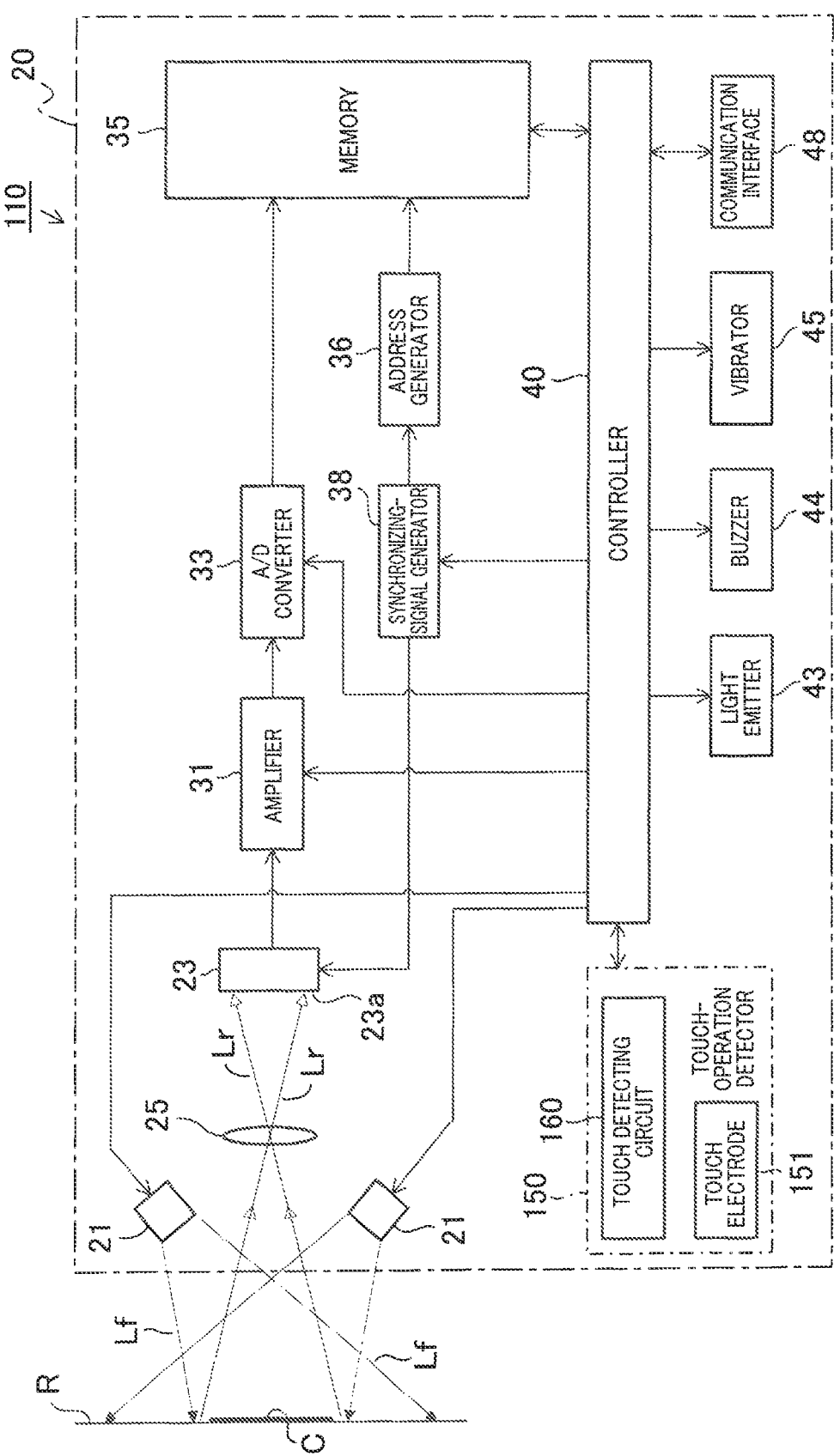
FIG. 26 is a block diagram exemplifying an electric configuration of an information reader according to the ninth embodiment.

As shown in FIG. 26, the circuit unit 20 contained 111 is primarily provided with an illumination light source 21, a light receiving sensor 23, an optical system including an imaging lens 25, a memory 35, and a microcomputer system such as a controller 40. These components are the same as those shown in FIG. 3. Hence, the explanation mainly focuses on other components.

The microcomputer system includes an amplifier 31, an A/D converter 33, a memory 35, an address generator 36, a synchronizing-signal generator 38, a controller 40, the switch 150, a light emitter 43, a busser 44, a vibrator 45, and a communication interface 48.

The controller 40 is composed of a memcomputer which controls the overall actions of the information reader 110, and is equipped with a CPU, a system bus, and an input/output interface. The controller 40 configures an information processing apparatus with an aid of the memory, so as to have an information processing function. This controller 40 is thus configured similarly to that show in FIG. 3.

In particular, as shown in FIG. 24A, the vibrator 45 is arranged closer to the gripping portion than the recess 115 is, and close to the as cable connecting member 114 (the other end) which is positionally distant from the one end of the case 111. At the one end, the reading window 113 is provided which is directed to an object being read. The vibrator 45 is able vibrate under the control of the controller 40 when reading an information code succeeds or a touch operation on the touch electrode 151 is detected, for instance. In the present embodiment, the vibrator 45 exemplifies a vibrating member.

As shown in FIG. 26, a switch 150 is electrically connected to the controller 40, in which the switch 150 is operated to provide the controller 40 with a signal issued responsively to a direct touch at the touch electrode 151. The controller 40 receives the signal from the switch 150 and convert the received signal to a count N corresponding to an electrostatic capacity of the touch electrode 151, so that the controller can function as a detector for the electrostatic capacity. Hence, when the count N becomes equal to or less than a threshold (hereinafter, referred to as a determining threshold Nth) for touch determination (ON/OFF determination), a touch operation at the touch electrode 51 is detected, thereby starting the foregoing reading process.

The switch 150 is housed in the case 111 and equipped with the foregoing touch electrode 151 and the touch detecting circuit 160. The touch electrode 151 is arranged in the recess 115 has a lower face and an upper face serving as the touch face 152. The lower gets in touch with the bottom surface of the recess 115, while the upper face, i.e., the touch face 152 is positioned deeper than the circular edge portion 116 by a depth h, whereby the touch face 152 is recessed by the depth h. In this touch electrode 151, at least, the touch face 152 can be coated for preventing corrosion or other chemical or physical changes.

Figure 27:
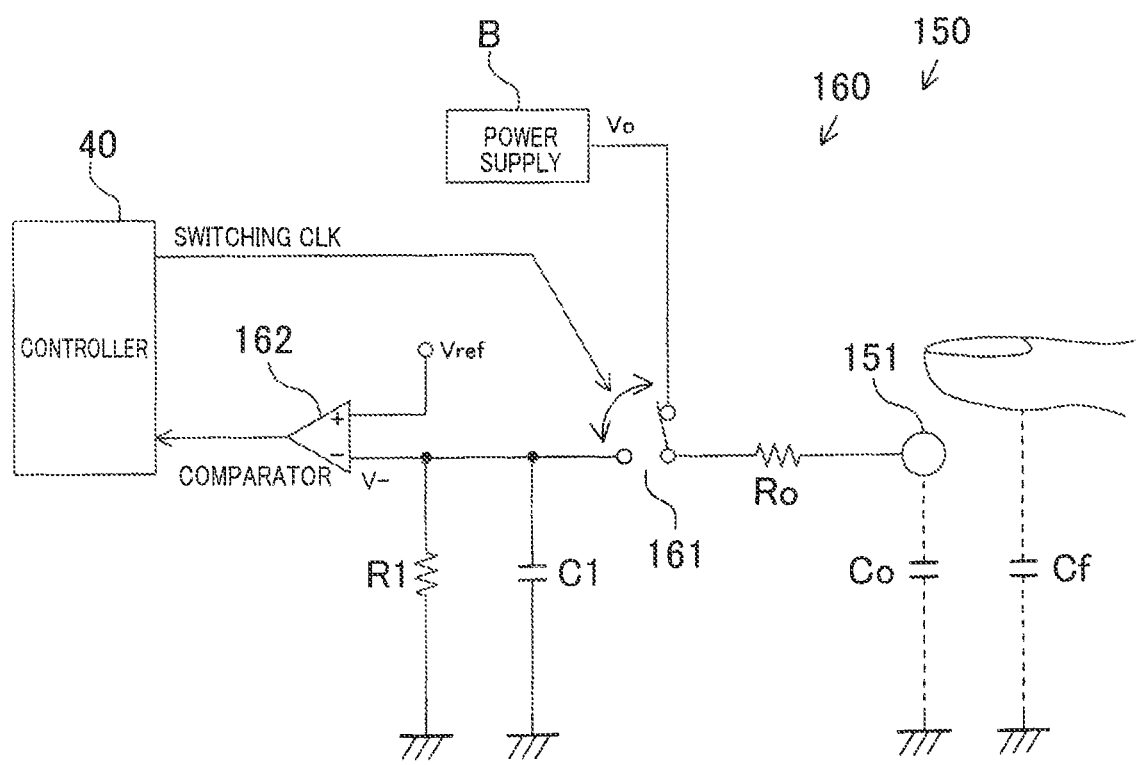
FIG. 27 is a block diagram explaining a touch detecting circuit.

The touch detecting circuit 160 is configured to receive a switching signal CLK from the controller 40, and when receiving the signal CLK, convert the electrostatic capacity of the touch electrode 151 into a corresponding count N. As shown in FIG. 27, the touch detecting circuit 160 is equipped with a switching element 161, a circuit-protecting resistor Ro, a capacitor C1, a discharge resistor R1, and a comparator 162. By power from the power supply B, electrical charge is stored in a stray capacitance Co on the sensor wiring.

When the electrostatic capacity of the touch electrode 151 is measured, the switching element 161 is made to switch on and off in response to the switching signal CLK and its switching actions make the sensor line connect with either the power supply B or the comparator 162. When being connected with the comparator 162, the electrical charge stored in the stray capacitance Co move to the capacitor C1, thereby increasing a negative input voltage V− of the comparator 162. Meanwhile, when being switched over to the power supply side, the negative input voltage V− decrease gradually due to the discharge resistor R1 and the stray capacitor Co is again charged.

By making the switching element 161 repeat its switching on/off actions, the gradually increased negative input voltage V− exceeds a positive input voltage Vref. When this event is caused, the output of the comparator 162 is switched over from Hi to Lo, which makes the controller 40 stop outputting the switching signal CLK. Then the controller 40 counts the number of switching times measured a period of time ranging from the Hi output to the Lo output of the comparator 162, so that the electrostatic capacity of the touch electrode 151 is converted to the count N for acquisition thereof.

When the touch face 152 of the touch electrode 151 is touched with an operator's finger or another member, an electrostatic capacity Cf caused by the touched finger or member is added directly to the touch electrode 151. Thus, the electrostatic capacity on the sensor side becomes a total of Co+Cf, resulting in an increase in an amount of accumulated electrical charge. For this reason, repeating the foregoing switching actions enables the negative input voltage V− to exceeds the positive input voltage Vref quicker than that in a case with no touch on the touch face 152, thus reducing the number of switching times, thus reducing the count N. That is, the count N acquired depending on the electrostatic capacity of the touch electrode 151 changes on whether or not there is a touch operation on the touch face 152.

In the present embodiment, the recess 115 formed on the upper surface 112 is used for directly touching the touch face 152 of the touch electrode 151 with use of an operator's finger or others. Hence, compared with a configuration where an electrostatic capacity is added to the touch electrode via the wall of the case due to the fact that the touch electrode is housed within the resin-made case, the amount of electrostatic capacity added to the touch electrode 51 can be increased largely.

Figure 28:
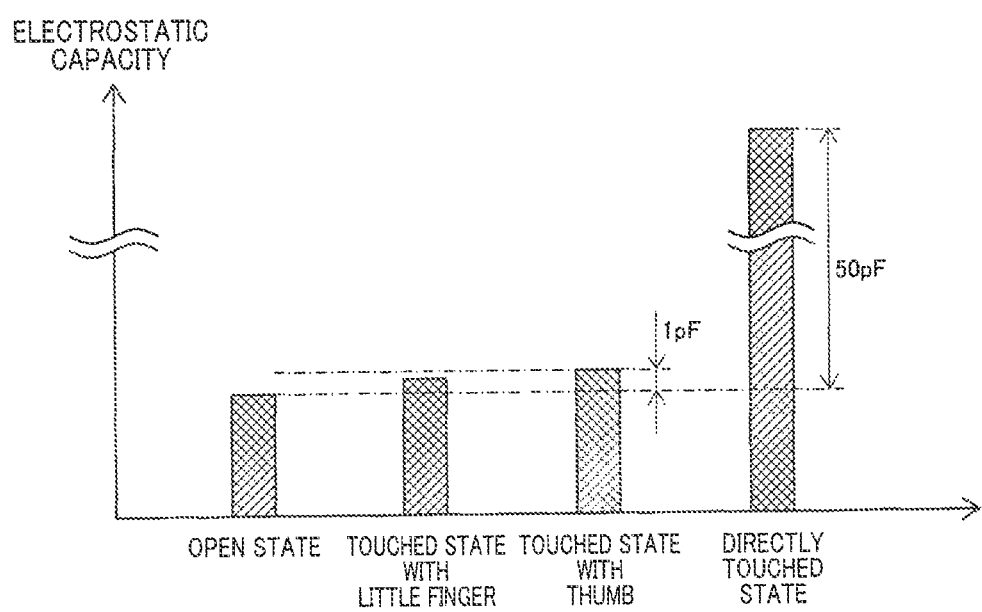
FIG. 28 is a graph mutually comparing electrostatic capacities in an open state, a little-finger touched state, a thumb touched state, and a directly touched state.

For example, as exemplified in FIG. 28, compared with a state (open state) where there is no touch with an operator's finger or other members, there can be provided some touched states where the touch operation is performed via a resin plate of a thickness of 2 mm which approximately corresponds to the thickness of the wall of the case 111. These touched states are shown as a touched state with a little finger (a little-finger touched state) and a touched state with a thumb (a thumb in touched state). In these touched states, an amount of electrostatic capacity added is about 1 pF, though being touched. In contrast, in addition to the open state, there can be provided a state (a directly touched state) where there is a direct touch operation on the touch face 152 of the touch electrode 151. In this directly touched state, an amount of added electrostatic capacity becomes approximately 50 pF, whereby the added electrostatic capacity becomes larger.

Hence, as shown in FIG. 29, the count N converted from the electrostatic capacity of the touch electrode 151 in the directly touched state becomes smaller remarkably than that in the little-finger touched state or the thumb touched state, when being compared with the open state. This makes it possible to set, for the count N in the open state, the determining threshold Nth at a sufficiently smaller value which is not easily influenced from irregulates in sensitivity which are due to the individual differences (refer to a reference symbol S1 in FIG. 29) and/or irregularities resulting from changes in the ambient temperature or being approached by metallic or other substances (refer to a reference symbol S2 in FIG. 29). By setting this threshold, accuracy in the detection can be avoided from being easily influenced by such irregularities.

Figure 30A:
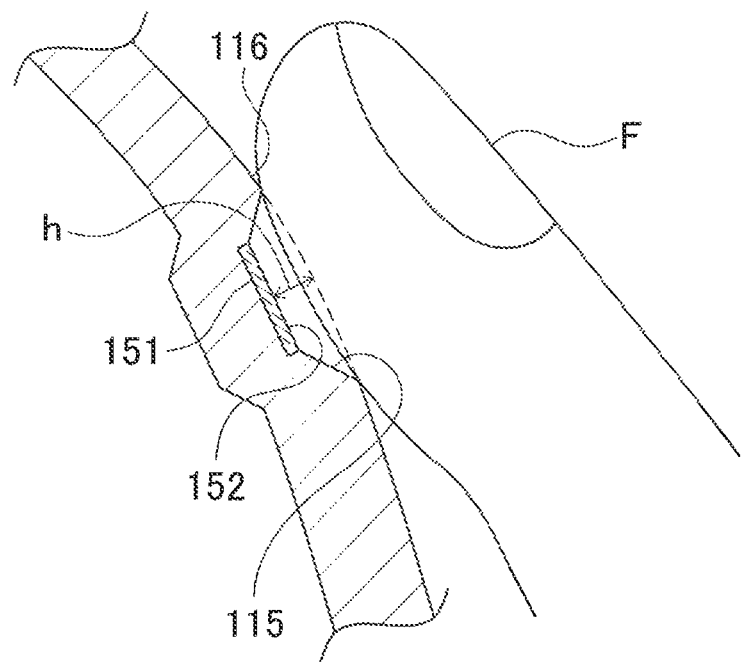
FIG. 30A is a partial sectional view outlining a state where an operator's finger is softly touched to a circular edge portion.

In particular, as shown in FIG. 25, the touch electrode 151 in the present embodiment has the recess 115 in which the touch face 152 is arranged to have a depth from the circular edge portion 1116. Hence as shown in FIG. 30A, when the case 111 is gripped by an operator's hand with a finger F simply touched to the circular edge portion 116, the finger cannot be touched, in almost cases, to the touch electrode 151. In this situation, the count N converted from the electrostatic capacity of the touch electrode 151 is larger than the determining threshold Nth, whereby the reading process is not started. In other words, unintentional touch operations on the touch electrode 151 can be avoided, which reduces or prevents erroneous operations.

Figure 30B:
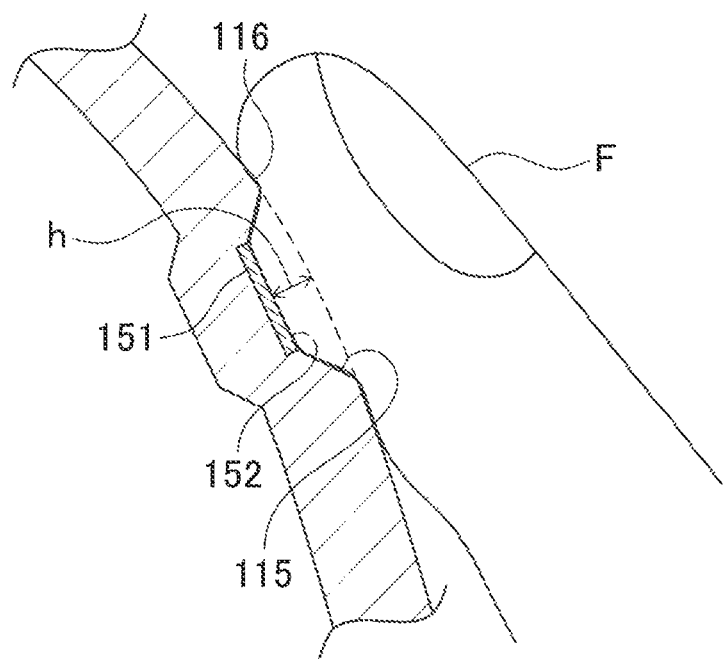
FIG. 30B is a partial sectional view outlining a state where the operator's finger is made to directly touch the touch electrode, which is a transition from the state shown in FIG. 30A.

In contrast, as shown in FIG. 30B, in order to start the reading process, the user can lightly press the user's finger F touched to the circular edge portion 116, inwardly into the recess 115, by which the finger F can be touched directly to the touch electrode 151. For this light press operation, the count N converted from the electrostatic capacity of the touch electrode 151 can become equal to or less than the determining threshold Nth, thus activating the reading process. In other words, by only the slight pressing motion of the finger F, the switch 150 can be turned ON and OFF selectively.

As described, in the information reader 110 of the present embodiment, the count N corresponding to the electrostatic capacity stored at the touch electrode 151 of the electrostatic capacity type switch 150 is detected by the controller 40 whose functions include a detector. Based on this detection, the reading process in response to operations at the switch 150, which reading process corresponds to control of the information reading unit, is carried out by the controller 40. The case 111 has the recess 115 which allows an operation to directly touch the touch face 152 of the touch electrode 151 disposed in the case 111.

Thus, the recess 115 can be used to directly touch the touch electrode 151, the electrostatic capacity detected when touch operations are performed can be made larger, in comparison with the configuration which allows an operator to touch the touch electrode via the wall of the case. For this reason, as described with FIG. 29, influence of differences of sensitivity of the individual operators, changed in the ambient temperature, and/or being approached by metal objects or others on accuracy of detecting the torch operations can be reduced or suppressed.

Moreover, since the electrostatic capacity detected in response to touch operations can be made larger, the determining threshold Nth (a threshold value for determining the switch ON/OFF actions) can be set lower, accordingly to the increased electrostatic capacity. It is thus possible to improve operability of the switch, without performing a touch operation which needs a larger separation of the finger from the touch electrode 51. Even when using the electrostatic capacity type switch 150 to detect touch operations, both a higher operationality and a higher detection accuracy can be provided to touch operations.

In addition, differently from using the count N, even if determination of the switch ON/OFF actions is performed using detected values which increase with an increase in the electrostatic capacity detected by the touch operations, the threshold for determining the switch ON/OFF actions can be set larger. It is therefore not always necessary to urge an operator to perform the touch operations such that an operator's finger or another touching device is separated largely from the touch electrode, thereby improving the operability for the touch operations.

Particularly, the recess 115 is formed to be concave from the circular edge portion 116 of the upper surface 112 and to hold the touch electrode 151 such that the touch face 152 thereof is exposed on the bottom of the recess 115. As a result, as illustrated in FIG. 30A, an operator's finger cannot reach the touch electrode 151 when the finger simply touches the the circular edge portion 116. It is therefore possible to prevent unintentional touches to the touch electrode 151, which prevents or reduces erroneous touch operations.

A modification of the present embodiment can be provided, in which the recess 115 is formed by a circular convex wall integratedly and fixedly on the outer surface of the case 111. Practically, as exemplified in FIGS. 31A and 31B, at a specified position on the outer surface of the case 111, a circular (or ring-shaped) convex wall 117 is formed and the inside surfaces of this wall 117 provides the recess 115. Similarly to that in the embodiment, the touch electrode 151 is assembled with the case 111 such that the touch face 152 is sunk from the top (upper face) of the circular convex wall 117 by a depth h (for example, 2 to 3 mm or thereabouts).

Figure 31A:
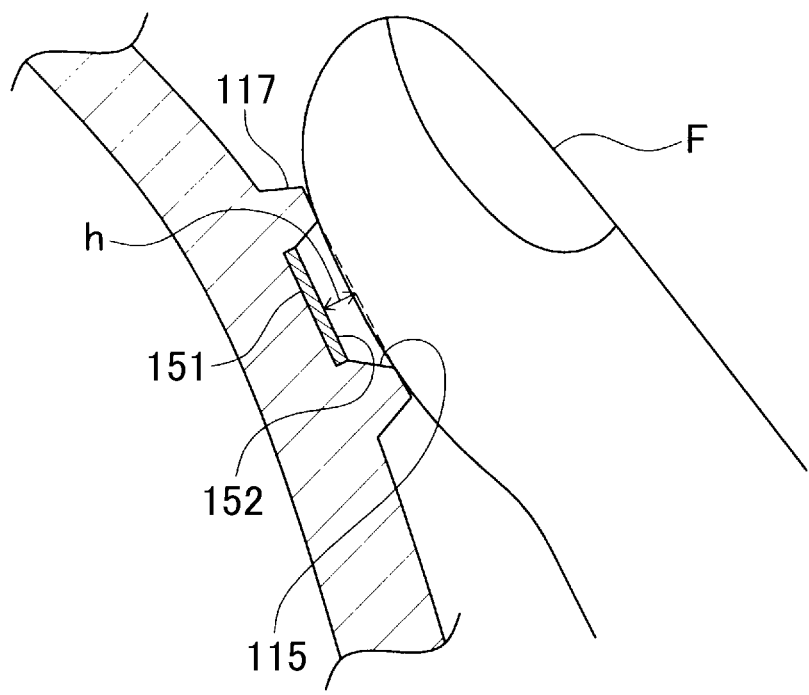
FIG. 31A is an outlined sectional view explaining positions of both a circular convex wall configuring a recess formed on the case and a touch electrode in a modification of the ninth embodiment, in which an operator's finger is just touched to the circular convex wall.
Figure 31B:
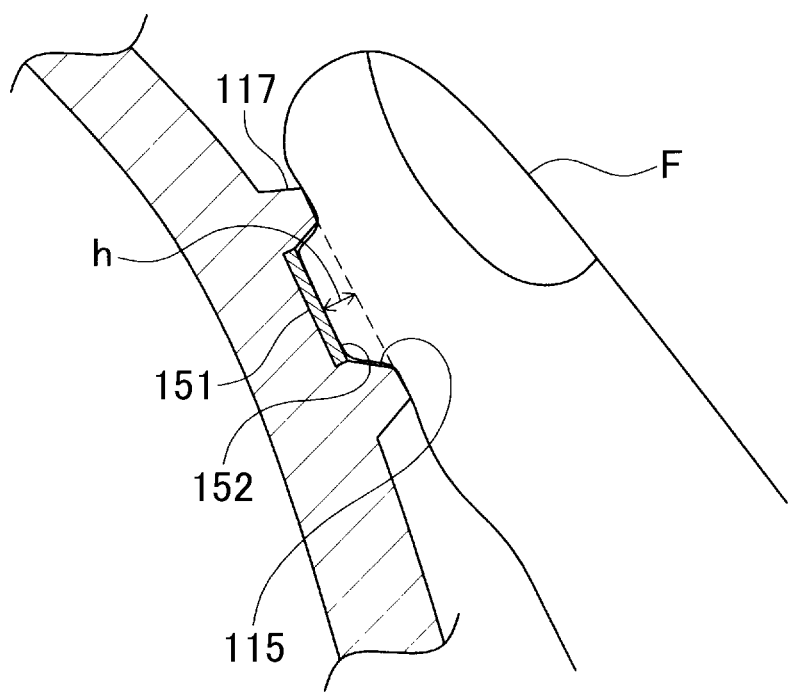
FIG. 31B is an outlined sectional view explaining positions of both the circular convex wall configuring the recess formed on the case and the touch electrode in the modification of the ninth embodiment, in which the operator's finger shown in FIG. 31A has been pressed to directly touch to the touch electrode.

In this modified structure, if an operator's finger F is made to simply (or softly) touch the recess 115 as shown in FIG. 31A when the operator tries to grip the case 111, the finger F cannot directly touch the touch electrode 151 although the circular convex wall 117 is touched by the finger F. On the contrary, as shown in FIG. 31B, the operator presses his or her finger F, which is softly put on the circular convex wall 117, inwardly in the recess 115, whereby the finger can directly touches the touch electrode 151. Hence, by this convex structure, unintentional touch operations onto the touch electrode 151 can be prevented, thus preventing erroneous operations. In addition, only a slight movement of the finger F enables the switch 150 to turn on or off selectively.

Tenth Embodiment

Figure 32:
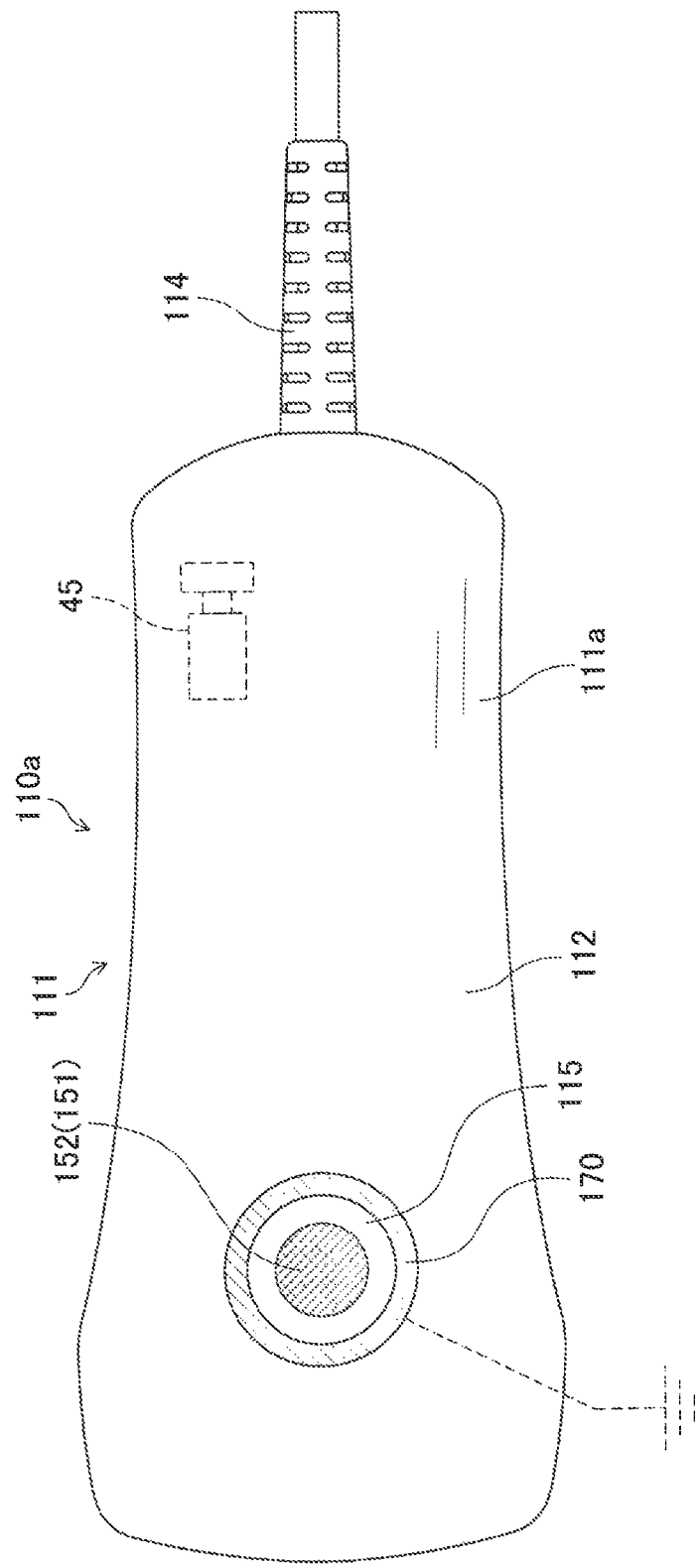
FIG. 32 is a plan view showing an information reader according to a tenth embodiment.

Hereinafter, an information reader according to a tenth embodiment will now be described with reference to FIG. 32.

In the tenth embodiment, a guard pattern is arranged around the touch electrode 151, which is mainly different from the configuration explained in the ninth embodiment. Practically, an information reader 110a shown in FIG. 32 has a circular (ring-shaped) guard pattern 170 whose impedance is lower than that of the touch electrode 151. The guard pattern 170 is arranged on the upper surface 112 of the case 111 so as to be exposed thereon and surround the recess 115. This guard pattern 170 is electrically connected to the ground pattern, for example, of an electric substrate housed in the case 111, with the result that static electricity applied to or around the recess 115 is removed via the guard pattern 170.

Hence, in cases where static electricity or electric disturbance is applied externally to the case, the static electricity is prevented or reduced from being applied to the touch electrode 151 by the guard pattern 170, thus protecting, from the static electricity or electric disturbance, the switch 150 and the internal electric circuits mounted therein. The guard pattern 170 is just one example of other electrodes whose impedance is lower than the touch electrode 151, and will not be limited to the circular (ring-shaped) form, but may be formed into a quadrangular shape which surrounds the recess 115.

Eleventh Embodiment

Hereinafter, an information reader according to an eleventh embodiment will now be described with reference to FIGS. 33A and 33B to 35.

The eleventh embodiment is mainly different in the structures from the ninth embodiment in that an elastically-deformable touch electrode is used in the eleventh embodiment. Specifically, an information reader 110b shown in FIGS. 33A, 33B and 34 employs a switch 180 instead of the foregoing switch 150, in which the switch 180 is still configured as an electrostatic capacity type of switch. This switch 180 is provided with a touch electrode 181 and a touch detecting circuit 160a.

Figure 35A:
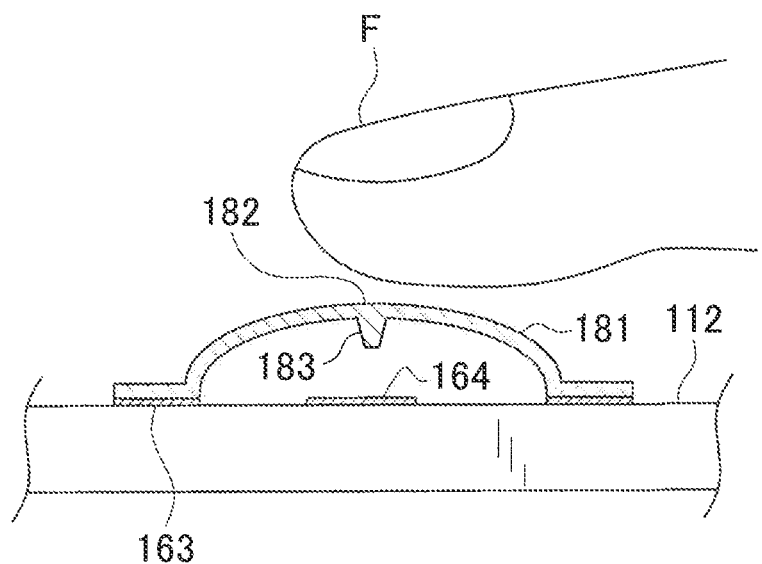
FIG. 35A is an outlined sectional view shown by enlarging the touch electrode shown in FIG. 33B.
Figure 35B:
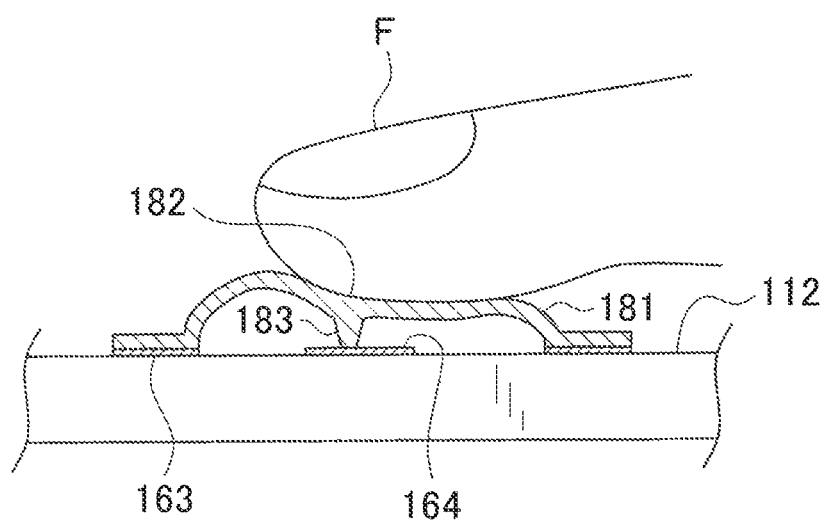
FIG. 35B is an outlined sectional view shown when the touch as electrode shown in FIG. 35A is depressed so as to allow a protrusion thereof to touch a contact.

Of these components, the touch electrode 181 is formed into an approximately semicircular sphere shape (or a domal shape), as can be understood from FIGS. 33B and 35A, in which the touch electrode 181 has a top portion 182 which is inwardly elastically deformable to gain a recess thereon (refer to FIG. 35B). The touch electrode 181 has a lower part touched to an electrode 163 for an electrical connection, in which the electrode 163 is electrically connected to a switching element 161 via a circuit protecting resistor Ro. The top portion 182 of the touch electrode 181 has an inner surface from which an electrically conductive protrusion 183 protrudes inwardly. The protrusion 183 is integrally formed with the top portion 182.

Figure 34:
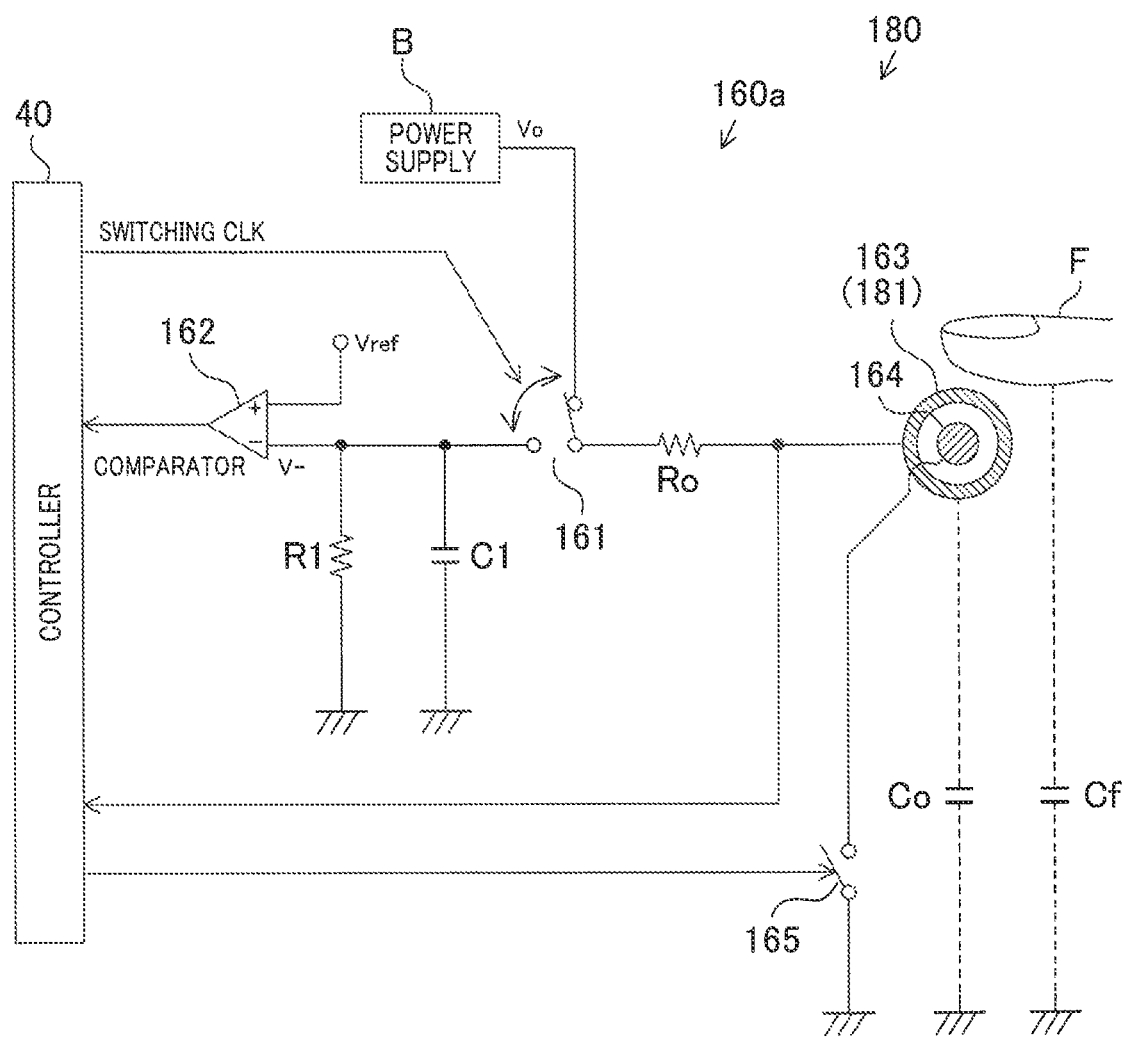
FIG. 34 is a block diagram exemplifying the electrical configuration of the information reader of the eleventh embodiment.

As shown in FIG. 34, the touch detecting circuit 160a is additionally provided with a contact 164 and a switching member 165, compared with the foregoing touch detecting circuit 160 (refer to FIG. 27). The contact 164 is positioned under the protrusion 183, so that the contact 184 comes in contact with the protrusion 183 which have been come down in response to an elastic deformation of the top portion 182 due to an operator's pressing operation on the top portion 182. This contact realizes electrical conduction therebetween.

The switching member 165 is under the control of the controller 40, by which a switchover can be realized selectively between a state the contact 164 is electrically connected to the earth and a sate the contract 164 is not connected to the earth. In the former state in which the earth connection is established, a current flow passes through both of the protrusion 183 and the contact 164. Thus a contact between the protrusion 183 and the contact 164 can be detected by detecting this current flow. The contact 164 can be exemplified as the second electrode.

The thus configured switch 180 is given two functions consisting of an electrostatic switch and a mechanical contact switch which uses the contact between the protrusion 183 of the touch electrode 181 and the contact 184.

Hence, there can be provided a first mode in which the switch 180 functions as the electrostatic switch and a second mode in which the switch 180 functions as the mechanical contact switch.

In the first mode, the controller 40 is configured to control the switching member 165 so that the contact 164 is not grounded, under which the controller 40 still issues the switching signal CLK to switch on/off the switching element 161. Hence, similarly to that explained in the ninth embodiment, an operator's touch operation is performed on the touch electrode 181, an electrostatic capacity Cf is added due to a touch finger or another touching device. This capacity addition reduces the count N so as to be equal to or lower than the determining threshold Nth, whereby the touch operation onto the touch electrode 181 is detected. The reading process is therefore activated.

Meanwhile, in the second mode, the controller 40 is configured to, as predetermined control, control the switching member 165 so that the contact 164 is grounded, and stop issuance of the switching signal CLK. Moreover, in the second mode, as shown in FIG. 35B, when the protrusion 183 comes in contact with the contact 164 by pressing the top portion 182, a current flowing through the protrusion 183 and the contact 164 is detected. Hence, by this current detection, the pressing operation performed onto the top portion 182 is also sensed, and the reading process is activated accordingly.

As described, not only pressing down the touch electrode 181 but also just touching the touch electrode 181 allows the controller 40 to detect the operator's operation for activating the reading process. Accordingly, the present embodiment can give users a click feeling derived from elastic deformations of the touch electrode 181 when a user operates to activate the reading process, by scheming over to the second mode when being shipped from the factory.

In the meantime, when it is detected a state where there is a higher probability of occurring electrical conduction failure between the protrusion 183 and the contact 164 due to ageing or other factors, which is caused for example by repeating many times the contract and non-contact of the protrusion 183 to the contact 164, the controller 40 switched the detection mode to the first mode by controlling the switching member 165. In this first mode, without the electrical conduction, the switch can be used with the click feeling, thus expanding the lifetime of the switch. Of course, responsively to a user's preset operation or a command from an upper-level device, the controller 40 can control the switching member 165 in order to perform a switchover between the first and second detection modes.

As described, in the information reader 110b of the present embodiment, the count N is detected by the controller 40 which serves as a detector, in which the count N corresponds to the electrostatic capacity of the touch electrode 181 of the electrostatic capacity type of switch 180. Based on this detected result, the controller 40 carries out the reading process (i.e., controlling the information reading unit) depending on an operation performed with the switch 180. In the case 111, the protrusion 183 of the elastically deformed touch electrode 181 is able to come in contact with the contact 164. Even when such a contact is detected, the foregoing reading process is carried out by the controller 40.

Hence, additionally to the equivalent advantages to those gained by the ninth embodiment, the electrostatic capacity type of switch 180 can be used to detect operator's touch operations. In such a case, the touch operations can be done with higher operability and with improved detection accuracy.

Particularly, when there is detected a contact between the protrusion 183 of the touch electrode 181 and the contact 164, the reading process is started as the predetermined control, as described. Hence, the switch can serve as the electrostatic switch as well as the mechanical contact switch which uses the contact between the protrusion 183 and the contact 164. In this way, the touch operations can be detected by the two types of detection mechanisms, so that, even when there occurs a failure in any one of the two types of detection mechanisms, such as occurrence of abnormality in the electrostatic capacity detection circuit or a contact failure in the mechanical switch, it is avoidable that the information reader 110b does not work or such an accident can be reduced. This will also be led to higher and reliable detection of the touch operations.

Further, the foregoing predetermined control can be set differently from control performed when a detected value of the electrostatic capacity becomes equal to less than the threshold so that the determination shows the switch ON (or the switch ON when the detected value is over the threshold). By this configuration, the function of the electrostatic switch and the function of the mechanical contact switch can be provided differently. For instance, the function of the electrostatic switch is assigned to control for starging the foregoing reading process, while the function of the mechanical contact switch is assigned to control for turning on/off the power supply of the information reader 110b. More practically, by the controller 40, when a contact between the protrusion 183 and the contact 164 is detected in response to pressing down the touch electrode 181 during the power ON state of the information reader, control proceeds to turning off the power. On the contrary, by the controller 40, when a contact between the protrusion 183 and the contact 164 is detected in response to pressing down the touch electrode 181 during the power OFF state of the information reader, control proceeds to tuning on the power.

In other words, it is possible to activate the reading process by touching the touch electrode 181 and turn on/off selectively the power by pressing down the touch electrode 181. Thus the single touch electrode 181 can be used as a trigger switch as well as a power switch.

As a modification, the touch electrode 181 is not limited to be formed into the approximately semicircular sphere shape (or a domal shape) described above, but may be formed into other shapes as long as the protrusion 183 or another such a shape member comes in contact with the electrode 163 when being elastically deformed. The feature of the present embodiment, which is employment of the elastically-deformable touch electrode, can also be applied to other embodiments.

The present disclosure cannot be limited to the foregoing embodiments and their modifications, and may be developed into further practical configurations, which can be exemplified as below.

(1) In the foregoing descriptions, the touch electrode 151 placed in the recess 115 is arranged to be touched directly and located closely to the reading window 113 on the upper surface 112 (outer surface) of the upper case 111a. The touch electrode 151 will not be limited to such an arrangement. For example, the touch electrode 151 may be arranged in the recess 115 formed on the lower case 111b or may be arranged in the recess 115 formed on a side of the case 111.

Similarly to the above, the touch electrode 181 is not be restricted to being arranged closely to the reading window 113 on the upper surface 112 (the outer surface) of the upper case 111a. Instead, by way of examples, the touch electrode 181 can be arranged in the recess 115 formed on either the lower case 111b or a side surface of the case 111.

(2) The recess 115 may be configured such that the touch electrode 151 is exposed, at least partly, to the outside via a through-hole formed through the case 111, so that the at least part of the touch electrode 151 can be touched directly. Further, the recess 115 has an inner-diameter-side polygonal shape when viewed from the top. The circular convex wall 117 is not limited to have a circular (ring-shaped) form, but may have the inner and outer diameter shapes at least one of which is a polygonal shape when viewed from the top.

(3) The present disclosure will not be limited to be applied to the optical information reader, but can be applied to other applications which uses the electrostatic capacity type of switch. This switch can be used to detect a touch operation to control other functions in information readers, such as an information reader which starts a reading process for reading radio tags via radio communication when the touch operation has been detected.

Twelfth Embodiment

A twelfth embodiment of the information reader according to the present disclosure will now be described.

An information reader 210 shown in FIGS. 36 and 37 is provided as a mobile type of optical information reader which optically reads information such as information codes (including bar codes and two-dimensional condes or character information.

The information reader 210 is provided with a case 211 configured by assembling an upper case 211a and a lower case 211b with each other. Within the case 211, there are arranged circuits units 20 containing various electronic parts comprising electronic circuits. The upper and lower cases 211a and 211b, which are made of synthetic resin material such as ABS resin, are mutually engaged, without using further members such as screws, by a plurality of engaging portions formed inside the upper and lower cases 211a and 211b, so that the inside of the case 211 is not exposed to the outside. On one end side of the case 211 in a longitudinal direction thereof, a reading window 213 is formed, while the other end of the case 211 in the longitudinal direction is connected with a cable connecting member 214.

In order to make a user hold the case 211 from the upper case side and direct the reading window 213 thereof toward an object to be read in an easier manner, the case 211 is entirely curved so that a longitudinally central part of the case is projected upward so as to represent an arch when being viewed from a side thereof, as shown in FIG. 37B. Additionally, on and in an upper surface 212 of the upper case 211a, there is provided a touch range indicating region (indicating region) 215 which is depressed locally and slightly downward from the upper surface 212. This touch range indicating region 215 is located close to the reading window 213, and intended to make it easier to dearly show where a user should touch here. Still additionally, the case 211 has a gripping portion positioned in a range ranging from the touch range indicting region 215 to the cable attaching portion 214 in the longitudinal direction. This gripping portion is intended to make a user touch the touch range indicting region 215 more easily in a state where the user grips the gripping portion. The gripping portion is formed to be narrower in width than a reading portion positionally including the reading window 213 and the touch range indicting region 215.

The information reader 210 has electrical circuitry, which will now be described with reference FIG. 38.

Figure 38:
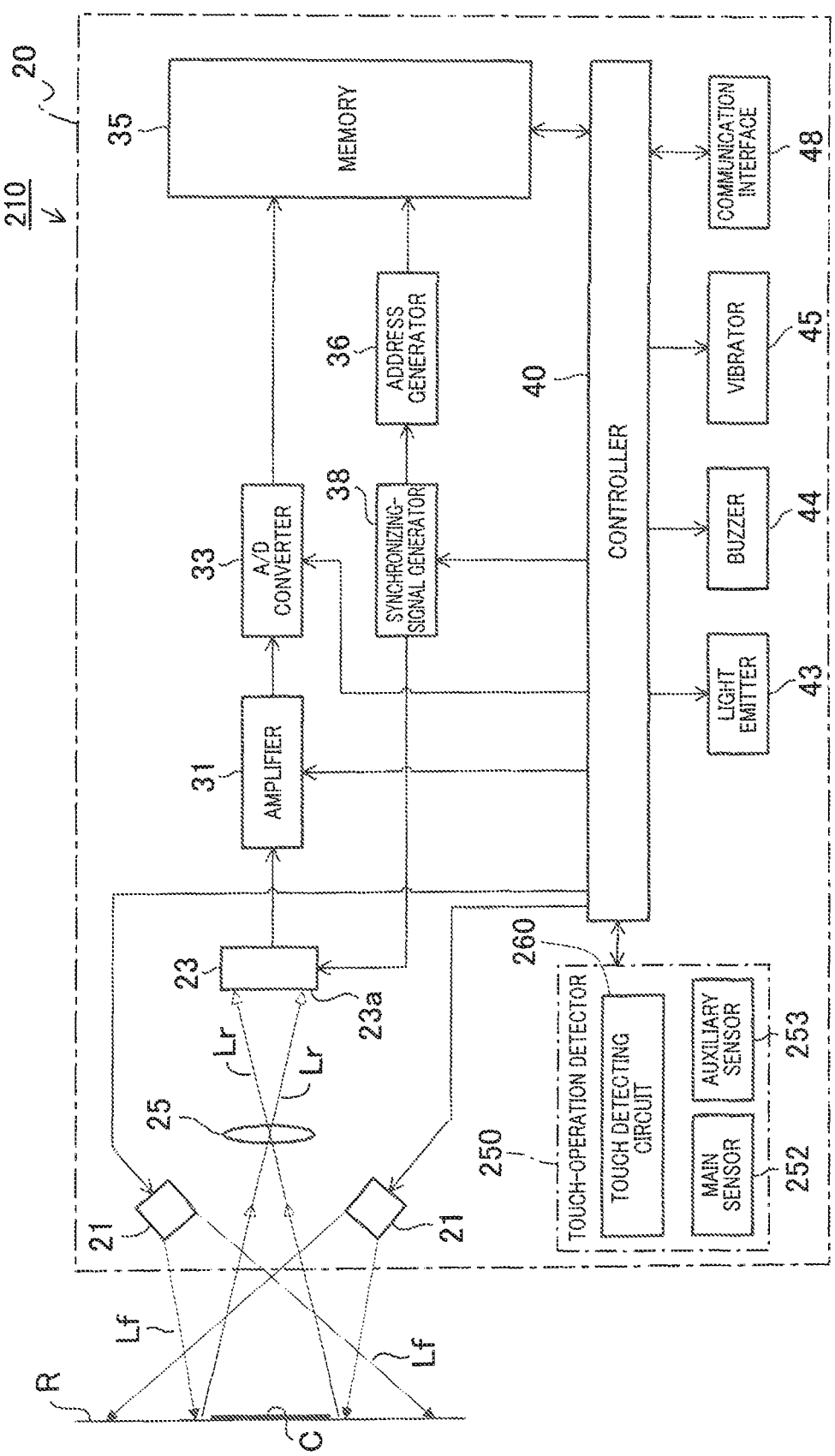
FIG. 38 is a block diagram exemplifying an electrical configuration owned by the information reader shown in FIG. 36.

As shown in FIG. 38, the circuit unit 20 housed in the case 211 is provided with, as the main components, the illumination light sources 21, the light receiving sensor 23, the light system including the imaging lens 25, the memory 35, and the microcomputer including the controller 40. These configurations are identical or similar to those already set forth in FIG. 3, so that differences from those components will be detailed later.

The microcomputer system includes a switch unit 250, in addition to the amplifier 31, the A/D converter 33, the memory 35, the address generator 36, the synchronizing-signal generator 38, the controller 40, the light emitter 43, the buzzer 44, the vibrator 45, and the communication interface 48, which are described with FIG. 3.

The controller 40 includes a microcomputer capable of entirely controlling the information reader 210, and the microcomputer is provided with a CPU, a system bus, and an input/output interface. In association with the memory 35, the microcomputer composes an information processing apparatus for providing an information processing function In the present embodiment, as shown in FIG. 37A, the vibrator 45 is disposed to be closer to the cable connecting member 214 (on the other end portion) than the touch range indicating region 215. That is, the vibrator is positioned on the gripping side and to be apart from the one end end portion of the case in the longitudinal direction thereof. In the one end portion, the reading window 213 to be directed to an object being read is arranged. The vibrator 45 is controlled by the controller 40 in such a manner that, for example, the vibrator 45 vibrates when the controller 40 is successful in reading an information code or detecting an operator's touch action onto the touch range indicating region 215. Hence the vibrator 45 composes an example of the vibrating member.

The controller 40 is communicably connected with a switch unit 250 which outputs signals, to the controller 40, depending on whether there is an operator's touch to the touch range indicating region 215. The controller 40 is configured to use the switch unit 250 to detect an operator's touch operation to the touch range indicating region 215, and, when the touch operation to the touch range indicating region 215 is detected, the controller 40 start the reading process.

The switch unit 250 is provided with a sensor board 251, two electrostatic capacity type sensors (hereinafter, also referred to as a main sensor 242 and an auxiliary sensor 253), and a touch detecting circuit 260. Of these components, as shown in FIGS. 37A and 37B, the sensor board 251 is arranged within the case 211, which arrangement allows the main sensor 252 to be opposed to the touch range indicating region 215 from the inner side of the upper case 211a. Further, the arrangement of the sensor board 251 allows the auxiliary sensor 253 to be arranged in the case 211 such that the auxiliary sensor 253 is shifted from the man sensor 252 to a different position in a direction perpendicular to the longitudinal direction.

By this arrangement, both of the main and auxiliary sensors 252 and 253 are assembled within the case 211 so as to be directed toward the upper surface 212 of the upper case 211a. On the outer surface of the case 211, the touch range indicating region 215 is formed to include both of the main and auxiliary sensors 252 and 253 when viewed form the top.

Hence, when the touch range indicating region 215 is touched, an electrostatic capacity Cf caused by a touched finger or another device is added to the main sensor 252, but not added to the auxiliary sensor 253. In addition, the above arrangement of the auxiliary sensor 253 makes it possible to reduce the auxiliary sensor 253 from being influenced by an electrostatic capacity resulting from an operator's hand gripping the gripping portion. Influence of temperature from an operator's hand gripping the gripping portion can also be suppressed.

Figure 39:
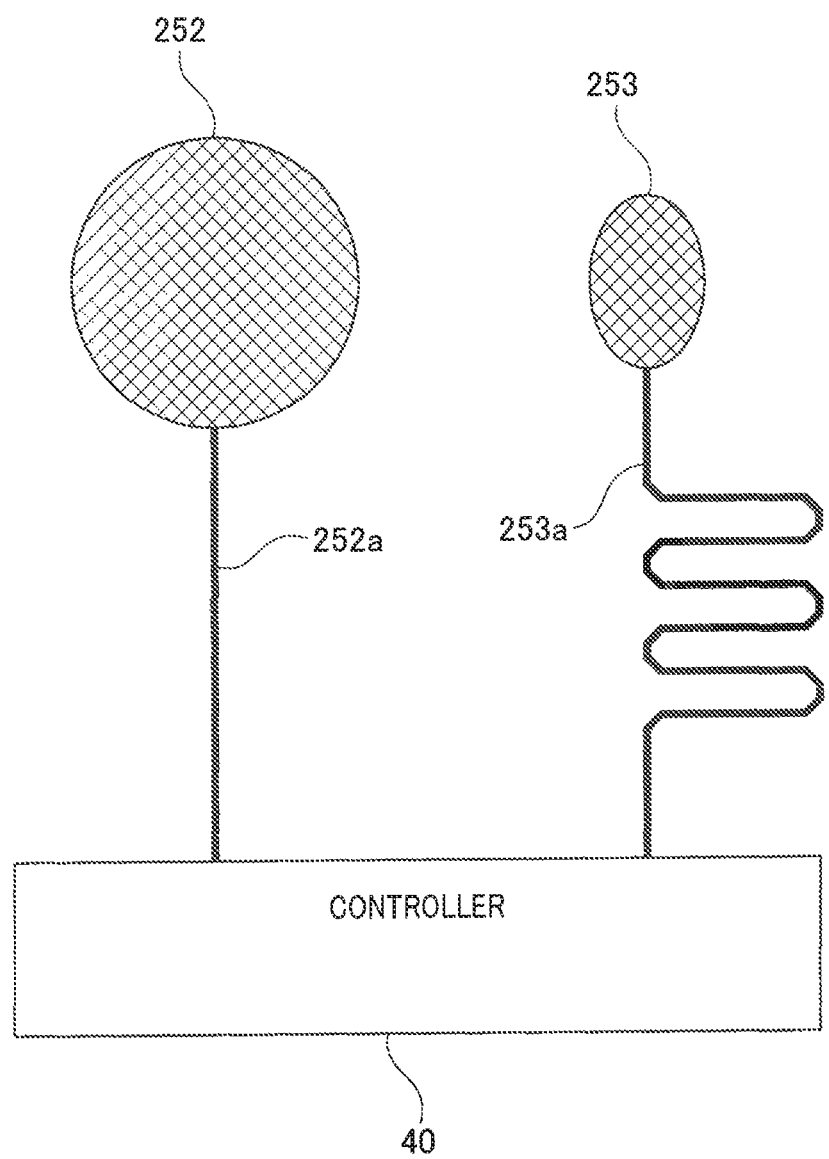
FIG. 39 is a pictorial illustration for explaining the lengths of wiring lines to main and auxiliary sensors in a comparative manner.

In the present embodiment, the main sensor 252 has a larger surface area and a difference between stray capacitance values of the main and auxiliary sensors 252 and 253 is kept smaller, i.e., the both values are equal to each other as much as possible. For this purpose, as shown in FIG. 39, the main sensor 252 is larger in the surface area than the auxiliary sensor 253, and a wiring 253a from the controller 40 to the auxiliary sensor 253 is given a length which is longer than the length of a wiring 252a from the controller 40 to the main sensor 252.

Figure 40:
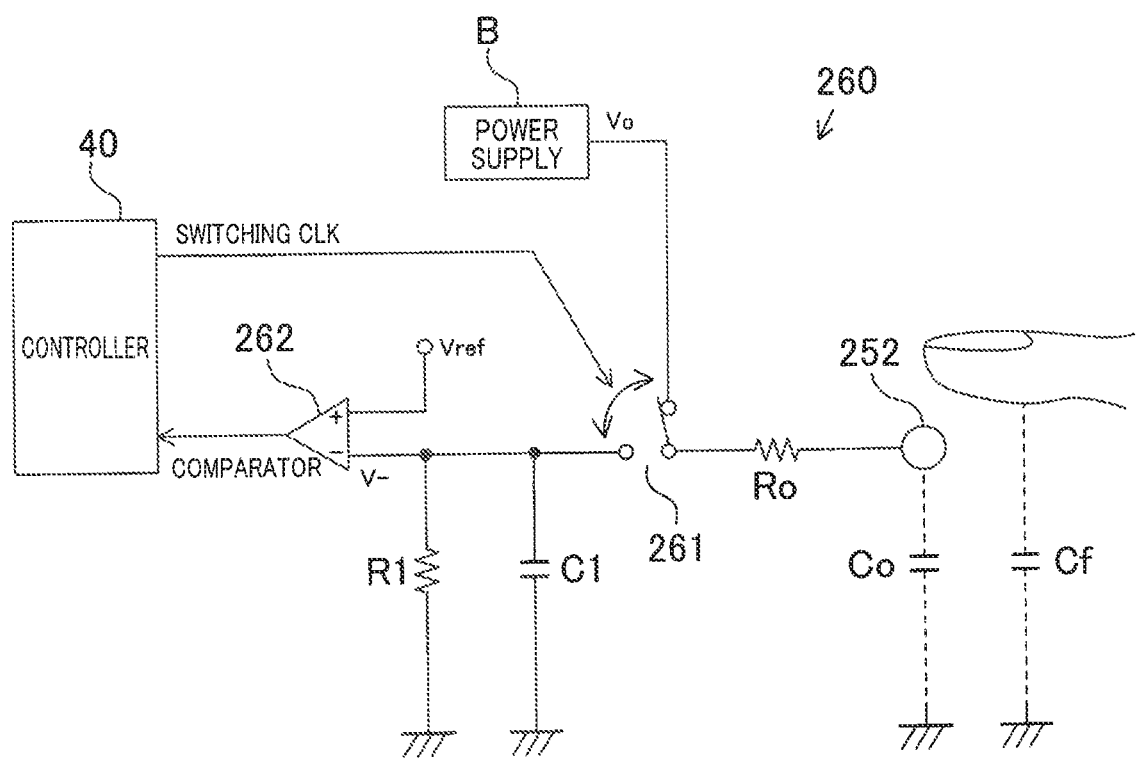
FIG. 40 is a block diagram explaining a touch detecting circuit.

The touch detecting circuit 260 is configured to receive the switching signal CLK form the controller 40 and convert the electrostatic capacities of the main and auxiliary sensors 252 and 253 into corresponding counts. This touch detecting circuit 260 will now be detailed with reference to FIG. 40. As shown in FIG. 40, the touch detecting circuit 260 is provided with a switching element 261, a circuit protecting resistor Ro, a capacitor C1, a discharging resistor R1, and a comparator 262. Power supply from a power supply B allows to electrical charge to be accumulated in the stray capacitance Co on the sensor wiring.

For measuring the electrostatic capacitance of the main sensor 252, the switching element 261 switches the sensor-line electric connection to either the power supply B or the comparator 262, which is responsive to the switching signal CLK. When being connected to the comparator 262 side, the electrical charge accumulated in the stray capacitance Co moves to the capacitor C1, thus increasing the negative input voltage – to the comparator 262. Meanwhile, when being switched over to the power supply side, the discharge resistor makes the negative input voltage V– decrease gradually and the stray capacitance Co is again charged.

By making the switching element 61 repeat the foregoing switching operations, the negative input voltage V– which has been increased gradually reaches a positive input voltage (i.e., a fixed reference voltage) Vref of the comparator 262. And when the negative input voltage V– exceeds positive input voltage Vref, the output of the comparator 262 is switched from Hi (high level) to Lo (low level), according to which the controller 40 stops the output of the switching signal CLK. The controller 40 is configured to count the number of switching times measured in a period of time ranging from the Hi output of the comparator 262 to a time when the output switched to the Lo output, which makes it possible to convert the electrostatic capacity of the main sensor 252 to a corresponding count N. In the similar way to the above, the electrostatic capacity of the auxiliary sensor 253 can be converted to a count corresponding to the capacity.

As described, when the touch range indicating region 215 is touched with a user's finger or other devices, the electrostatic capacity Cf (stray capacitance) caused due to the touch is electrically added to the main sensor 252, thus increasing the sensor-side electrostatic capacity to "Co+Cf", thus increasing an accumulated amount of electrical changes thereat. For this reason, when the foregoing switching operations are repeated, the negative input voltage V– will exceed the positive input voltage Vref earlier than a state where the touch range indicating region 215 is not touched, which makes the number of switching times smaller. This results in a decreased count N.

Practically, the count N based on the main sensor 252 changes deepening on whether or not there is a touch operation on the touch range indicating region 215. However, since the electrostatic capacity Cf derived from an operator's touched finger or another touching device will not be added to the auxiliary sensor 253, the count N is not changed depending on the auxiliary sensor 253, due to the touch operation to the touch range indicating region 215.

How to detect a touch operation to the touch range indicating region 215 based on results of the detection carried out by using the main and auxiliary sensors 252 and 253 and the touch detecting circuit 260 will now be described.

Figure 41:
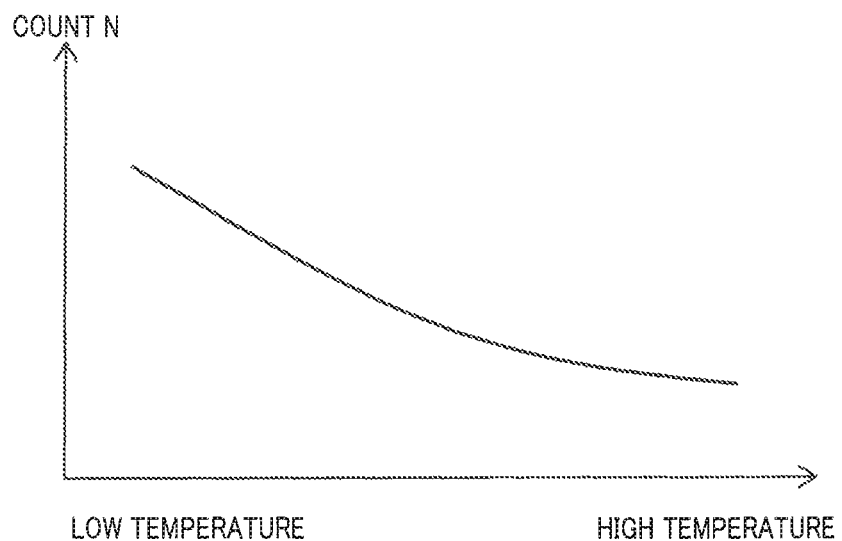
FIG. 41 is a graph explaining a relationship between the count and the surrounding temperature.

As shown in FIG. 41, the main and auxiliary sensors 252 and 253 change their counts largely in repose to changes in the surrounding temperature, which is due to temperature characteristics of dielectric constant of their materials. More specifically, as the surrounding temperature becomes higher, it is more likely that it is erroneously determined that the touch range indicting region 215 has been touched. In contrast, when the surrounding temperature becomes lower, it is more difficult to determine that there has been a touch operation to the touch range indicating region 215, unless the touch range indicating region 215 is not touched firmly. Hence, if the touch operation to the touch range indicating region 215 is determined based on the count of only the main sensor 252, it is required to adjust the sensitivity or other necessary detection characteristics of the main sensor in accordance with the surrounding temperature or other factors.

With considering the foregoing incontinence, the present embodiment enables the controller 40 to calculate a difference between the counts resulting from the main and auxiliary sensors 262 and 253, which difference will be hereinafter a count change amount $\Delta N$ and a preset threshold $\Delta Nth$, and compare those values $\Delta N$ and $\Delta Nth$ with each other. The controller 40 uses the compared results to detects whether or not a touch operation has been performed to the touch range indicating region 215.

Hence, even when the count based on the main sensor 252 changes depending on various factors indictive of the surrounding environment, the count based on the auxiliary sensor 253 changes to trace the same tendency as that of the main sensor 252. Accordingly, since the count change amount $\Delta N$ can resist changes in the surrounding environment factors, comparison between the two values $\Delta N$ and $\Delta Nth$ results in suppressing or reducing the touch detection from being influenced by such changes in the surrounding environment factors. That is, using the count based on the auxiliary sensor 253, the count based on the main sensor 252 can be corrected.

Figure 42:
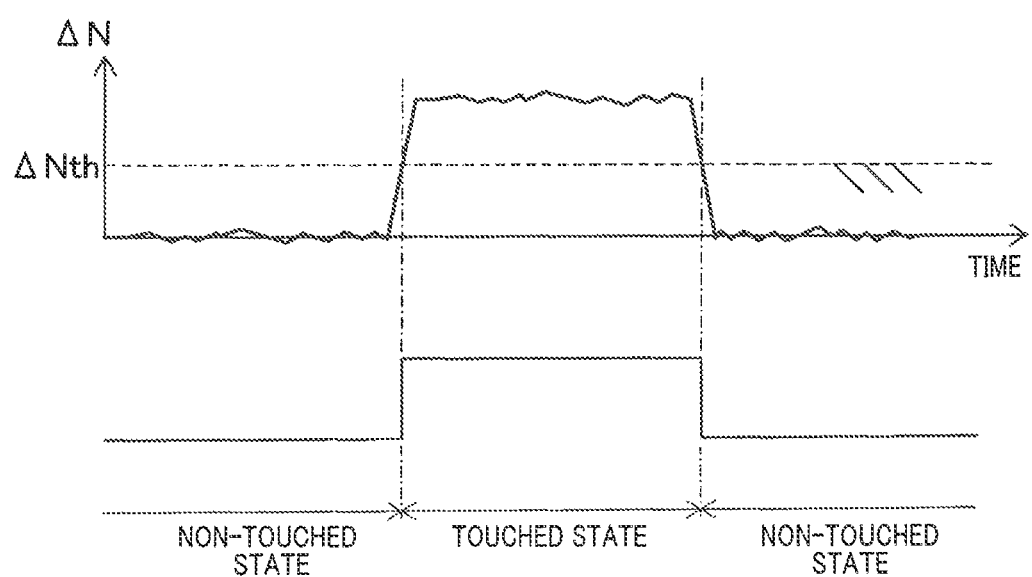
FIG. 42 is a graph explaining a relationship between amounts of changes in the count and operator's touch operations to a touch range indicating region.

Meanwhile, when starting the reading process, the touch range indicating region 215 may be touched. Even if such an even occurs, the count based on the main sensor 252 changes largely compared to the counts based on the auxiliary sensor 253, as exemplified in FIG. 42. As a result, the count change amount $\Delta N$ becomes large, the count change amount $\Delta N$ can still be used to detect whether or not a touch operation is performed to the touch range indicating region 215.

As described, in the information reader 210 according to the present embodiment, the touch range indicating region 215 is formed to receive a touch operation required for starting an information code. In the touch range indicating region 215, the main sensor 252 is arranged, and the auxiliary sensor 253 is arranged positionally differently from the region 215. In addition, the count change amount $\Delta N$, which is a difference between the counts (detected amounts) based on the main and auxiliary sensors 252 and 253, and the preset threshold $\Delta Nth$ are compared with each other by the controller 40, and a touch operation to the touch range indicating region 215 is detected by the controller 40, so that the reading process is started accordingly.

In this way, the count change amount $\Delta N$ which resists changes in the surrounding environmental conditions is generated and used for comparison with the preset threshold $\Delta Nth$. It is therefore possible to maintain an accuracy degree fully satisfying for detecting touch operations, without requiring particular adjustment, even in using the reader in changes of environmental conditions.

Furthermore, the auxiliary sensor 253 is arranged within the case 211, resulting in avoidance of influence of an operator's finger, which is touched to the touch range indicating region 215, on the auxiliary sensor 253. Thus accuracy for detecting the touch operations can be raised.

Particularly, the main sensor 252 is lager in the surface area form the auxiliary sensor 253 and the length of the wiring 253*a* to the auxiliary sensor 253 is longer than that of the wiring 252*a* to the main sensor 252. By these configurations, a difference in the stray capacitances owned by the main and auxiliary sensors 252 and 253 are made smaller so that both capacitances are preferably equal to each other. For this reason, influence of changes in the surrounding environment factors on the count change amount $\Delta N$ can be suppressed, while the surface area of the main sensor 252 can be set larger. Hence, the touch range indicating region 215 can be touched in an easier manner, thus being improved convenience for the touch detection.

Figure 43:
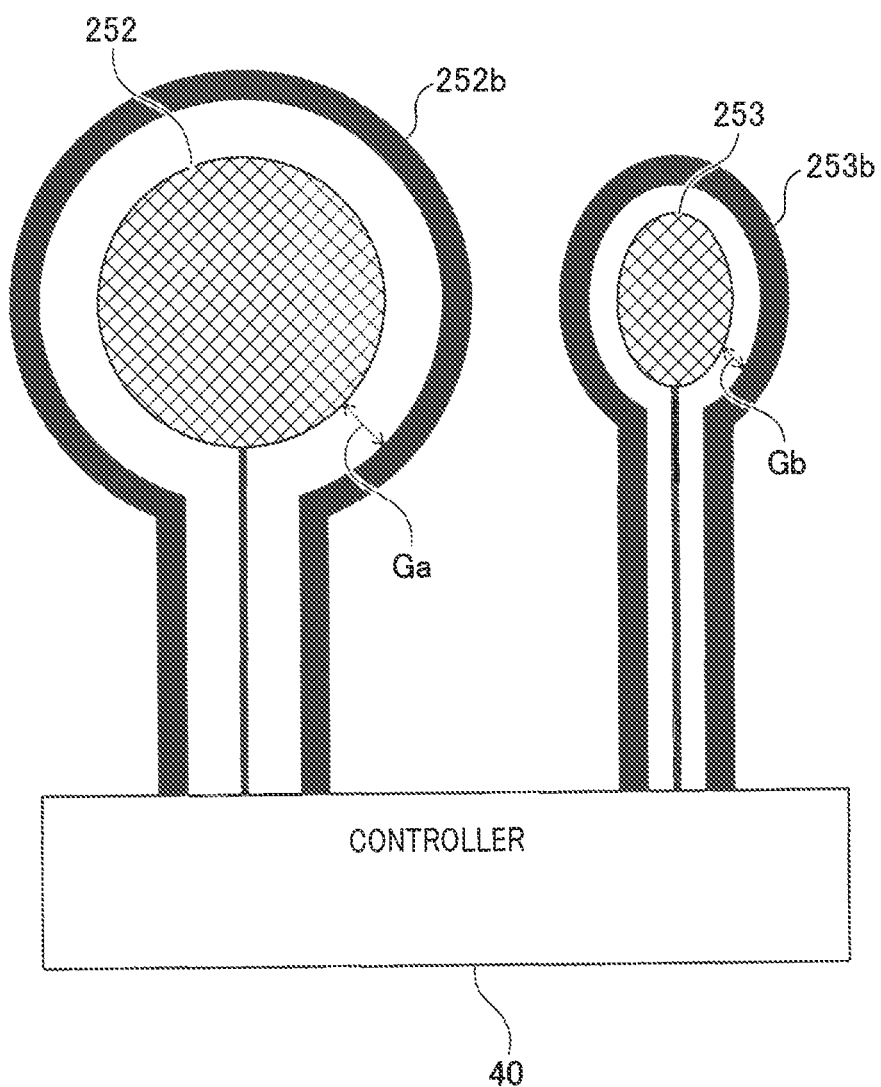
FIG. 43 is a pictorial illustration which is for an information reader according to a first modification of a twelfth embodiment, in which a gap between an auxiliary sensor and a ground pattern and a gap between a main sensor and a ground pattern are compared pictorially.

A first modification of the present embodiment is shown in FIG. 43, in which the main sensor 252 is larger in the surface area than the auxiliary sensor 253, a ground pattern 253*b* is disposed around the auxiliary sensor 253, a ground pattern 252*b* is disposed around the main sensor 252. And, a gap Gb from the ground pattern 253*b* to the auxiliary sensor 253 is set to be narrower than a gap Ga from the ground pattern 252*b* tot the main sensor 252. This structure also make it possible that a difference between the stray capacitances of the main and auxiliary sensors 252 and 253 is made smaller, so at be equal in a preferred manner. This configuration is also effective for suppressing influence of changes in the surrounding environmental factors on the count change amount $\Delta N$, whilst the main sensor 252 can be given a lager surface area, so that the touch range indicating region 215 can be touched more easily and convenience for the touch detection can be strengthened.

Another modification employs the main and auxiliary sensors 252 and 253 whose model numbers are the same so that both sensors 252 and 253 have the same electrostatic characteristics. This makes it possible to reduce a difference between the stray capacitances of the main and auxiliary sensors 252 and 253, preferably to be equal to each other. Thus, changes in the counts (detected amounts) based on the main and auxiliary sensor 252 and 253, which are due to changes in the surrounding environmental factors, can also be made smaller, thus being led to suppressing, more reliably, the count change amount $\Delta N$ from being influenced by the surrounding environmental factors, thus providing the touch detection having a higher resistance to changes in the surrounding environmental factors.

In the present embodiment, the auxiliary sensor 253 is arranged within the case 211 and assembled therein so as to be directed to the upper surface 212 of the upper case 211*a*, on whose outer surface the touch range indicating region 215 is formed. Hence, if the information reader 210 is mounted on a metallic plane upside down in which the upper surface 212, on which the touch range indicating region 215 is formed, is directed downwards, not only the count based on the main sensor 252 but also the count based on the auxiliary sensor 253 change. Hence, in this case, the foregoing mounted state of the information reader 210 can be detected based on the respective counts.

A second modification is illustrated in FIG. 44, in which the auxiliary sensor 253 mounted on a sensor board can be disposed at an inner position which is far from the upper case within the case 211, differently from the position of the main sensor 252. Thank to this sensor arrangement, the auxiliary sensor 253 has lesser influence of a touched operator's finger to the touch range indicting region 215, whereby this can contribute to further raising detection accuracy for detecting touch operation.

In addition, as shown in FIG. 41, the counts (detected amounts) of the auxiliary sensor 253 depends on changes in the surrounding temperature, so that the auxiliary sensor 253 can also be used as a temperature sensor. In that case, the auxiliary sensor 253 senses surrounding temperature and output changes of the count. Differently from the main sensor 252, the auxiliary sensor 253 is not influenced by operator's operations touching the touch range indicating region 215. From this, when there are changes of the count of the auxiliary sensor 253, it is assumed that such changes are caused by changes in the surrounding temperature, so that the auxiliary sensor 253 can also be used as a temperature sensor.

In addition, the vibrator 45 is disposed, as shown in FIG. 37A, at an end portion of the case 211, which is distant from the other end at which the reading window 213 is disposed. When the vibrator 45 is vibrated, it is possible to reduce or prevent shakes of the reading window 213 directed to an object being read. Moreover, noise caused due to vibration of the vibrator 45 can be avoided or suppressed from influencing the light receiving sensor 23 or other members for reading the reading, in which such a sensor or members are arranged closely to the reading window 213.

The case 211 is composed of the upper and lower cases 211a and 211b mutually engaged at one or more engaging points, thus avoiding use of the screw members for mutually fixing the upper and lower cases 211a and 211b. Hence, even when the information reader 210 is used in a working environment in which foreign matters should be prevented from mixing with an object, such as a food factory, the foreign mattes cannot remain at the touch range indicting region 215, because of no drive members thoron. Screws or other elements, which are afraid of being dropped off, are not used for mutually fixing the upper and lower cases, thus reliably avoiding entry of the foreign matters.

Figure 45A:
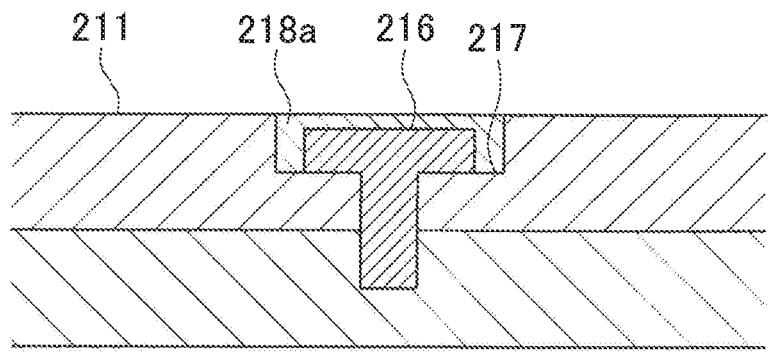
FIG. 45A is a partial sectional view explaining how a covering member is arranged on a screw member in an information reader according to a third modification of the twelfth embodiment, in which the covering member is disposed so as to be filled in a countersink bore.
Figure 45B:
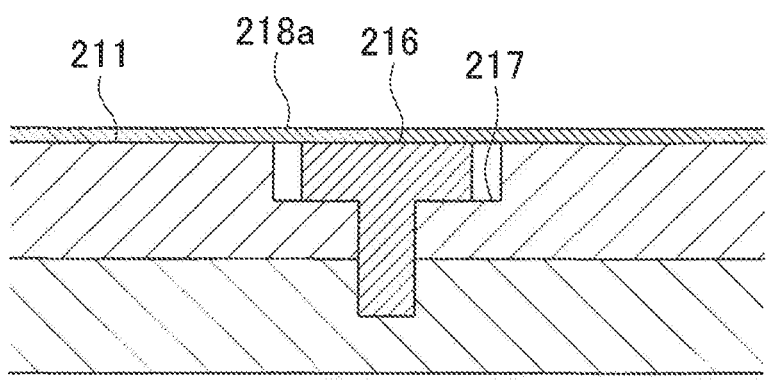
FIG. 45B is a partial sectional view explaining how the covering member is arranged on the screw member in the information reader according to a third modification of the twelfth embodiment, in which the covering member is disposed so as to over both the screw member and a surround portion thereof.

A third modification of the present embodiment can be provided when the case 211 is configured by mutually assembling the upper and lower cases 211a and 211b using screw members. Practically, a covering member can be arranged to cover the screw members from the outside. For instance, as shown in FIG. 45A, when a screw member 216 is used for such fixing, there is provided a countersink bore 217 around the head of the screw member. In this case, the countersink bore 217 is filled with a covering member 218a made of an adhesive agent, so that the screw member 216 is covered fully by the covering member 218a. Alternatively, as illustrated in FIG. 45B, a covering member 218b made of, for example, a film is arranged to cover the whole or partial area of the outer surface of the case 211, in which the area includes a portion where the screw member 216 is used for the fixing. Hence, even when the information reader 210 is used in a working environment in which foreign matters should be prevented from mixing with an object, the foreign mattes cannot remain at the touch range indicting region 215, because of no drive members thoron. Additionally, the covering member 218a or 218b prevents the fixing screw members 216 cannot be dropped off, thus reliably avoiding entry of the foreign matters.

The case 211 which can avoid entry of the foreign matters, as explained above, will not be limited to a case composed of the mutually fixed upper and lower cases 211a and 211b. For example, a case provided by three or more partial cases mutually fixed to each other may employ the same assembling manner at the foregoing. Additionally, by way of example, a wireless commination function and a charging function can be combinedly provided in the reader, thus eliminate the need for use of the cable connecting member 214. This makes it possible not to have dirty parts cased due to use of the cable, thus enhancing the preventive structure which avoids foreign matters from penetrating into the reader.

Thirteenth Embodiment

Figure 46:
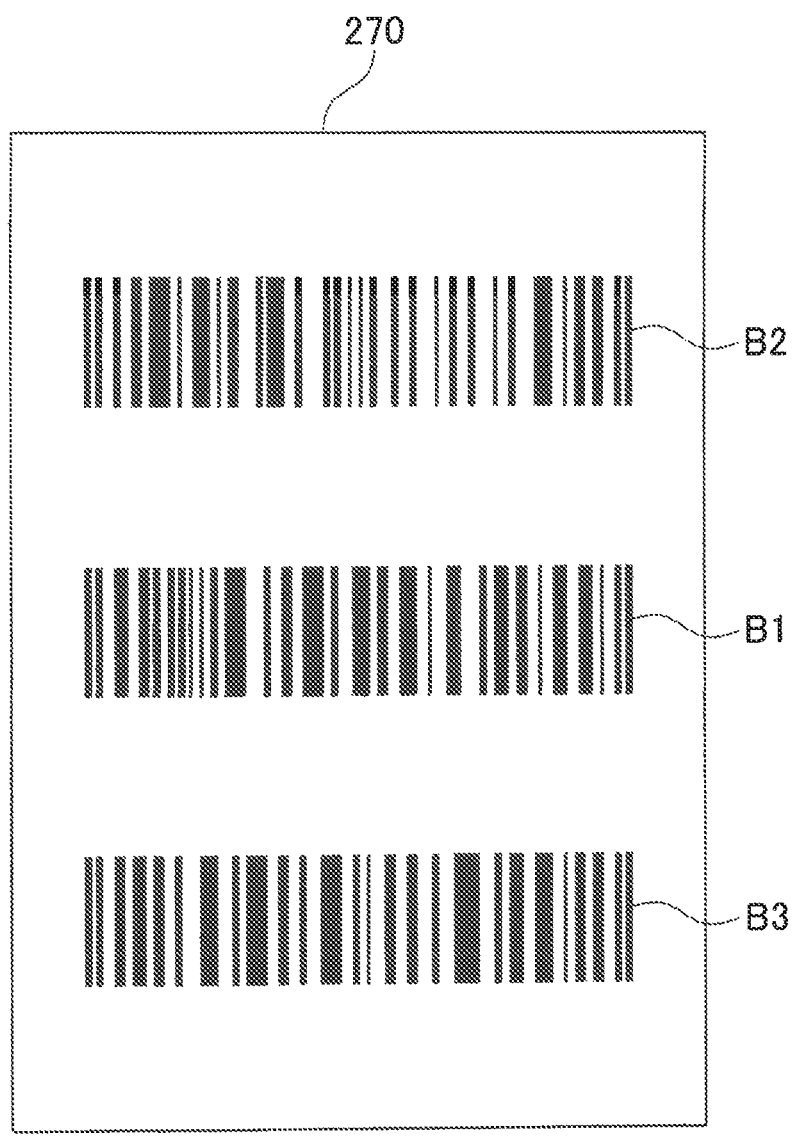
FIG. 46 is an illustration showing an essential part read by an information reader according to a thirteenth embodiment.

With references to FIG. 46, an information reader according to a thirteenth embodiment will now be described.

The thirteenth embodiment differs from the twelfth embodiment in that information codes are prepared for adjusting the preset threshold $\Delta$Nth. For example, when sensitivity of operator's touch operations is adjusted for each of three types of normal setting, low-sensitive setting, and high-sensitive setting, a threshold adjustment medium 270 is prepared which is exemplified in FIG. 46. The threshold adjustment medium 270 has a barcode B1 in which adjustment information for the normal setting is recorded, a barcode B2 in which adjustment information for the low-sensitive setting is recorded, and a barcode B3 in which adjustment information for the high-sensitive setting is recorded.

When an operator desires the low-sensitivity setting, the reading window 213 is directed to the barcode B2 on the threshold adjustment medium 270, and the touch range indicating region 215 is touched by the operator. The adjudgment information recorded the barcode B2 is thus read under the control 40, with the result that the controller 40 adjusts the preset threshold $\Delta$Nth to a threshold adaptive the low-sensitive setting in accordance with the read adjustment information.

Similarly to the above, when an operator desires the high-sensitivity setting, the reading window 213 is directed to the barcode B3 on the threshold adjustment medium 270, and the touch range indicating region 215 is touched by the operator. The adjudgment information recorded the barcode B3 is thus read under the control 40, with the result that the controller 40 adjusts the preset threshold $\Delta$Nth to a threshold adaptive the high-sensitive setting in accordance with the read adjustment information.

When the operator desires to return the current setting to the normal setting, the reading window 213 is directed to the barcode B1 on the threshold adjustment medium 270, and the touch range indicating region 215 is touched by the operator. The adjudgment information recorded the barcode B1 is thus read under the control 40 with the result that the controller 40 adjusts the preset threshold $\Delta$Nth to a threshold adaptive the normal setting in accordance with the read adjustment information.

Practically, by way of examples, the normal setting is set to have a sensitivity that is able to detect a touch operation to the touch range indicting region 215 even when an operator's finger approaches a position which is distant approximately 1 mm from the touch range indicting region 215 (even if the operator wares a glove). The low-sensitive setting is set to have a sensitivity that is able to detect a touch operation only when the finger is directly touched to the the touch range indicting region 215. Further, the high-sensitivity setting is set to have a sensitivity that is able to detect a touch operation even when an operator's finger approaches a position which is distant approximately 2 mm from the touch range indicting region 215 (even if the operator wares a glove).

In this way, in the present embodiment, based on the adjustment information read from the barcodes B1 to B3 presented on the threshold adjustment medium 270, the controller 40, which functions as a threshold adjustment unit, controls the preset threshold ΔNth, thus easily adjusting values of the preset threshold ΔNth in accordance with the prepared barcodes 61 to 63. It is thus possible for operators to adjust the touch detection sensitivity at the touch range indicating region 215 depending on his or her desire, thus being led to higher usability.

As another modification, the type of information cods for the adjustment information record is not confined to the barcodes but may be a QR code or other types of information codes. Furthermore, the number of information codes prepared for the adjustment is not limited to three, but is two, or four or more in number, which depends on usage environment or operator's desire.

Fourteenth Embodiment

With references to FIGS. 47 and 48, an information reader according to a fourteenth embodiment will now be described.

The fourteenth embodiment mainly differs from the twelfth embodiment in that, when the reading window is directed to an optical information code having a predetermined characteristic part, light is emitted automatically as illumination light to the code. Substantially equivalent or similar components to those in the twelfth embodiment will thus be given the same reference numbers for the sake of a simplified explanation.

Figure 47:
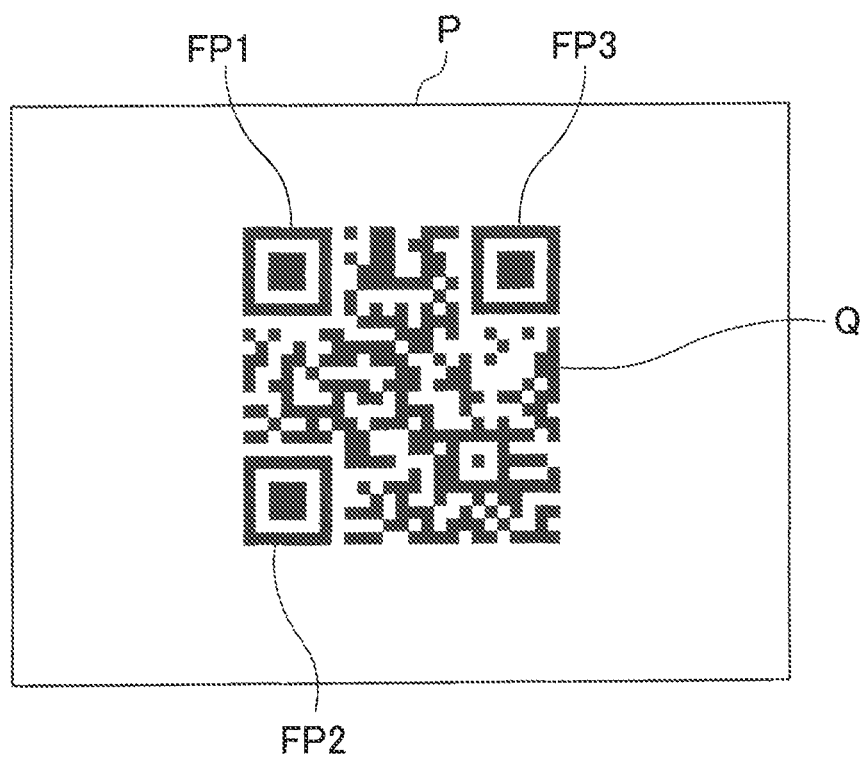
FIG. 47 is an illustration showing an essential part read by an information reader according to a fourteenth embodiment.

In the present embodiment, the controller 40 carries out a reading process based on a captured image P exemplified in FIG. 47. For example, when three position detection patterns FP1 to FP3 of a QR code Q, which are previously registered as predetermined characteristic parts, are captured, the illumination light Lf is emitted automatically from the illumination light sources 21 without necessitating any operations. That is, in response to orientating the reading window 13 to the QR code Q, the illumination light Lf is emitted to the QR code Q.

It is therefore possible that an operator who watches the automatic emission of the illumination light Lf understand the information reader is already ready for reading the QR code Q.

In the present embodiment, the controller 40 in association with the light receiving sensor 23 functionally provide an example of an optical information reading unit capable of optically reading optical information by capturing the optical information, such as codes, having the predetermined characteristic parts. In addition, the light receiving sensor 23 itself corresponds to an example of an imaging unit, the illumination light sources 21 corresponds to an example of an emission unit capable of emit light towards the imaging field of view provided by the light receiving sensor 23.

Hereinafter, the reading process carried out by the controller 40 in the present embodiment will now be described with reference to a flowchart shown in FIG. 48. In the present embodiment, data indicating the foregoing characteristic parts, which are the three position detection patterns FP1 to FP3 of the QR code Q, are previously recorded in the memory 35.

Figure 48:
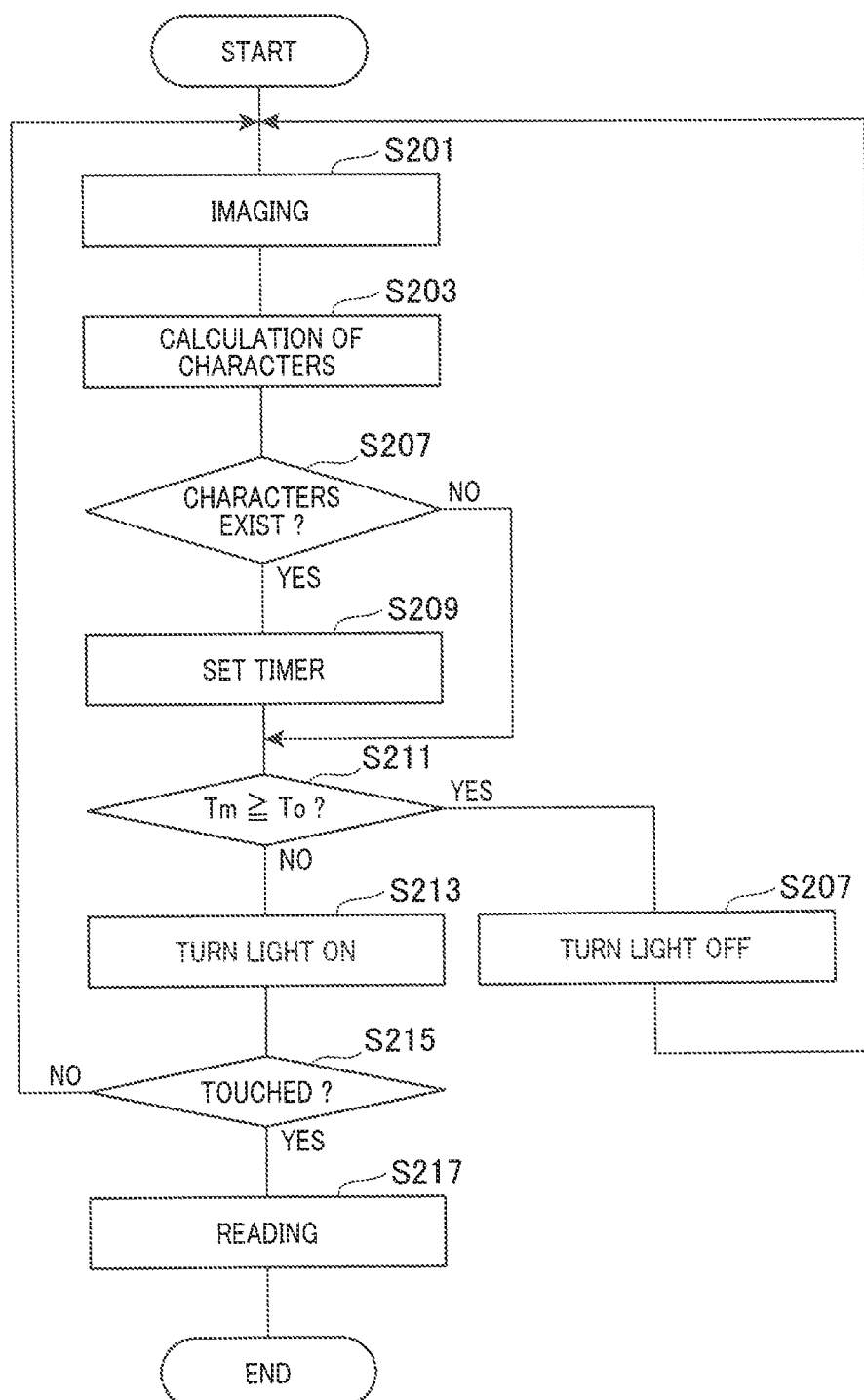
FIG. 48 is a flowchart showing a reading process carried out by the information reader according to the fourteenth embodiment.

When starting the reading process, the controller 40 performs an imaging process at step S201 of FIG. 48, whereby the information reader is ready for acquiring an image of an imaging field of view via the reading window 213. Then, based on light and dark patterns of the acquired image, the controller 40 calculates, from the image, to pick up characteristic parts corresponding to the predetermined characteristic parts stored in the memory 35 (step S203). The process then proceeds to a determination process at step S205, at which it is determined whether or not the predetermined characteristic parts can be detected. If such predetermined characteristic parts cannot be detected (NO at step S205), the process then proceeds to another determination process at step S211.

Meanwhile, as exemplified in FIG. 47, the predetermined characteristic parts, which are the three position detection patterns (also referred to as position finders) FP1 to FP3, are detected in the acquired image of the QR code Q (YES at step S205), a timer is set which is for determining a turn-on and turn-off timing of the illumination light Lf (step S209). The determination process at step S205 performed by the controller 40 functionally realizes an example of the determination unit.

Then, at a determination process performed at step S211, it is determined that the timer Tm is in a time-out due to an elapse over a predetermined period of time To. In a case that the count of the timer Tm has not been over the predetermined period of time To (NO at step S211), the illumination light Lf starts or continues to be emitted from the illumination light sources 21, so that the light is turned on or continues its turned-on state (step S213).

Then, at a determination process at step S215, it is further determined whether or not there is an operator's touch operation to the touch range indicating region 215. If there is no such a touch operation (NO at step S215), the process is returned to step S201 for repeating the foregoing steps. In contrast, the touch range indicating region 215 is touched (YES at step S215), the QR code Q with the three position detection patterns FP1 to FP3 is then subject to a decoding process to decode the encoded data in the QR code Q (S217).

Further, in a case where the timer Tm becomes a time-out state due to an elapse of the predetermined period of time To and no touched to the touch range indicating region 215 (YES at step S211), the illumination light is turned off by the controller 40 (step S207). After this, the foregoing steps are repeated.

As described, in the information reader 210 of the present embodiment, a situation is determined where the predetermined characteristic parts have been captured by the light receiving sensor 23 (YES at step S205). In this situation the illumination light sources 21 emits the illumination light Lf to the imaging field of view provided by the light received sensor 23 until an elapse of the predetermined period of time To measured the timer Tm (step S213).

As a result, by only simply directing the reading window 213 of the reader towards the optical information provided the preset characteristic parts, the illumination light Lf is emitted from the illumination light sources 21 to the imaging field of view provided by the light receiving sensor 23 without any particular operations such as operator's touch operations to the touch range indicating region 215. This automatic illumination scheme enables the illumination light Lf to bring the optical information being read, into the imaging field of view.

Specifically, in cases where an operator's touch operation to the touch range indicating region 215 has not been detected (NO at step S215) and the timer Tm has not measured the predetermined period of time To yet (NO at step S211), the imaged optical information is not read even if it is determined that the predetermined characteristic parts has been captured. Therefore, even if the predetermined characteristic parts are captured, the reading process is not performed as long as the touch range indicating region 215 is not touched, thereby easily catching an object in the imaging field of view without performing the reading process unnecessarily. In other words, when there are present other information codes positioned closely to a target reading object, it is possible to exactly read the target reading object by only touching the touch range indicating region 215, with the reading window 213 directed to the target reading object.

In the foregoing configuration, various other modifications can be provided. For example, provided that the information reader emits the marker light indicating an imaging range of the light receiving sensor 23, the marker light may be emitted synchronously with emission of the illumination light Lf from the illumination light sources 21. It is also possible that, when it is determined that the predetermined characteristic parts are captured by the light receiving sensor 23, the marker light is emitted until an elapse of the predetermined period of time To measured by the timer Tm, and then the illumination light Lf is emitted from the illumination light sources 21 after detecting an operator's touch action to the touch range indicating region 15.

The predetermined characteristic parts are not limited to the position detection patterns (i.e., the finder patterns) FP1 to FP3 in the QR code, but may be assigned to characteristic patterns of other information codes, such as start and/or stop characters of a barcode. In addition, the predetermined characteristic parts may be provided as predetermined characteristic figures or particular characters, which are added to, for example, to character information which can be read optically by using a known optical character recognition process (OCR) function.

The characteristic feature of the present embodiment, which is able to automatically emit the light when the reading window is directed to an optical information object with a predetermined characteristic part, can also be applied to the other embodiments.

The present invention will not be limited to the foregoing embodiments, but may be modified as follows.

(1) The present invention is not be limited to the appellation shown in FIG. 40, in which the information reader is configured to detect a touch operation to the touch range indicating region 215 based on the difference between the counts (detected values) of the main and auxiliary sensors 252 and 253 which are obtained from the touch detecting circuit 260. For example, in an information reader in which the detected values form the main and auxiliary sensors increase with an increase in the electrostatic capacity, the foregoing detection configuration can be used to detect a touch operation based on a difference between the detected values.

(2) The present invention is not be limited to be applied to an optical information which optically reads optical information such as information codes or character information, but may be other information readers. In such information readers, the touch range indicating region used for starting the reading is formed on the outer surface of the case, in which, in response to deicing a touch to the touch range indicating region, the information reader starts reading of wireless tags via the wires communication.

What is claimed is:

1. An information reader, comprising:
    a reader main unit provided with an information reading unit by which information of an object being read is readable; and
    a switch unit configured as a separate member from the reading main unit,
    wherein the reader main unit has a case and an inner pad configuring an electrostatic capacity type of switch used for reading of the information reading unit is housed in the case,
    the inner pad is located at a predetermined position in the case and assembled with the case from an inside thereof,
    the switch unit is provided with a touch electrode pad to which electrical charge is applied in response to a touch operation to the switch unit,
    a wiring line having both ends one of which is electrically connected to the touch electrode pad, and
    a transmission pad electrically connected to the other end of the wiring line, the transmission pad being assembled with the case from outside the case so as to positionally face the predetermined position which is set in the case.

2. The information reader according to claim 1, wherein the transmission pad is detachably assembled with the case from outside the case.

3. The information reader according to claim 1, wherein the information reader comprises
    a holder holing the reader main unit, the holder being loadable to an operator's body and having an outer surface, wherein
    the touch electrode pad is arranged on the outer surface of the holder.

4. The information reader according to claim 3, wherein the holder is loadable to, as the operator's body, a hand of the operator, and
    the touch electrode pad is arranged so as to make a finger of the hand of the operator touch the touch electrode pad, the holder being loaded to the hand.

5. The information reader according to claim 3, wherein the holder is loaded to a hand of the operator, and
    the touch electrode pad is arranged to cover a tip of a finger of the hand to which the holder is loaded.

6. The information reader according to claim 5, wherein the information reading unit is configured to optically read an information code,
    the reader main unit is formed with a reading window which receives light reflected from the information code, and
    the holder is configured to hold the reader main unit such that the reading window is directed in a direction along which the finger extends, the finger being covered by the touch electrode pad.

7. The information reader according to claim 1, wherein the transmission pad is covered by a resin film.

8. The information reader according to claim 1, wherein the switch unit is provided with
    a cover covering the touch electrode pad, and
    a supporter elastically supporting the cover such that when an operator's finger depresses the cover toward the touch electrode pad, the finger approaches the touch electrode pad.

9. The information reader according to claim 1, wherein the switch unit is provided with
    a conductive member covering the touch electrode pad via a predetermined gap and being elastically deformable.

10. The information reader according to claim 9, wherein the information reading unit is configured to perform a first process required when a touch operation is performed on the conductive member without making the conducive member elastically deform and a second process required when a depressing operation is performed to the conductive member with being touched to the touch electrode pad, differently from each other, based on a difference between amounts of electrical charge added to the touch electrode pad in both the touch operation and the depressing operation.

11. The information reader according to claim 1, wherein the information reading unit configured to optically image an information code which is the object being read, and provided with;

an imaging member imaging the information code;

a marker-light emission unit emitting maker light indicting an imaging direction for the imaging unit; and a decoding unit decoding the information code imaged by the imaging member, wherein detection of a touch operation to the touch electrode pad enables the marker-light emission unit on emit the marker light, and then, disappearing the detection of the touch operation on the touch electrode pad enables the imaging member to start imaging thereof.

12. The information reader according to claim 1, wherein the touch electrode pad is covered by a non-conductive elastic member.

13. An information reader, comprising:

a reader main unit provided with an information reading unit by which information of an object being read is readable; and a switch unit configured as a separate member from the reading main unit, wherein the reader main unit has a case and an inner pad configuring an electrostatic capacity type of switch used for reading of the information reading unit is housed in the case, the inner pad is located at a predetermined position in the case and assembled with the case from an inside thereof, the switch unit is provided with a first pad to which electrical charge is applied, a second pad assembled with the case from outside the case so as to face the predetermined position which is set in the case, and a switching member is configured to perform a switchover between a supply state where the electrical charge applied to the first pad is supplied to the second pad and a non-supply state where the electrical charge applied to the first pad is not supplied to the second pad, in replay to operations of a movable member.

14. The information reader according to claim 13, wherein the second pad is detachably assembled with the case from outside the case.

15. The information reader according to claim 13, wherein the information reader comprises a holder holding the reader main unit, the holder being loadable to an operator's body and having an outer surface, wherein wherein the movable member is arranged so as to be operable from outside the holder.

16. The information reader according to claim 15, wherein the holder is loadable to, as the operator's body, a hand of the operator, and the movable member is arranged so as to make a finger of the hand of the operator operate the movable member, the holder being loaded to the hand.

17. The information reader according to claim 15, wherein the first pad is arranged on the holder such that the electrical charge is supplied to the first pad by capacitive coupling provided between the first pad and a battery unit of the reader main unit held by the holder.

18. An information reader, comprising:

an information reading unit reading an object being read;

an electrostatic capacity type of switch equipped with a touch electrode, the touch electrode being subjected to a touch operation in starting a reading operation of the information reading unit;

a case housing therein the switch;

a detector detecting an electrostatic capacity provided by the touch electrode; and a controller controlling the information reading unit depending on operations to the switch, based on a result detected the detector, wherein the case is formed with a recess which enables at least a part of the touch electrode to be exposed outside, the at least part of the touch electrode allowing a direct touch operation.

19. The information reader according to claim 18, wherein the touch electrode has a touch face and the touch face is positioned to be concave from a circular edge portion forming the recess on the case.

20. The information reader according to claim 18, wherein the recess is configured by a circular convex wall formed on the case.

21. The information reader according to claim 19, wherein the information reader comprises a further electrode which is lower in impedance than the touch electrode, wherein the further electrode is formed to surround the recess on an outer surface of the case.

22. An information reader, comprising:

an information reading unit reading an object being read;

an electrostatic capacity type of switch equipped with a touch electrode, the touch electrode being subjected to a touch operation in starting a reading operation of the information reading unit;

a case housing having an outer surface on which the touch electrode is formed;

a detector detecting an electrostatic capacity provided by the touch electrode; and a controller controlling the information reading unit depending on operations to the switch, based on a result detected the detector, wherein the touch electrode is elastically deformable, the case is formed with a second electrode to which a part of the elastically deformed touch electrode is touched, the detector is configured to detect a touch between the touch electrode and the part of the second electrode, and the controller is configured to perform a predetermined control when the detector detects the touch.

23. An information reader, comprising:

an information reading unit reading an object being read;

a case having an outer surface, a touch range indicating region being formed on the outer surface of the case and being used by a touch operation in main the information reading unit start a reading process;

an electrostatic capacity type of main sensor arranged in the touch range indicating region;

an electrostatic capacity type of auxiliary sensor arranged at a position different from the touch range indicating region; and a detector detecting the touch operation to the touch range indicating region, based on a dereference between detected values of the main and auxiliary sensors and a preset threshold, wherein the information reading unit is configured to start the reading process in reply to detection of the touch operation by the detector.

24. The information reader according to claim 23, wherein the auxiliary sensor is arranged within the case.

25. The information reader according to claim 23, wherein the main senor and the auxiliary sensor have stray capacitances a difference of which is small.

26. The information reader according to claim 25, wherein the main sensor is larger in a surface area than the auxiliary sensor and the auxiliary sensor is longer in a length of a wiring thereto than the main sensor, whereby the main and auxiliary sensors have the stray capacitances a difference of which is small.

27. The information reader according to claim 25, wherein the main sensor is larger in a surface area than the auxiliary sensor and a gap of a grounded portion disposed to surround the auxiliary sensor is made narrower than a gap of a grounded portion disposed to surround the main sensor, whereby the main and auxiliary sensors have the stray capacitances a difference of which is small.

28. The information reader according to claim 23, wherein the auxiliary sensor is arranged inside the case and assembled therein to be directed towards an area of the outer surface of the case, on area of which the touch range indicating region is formed.

29. The information reader according to claim 23, wherein the auxiliary sensor is arranged to be separated from the outer surface of the case within the case.

30. The information reader according to claim 23, wherein the auxiliary sensor is arranged to be used in common as a temperature sensor measuring temperature based on changes in sensed values of the auxiliary sensor.

31. The information reader according to claim 23, wherein the information reader comprises a vibrating member, wherein the case comprises a reading window directed to the object and both end portions, both end portions being separated from each other, the reading window is arranged at one of the end portions, and the vibrating member is arranged at the other or the end portions.

32. The information reader according to claim 23, wherein the information reader comprises a threshold adjustment medium in which adjustment information for adjustment the preset threshold is stored, and a threshold adjustment unit configured to adjust the preset threshold based on the adjustment information read by the information reading unit from threshold adjustment medium.

33. The information reader according to claim 23, wherein the case consists of two or more cases mutually engaged at two or more engaging portions of the cases.

34. The information reader according to claim 23, wherein the case consists of two or more cases combined by screw members and the screw members are covered by covering members from outside the case.

35. The information reader according to claim 23, wherein the information reading unit is provided as an optical information unit optically reading optical information by imaging the optical information including a characteristic part of the object, an imaging unit imaging the optical information via the reading window, an emission unit emitting light towards an imaging field of view of the imaging unit, and a determination unit determining whether or not the characteristic part is imaged by the imaging unit, wherein the emission unit is configured to emit the light until an elapse of a predetermined period of time when the determination unit determines that the characteristic part has been imaged.

36. The information reader according to claim 35, wherein the information reading unit is configured not to perform the reading process even if the determination unit determines that the characteristic part has been imaged, unless the touch operation to the touch range indicating region has been detected by the detector and the predetermined period of time has elapsed.

* * * * *